United States Patent
Watanabe et al.

(10) Patent No.: US 7,636,202 B2
(45) Date of Patent: Dec. 22, 2009

(54) ZOOM LENS SYSTEM AND ELECTRONIC IMAGE PICKUP APPARATUS USING THE SAME

(75) Inventors: Masahito Watanabe, Hachioji (JP); Takahiro Amanai, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/157,839

(22) Filed: Jun. 13, 2008

(65) Prior Publication Data
US 2008/0291548 A1   Nov. 27, 2008

Related U.S. Application Data

(63) Continuation of application No. 11/450,475, filed on Jun. 12, 2006, now Pat. No. 7,403,341.

(30) Foreign Application Priority Data

Jun. 16, 2005   (JP)   ............... 2005-176764
Sep. 12, 2005   (JP)   ............... 2005-263582

(51) Int. Cl.
   *G02B 15/14*   (2006.01)
(52) U.S. Cl. .................................................. 359/691
(58) Field of Classification Search .......... 359/689–692
   See application file for complete search history.

(56) References Cited

U.S. PATENT DOCUMENTS

| 5,153,777 | A | 10/1992 | Okada et al. |
| 5,381,269 | A | 1/1995 | Estelle |
| 6,025,961 | A | 2/2000 | Kohno et al. |
| 6,124,984 | A | 9/2000 | Shibayama et al. |
| 6,515,805 | B2 * | 2/2003 | Hagimori ............. 359/691 |
| 7,106,522 | B2 * | 9/2006 | Park .................... 359/689 |
| 7,139,132 | B2 * | 11/2006 | Itoh .................... 359/691 |
| 2002/0057502 | A1 | 5/2002 | Ishii et al. |
| 2003/0210471 | A1 | 11/2003 | Mihara et al. |

FOREIGN PATENT DOCUMENTS

JP   09-033810   2/1997

* cited by examiner

*Primary Examiner*—Mohammed Hasan
(74) *Attorney, Agent, or Firm*—Kenyon & Kenyon LLP

(57) ABSTRACT

A zoom lens system comprising, in order from an object side: a first lens unit comprising two lens components; and a second lens unit comprising one lens component, during zooming, a space between the first lens unit and the second lens unit changing, the first lens unit and the second lens unit having aspherical surfaces, at least one aspherical surface of the first lens unit satisfying the following condition: R1/h1 1.35, wherein R1 denotes a paraxial radius of curvature of the at least one aspherical surface, and hi denotes a length from a first intersection between a chief ray reaching a point of maximum image height on an image surface and the at least one aspherical surface to an optical axis in the wide-angle end at a time when the chief ray enters the zoom lens system with an angle of incidence equal to or larger than 36 degrees.

11 Claims, 39 Drawing Sheets

ZOOM LENS SYSTEM AND ELECTRONIC IMAGE PICKUP APPARATUS USING THE SAME

CROSS REFERENCE TO RELATED APPLICATIONS

This application is a continuation of U.S. patent application Ser. No. 11/450,475 filed on Jun. 12, 2006, now U.S. Pat. No. 7,403,341 B2, which claims priority to Japanese Application No. 2005-176,764 filed in Japan on Jun. 16, 2005 and No. 2005-263,582 filed in Japan on Sep. 12, 2005, each of which is expressly incorporated herein in its entirety by reference thereto.

BACKGROUND OF THE INVENTION

1. Field of the Invention

The present invention relates to a zoom lens system and an electronic image pickup apparatus using the same.

2. Description of the Related Art

In recent years, it has been general to mount a zoom lens system as a photographing lens on an electronic image pickup apparatus such as a digital camera. Moreover, to miniaturize an electronic image pickup apparatus such as the digital camera, there has further risen a demand for thinning of the zoom lens system as the photographing lens.

However, in the zoom lens system for use in the digital camera including a small image sensor, a focal length shortens. Therefore, in a case where various aberrations are designed to be small while satisfying an oblique incidence characteristic of the image sensor, the number of lenses constituting the zoom lens system easily increases. Therefore, it becomes difficult to constitute the zoom lens system to be thin.

To solve the problem, in general, a thickness of the zoom lens system when stored (collapsed) is reduced by decreasing the number of the lenses constituting the zoom lens system including a plurality of lens units. It is considered that a zoom lens system including a minimum of two lens units be adopted in order to reduce a total length of the above zoom lens system. As the zoom lens system having its thickness reduced when stored, there is known a system described in, for example, Japanese Patent Application Laid-Open No. 2004-102,211.

The zoom lens system described in Japanese Patent Application Laid-Open No. 2004-102211 includes, in order from an object side, a lens unit A having a negative refractive power, and a lens unit B having a positive refractive power. The lens unit B is constituted of three meniscus lenses convex toward the object side, thereby reducing the total length of the zoom lens system.

Moreover, with a progress of high definition of the image sensor, an image is trimmed and enlarged so that it is possible to obtain an effect similar to that produced during zooming on a telephoto side. Therefore, there is a strong demand for a wide angle of the zoom lens system in addition to the reduction of the thickness of the zoom lens system.

A negative-lead type zoom lens system constituted of two or three lens units is advantageous in the reduction of the thickness. However, in a case where the number of the lenses constituting the lens units is large, a thickness of a lens element is large, or a lens closest to the object side is a positive lens, the thickness of the zoom lens system does not decrease even when the system is of a collapsible type. Such tendency is seen in zoom lens systems described in Japanese Patent Application Laid-Open Nos. 11-52,246 and 11-142,734. As an example of a presently known system which is suitable for the electronic image pickup apparatus and which is satisfactory in image forming performances such as a zooming ratio, an angle of field and the F number and which might be most thinned when collapsed, there is a system described in Japanese Patent Application Laid-Open No. 9-33810. When an entrance pupil position of a first lens unit is shallow, a diameter of the pupil decreases. As a result, the first lens unit itself can be thinned. However, for this purpose, a magnification of a second lens unit has to be high, that is, a refractive power of the unit has to be strengthened. Therefore, the image forming performance has to be sacrificed. Alternatively, the number of the constituting lenses has to be increased to thereby sacrifice reduction of depth.

SUMMARY OF THE INVENTION

The present invention provides a zoom lens system which can be thinned and an image pickup apparatus using the same.

In the present invention, a first type of zoom lens system comprises, in order from an object side:

a first lens unit including two lens components; and a second lens unit including one lens component, the number of the lens components included in the first lens unit and the second lens unit being three in total, during zooming from a wide-angle end to a telephoto end, at least a space between the first lens unit and the second lens unit changing, the first lens unit and the second lens unit including aspherical surfaces, at least one aspherical surface of the first lens unit satisfying the following condition:

$$R_1/h_1 < 1.35 \qquad (1),$$

wherein $R_1$ denotes a paraxial radius of curvature of the at least one aspherical surface, and $h_1$ denotes a length from a first intersection between a chief ray reaching a point of maximum image height on an image surface and the at least one aspherical surface to an optical axis in the wide-angle end at a time when the chief ray enters the zoom lens system with an angle of incidence equal to or larger than 36 degrees and passes through the at least one aspherical surface.

Here, the lens component means a single lens or a cemented lens which comes into contact with air by only two air contact surfaces of an incidence surface and an exit surface in a clear aperture and which does not have any air space between the surfaces.

In the present invention, a second type of zoom lens system comprises, in order from an object side:

a first lens unit having a negative refractive power and comprising a negative lens component and a positive lens component; and a second lens unit having a positive refractive power and comprising a positive lens component which includes a plurality of lens elements, the number of the lens components included in the first lens unit and the second lens unit being three in total, a space between the lens units changing during zooming from a wide-angle end to a telephoto end or during focusing.

In the second type of zoom lens system, in one aspect, an image-side surface of the negative lens component of the first lens unit has an aspherical surface on which a diverging function decreases with distance from the optical axis.

Moreover, in the second type of zoom lens system, in another aspect, 50% or less of all refractive surfaces constituting the first lens unit are aspherical surfaces.

Furthermore, in the second type of zoom lens system, in still another aspect, the positive lens component of the first lens unit comprises a positive lens element constituted of a material having a refractive index of 1.87 or more.

In a further aspect, the second type of zoom lens system satisfies the following condition:

$$0.8 < \Sigma T/fw < 2.5 \tag{9},$$

wherein ΣT denotes a sum of lengths along the optical axis from object-side surfaces to image-side surfaces of the lens units included in the zoom lens system, and fw denotes a focal length of the zoom lens system in the wide-angle end.

Moreover, in a further aspect, the second type of zoom lens system satisfies the following condition:

$$0.4 < fR/|fA| < 1.2 \tag{10},$$

wherein fA denotes a focal length of the first lens unit, and fR denotes a composite focal length of all lens units arranged on an image side of the first lens unit in the wide-angle end.

In a further aspect, the second type of zoom lens system satisfies the following condition:

$$1.20 < |\beta RT| < 2.30 \tag{11},$$

wherein βRT denotes a composite magnification of all lens units arranged on the image side of the first lens unit in the telephoto end when focused on an infinite object.

In a further aspect, the second type of zoom lens system satisfies the following condition:

$$0.17 < (D12W - D12T)/(fw \cdot \gamma^2) < 0.45 \tag{12},$$

wherein D12W and D12T denote air spaces between the first lens unit and the lens unit adjacent to an image side of the first lens unit along the optical axis in the wide-angle end and the telephoto end, respectively, γ denotes a ratio of a focal length of the zoom lens system in the telephoto end to that of the zoom lens system in the wide-angle end when focused on an infinite object, and fw denotes the focal length of the zoom lens system in the wide-angle end.

In a further aspect, the second type of zoom lens system satisfies the following condition:

$$0.06 < d11/fw < 0.53 \tag{13},$$

wherein fw denotes a focal length of the zoom lens system in the wide-angle end, and d11 denotes an air space between the negative lens component and the positive lens component of the first lens unit along the optical axis.

In a further aspect, the second type of zoom lens system satisfies the following condition:

$$0.66 < (R23 + R21)/(R23 - R21) < 1.5 \tag{16},$$

wherein R21 and R23 denote radii of curvature (paraxial radii of curvature) of the surfaces closest to the object side and closest to the image side on the optical axis in the second lens unit.

In a further aspect, in the second type of zoom lens system, at least one of the plurality of lens elements of the second lens unit is a positive lens element satisfying the following condition:

$$V2p > 65 \tag{17},$$

wherein V2p denotes the Abbe number of a material of the positive lens element included in the second lens unit.

Moreover, in the second type of zoom lens system, in a further aspect, the positive lens component of the second lens unit is a cemented lens constituted by cementing the positive lens element to the negative lens element, and satisfies the following condition, $$-1.5 < fw/R22 < -0.50 \tag{18},$$

wherein fw denotes a focal length of the zoom lens system in the wide-angle end, and R22 denotes a radius of curvature (paraxial radius of curvature) of a cemented surface of the cemented lens of the second lens unit on the optical axis.

When the zoom lens system of the present invention is combined with an electronic image sensor for receiving an optical image formed by the zoom lens system by a light receiving surface of the sensor to convert the image into an electric signal, an image pickup apparatus can be constituted.

Moreover, in the present invention, an electronic image pickup apparatus comprises:

a zoom lens system;

an electronic image sensor disposed on an image side of the zoom lens system and having an image pickup surface; and an image processing unit which may process image data obtained by picking up, by the electronic image sensor, an image formed through the zoom lens system to output the image data in which a shape of the image has been changed, the zoom lens system comprising, in order from an object side:

a first lens unit having a negative refractive power and comprising a negative lens component and a positive lens component; and a second lens unit having a positive refractive power and comprising a positive lens component which includes a plurality of lens elements, a total number of the lens components included in the first lens unit and the second lens unit being three, a space between the lens units changing during zooming from a wide-angle end to a telephoto end or during focusing.

Other characteristics and advantages of the present invention will become apparent from the detailed description given below, drawings and/or appended claims.

BRIEF DESCRIPTION OF THE DRAWINGS

FIG. 1A shows a state in a wide-angle end, FIG. 1B shows an intermediate state, and FIG. 1C shows a state in a telephoto end;

FIG. 2A shows a state in a wide-angle end, FIG. 2B shows an intermediate state, and FIG. 2C shows a state in a telephoto end;

FIG. 3A shows a state in a wide-angle end, FIG. 3B shows an intermediate state, and FIG. 3C shows a state in a telephoto end;

FIG. 4A shows a state in a wide-angle end, FIG. 4B shows an intermediate state, and FIG. 4C shows a state in a telephoto end;

FIG. 5A shows a state in a wide-angle end, FIG. 5B shows an intermediate state, and FIG. 5C shows a state in a telephoto end;

FIG. 6A shows a state in a wide-angle end, FIG. 6B shows an intermediate state, and FIG. 6C shows a state in a telephoto end;

FIG. 7A shows a state in a wide-angle end, FIG. 7B shows an intermediate state, and FIG. 7C shows a state in a telephoto end;

FIG. 8A shows a state in a wide-angle end, FIG. 8B shows an intermediate state, and FIG. 8C shows a state in a telephoto end;

FIG. 9A shows a state in a wide-angle end, FIG. 9B shows an intermediate state, and FIG. 9C shows a state in a telephoto end;

FIG. 10A shows a state in a wide-angle end, FIG. 10B shows an intermediate state, and FIG. 10C shows a state in a telephoto end;

FIG. 11A shows a state in a wide-angle end, FIG. 11B shows an intermediate state, and FIG. 11C shows a state in a telephoto end;

FIG. 12A shows a state in a wide-angle end, FIG. 12B shows an intermediate state, and FIG. 12C shows a state in a telephoto end;

FIG. 13A shows a state in a wide-angle end, FIG. 13B shows an intermediate state, and FIG. 13C shows a state in a telephoto end;

FIG. 14A shows a state in a wide-angle end, FIG. 14B shows an intermediate state, and FIG. 14C shows a state in a telephoto end;

FIG. 15A shows a state in a wide-angle end, FIG. 15B shows an intermediate state, and FIG. 15C shows a state in a telephoto end;

FIG. 16A shows a state in a wide-angle end, FIG. 16B shows an intermediate state, and FIG. 16C shows a state in a telephoto end;

FIG. 17A shows a state in a wide-angle end, FIG. 17B shows an intermediate state, and FIG. 17C shows a state in a telephoto end;

FIG. 18A shows a state in a wide-angle end, FIG. 18B shows an intermediate state, and FIG. 18C shows a state in a telephoto end;

FIG. 19A shows a state in a wide-angle end, FIG. 19B shows an intermediate state, and FIG. 19C shows a state in a telephoto end;

FIG. 20A shows a state in a wide-angle end, FIG. 20B shows an intermediate state, and FIG. 20C shows a state in a telephoto end;

FIG. 21A shows a state in a wide-angle end, FIG. 21B shows an intermediate state, and FIG. 21C shows a state in a telephoto end;

FIG. 22A shows a state in a wide-angle end, FIG. 22B shows an intermediate state, and FIG. 22C shows a state in a telephoto end;

FIG. 23A shows a state in a wide-angle end, FIG. 23B shows an intermediate state, and FIG. 23C shows a state in a telephoto end;

FIG. 24A shows a state in a wide-angle end, FIG. 24B shows an intermediate state, and FIG. 24C shows a state in a telephoto end;

FIG. 25A shows a state in a wide-angle end, FIG. 25B shows an intermediate state, and FIG. 25C shows a state in a telephoto end;

FIG. 26A shows a state in a wide-angle end, FIG. 26B shows an intermediate state, and FIG. 26C shows a state in a telephoto end;

FIG. 27A shows a state in a wide-angle end, FIG. 27B shows an intermediate state, and FIG. 27C shows a state in a telephoto end;

FIG. 28A shows a state in a wide-angle end, FIG. 28B shows an intermediate state, and FIG. 28C shows a state in a telephoto end;

FIG. 29 is a front perspective view showing the digital camera, FIG. 30 is a rear perspective view of the digital camera, and FIG. 31 is a conceptual diagram showing an inner constitution of the digital camera;

FIG. 33 is a front perspective view showing a state in which a cover of the personal computer is opened, FIG. 34 is a sectional view showing a photographing optical system incorporated in the personal computer, and FIG. 35 is a side view showing the state of FIG. 33;

FIG. 36 is a front view of the cellular phone, FIG. 37 is a side view, and FIG. 38 is a sectional view of a photographing optical system;

FIG. 39 is a front perspective view showing an appearance of the camera, FIG. 40 is a back view, and FIG. 41 is a conceptual diagram showing an inner constitution of the digital camera;

DETAILED DESCRIPTION

Figure 1A:
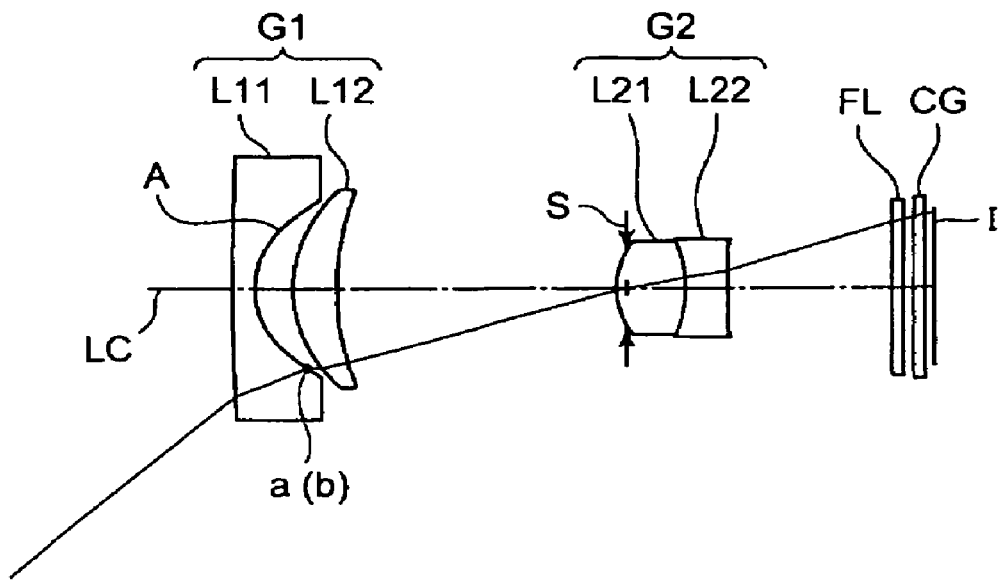
FIGS. 1A to 1C are sectional views along an optical axis, showing an optical constitution of a zoom lens system in Example 1 of the present invention.

The present invention will become more fully understood from the detailed description given below and the accompanying drawings, which are given by way of illustration only and thus are not limitative of the present invention.

First, a first type of zoom lens system will be described.

The first type of zoom lens system comprises, in order from an object side:

a first lens unit including two lens components; and a second lens unit including one lens component, the number of the lens components included in the first lens unit and the second lens unit being three in total, during zooming from a wide-angle end to a telephoto end, at least a space between the first lens unit and the second lens unit changing, the first lens unit and the second lens unit including aspherical surfaces, at least one aspherical surface of the first lens unit satisfying the following condition (1):

$$R_1/h_1 < 1.35 \tag{1},$$

wherein $R_1$ denotes a paraxial radius of curvature of the at least one aspherical surface, and $h_1$ denotes a length from a first intersection between a chief ray reaching a point of maximum image height on an image surface and the at least one aspherical surface to an optical axis in the wide-angle end at a time when the chief ray enters the zoom lens system with an angle of incidence equal to or larger than 36 degrees and passes through the at least one aspherical surface.

Here, the lens component means a single lens or a cemented lens which comes into contact with air by only two air contact surfaces of the incidence surface and the exit surface in the clear aperture and which does not have any air space between the surfaces.

In this zoom lens system, the at least one aspherical surface preferably satisfies the following condition (2), $$R_1/h_2 < 1.2 \tag{2},$$

wherein $h_2$ denotes a length from a second intersection between a chief ray reaching a point of maximum image height on an image surface and the at least one aspherical surface to an optical axis in the wide-angle end at a time when the chief ray enters the zoom lens system with an angle of incidence equal to or larger than 40 degrees and passes through the at least one aspherical surface.

Moreover, in the zoom lens system, the first lens unit includes a negative lens component having a concave surface on the image side, and the concave surface is constituted of the at least one aspherical surface.

Furthermore, in the zoom lens system, the at least one aspherical surface preferably has a shape which satisfies the following conditions (3) and (4):

$$0.35 < Z_1/h_1 < 1.0 \tag{3};$$

and $$1.01 < \{h_1^2 + (R_1 - Z_1)^2\}/R_1^2 < 1.5 \tag{4},$$

wherein $Z_1$ denotes a length from a vertex of the at least one aspherical surface to the first intersection in the optical axis direction.

In addition, in the zoom lens system, the at least one aspherical surface preferably has a shape which satisfies the following conditions (5) and (6):

$$0.45 < Z_2/h_2 < 1.0 \tag{5};$$

and $$1.05 < \{h_2^2 + (R_1 - Z_2)^2\}/R_1^2 < 1.5 \tag{6},$$

wherein $Z_2$ denotes a length from the vertex of the at least one aspherical surface to the second intersection in the optical axis direction, and $h_2$ denotes a length from a second intersection between a chief ray reaching a point of maximum image height on an image surface and the at least one aspherical surface to an optical axis in the wide-angle end at a time when the chief ray enters the zoom lens system with an angle of incidence equal to or larger than 40 degrees and passes through the at least one aspherical surface.

Moreover, in the zoom lens system, the first lens unit preferably has a negative refractive power as a whole, and the object-side lens component of the first lens unit is constituted of a negative lens component having a concave surface on the image side. An absolute value of the paraxial radius of curvature of the concave surface of the negative lens component is smaller than that of the paraxial radius of curvature of any lens surface of the first lens unit that comes into contact with air. The image-side lens component of the first lens unit is constituted of a positive lens component having a meniscus shape which directs the convex surface on the object side, and the second lens unit has a positive refractive power as a whole. The lens component of the second lens unit has a convex surface on the object side, and an absolute value of the paraxial radius of curvature of the convex surface of the lens component of the second lens unit is smaller than that of the paraxial radius of curvature of any lens surface of the second lens unit that comes into contact with air.

Furthermore, the zoom lens system preferably satisfies the following conditions (7) and (8):

$$2.0 < f_2/IH < 2.5 \tag{7}$$

and $$5.0 < L_W/IH < 9.0 \tag{8},$$

wherein $f_2$ denotes a focal length of the second lens unit, and $L_W$ denotes a length to an image forming surface from a vertex of a lens surface closest to the object side in the zoom lens system, and IH denotes an image height. When an electronic image sensor is used for receiving the image formed by the zoom lens system, the image height IH means a half of a diagonal length of an effective image pickup region of the image sensor. The effective image pickup region is regarded as the maximum region of an area of the light receiving surface of the image sensor for use in printing or displaying the image.

In addition, in the zoom lens system, the at least one aspherical surface is preferably a concave surface of the negative lens component, and the at least one aspherical surface is formed into such shape that the negative refractive power decreases with distance from the optical axis.

Moreover, in the zoom lens system, the absolute value of the paraxial radius of curvature of the incidence surface of the lens component on the object side in the first lens unit is larger than that of the paraxial radius of curvature of any lens surface in the first lens unit that comes into contact with air.

Furthermore, the zoom lens system is preferably a two-unit zoom lens system.

In addition, the zoom lens system preferably includes a third lens unit having one positive lens component, and is a three-unit zoom lens system including three lens units as a whole.

Moreover, in the zoom lens system, preferably both of an incidence-side surface and an exit-side surface of the lens component in the second lens unit are aspherical surfaces, and each aspherical surface is formed into such shape that the positive refractive power weakens with distance from the optical axis.

Furthermore, in the zoom lens system, each lens component of the first lens unit is preferably constituted of a single lens, and the lens component of the second lens unit is constituted of one cemented lens having a positive lens and a negative lens.

In addition, in the zoom lens system, the lens component of the second lens unit is preferably a cemented lens including a positive lens and a negative lens in order from the object side, and the surfaces of the lens component closest to the object side and the image side in the second lens unit have convex shapes on the optical axis, respectively.

Moreover, in the zoom lens system, an aperture stop is preferably disposed between the first lens unit and the second lens unit, and the aperture stop moves in the same direction as a direction in which the second lens unit moves with respect to the image surface during the zooming.

Furthermore, in the zoom lens system, the aperture stop is preferably disposed on the image side of the vertex of the incidence surface of the second lens unit, and the aperture size is constant.

In addition, in the zoom lens system, preferably during the zooming from the wide-angle end to the telephoto end, the first lens unit once moves toward the image side, and thereafter moves toward the object side, and the second lens unit moves so as to come close to the first lens unit.

As described above, the first type of zoom lens system has a basic constitution including, in order from the object side, at least the first lens unit having two lens component and the second lens unit having one lens component, and the zoom lens system changes the space between the lens units to thereby perform the zooming.

In this basic constitution, when the first lens unit is constituted of two lens components, and the second lens unit is constituted of one lens component, the number of the lens components constituting the zoom lens system can be reduced. This can realize a constitution in which the thickness of the zoom lens system when collapsed can easily be reduced.

Moreover, the constitution is advantageous in respect of weight reduction and miniaturization.

Furthermore, according to a constitution in which the first and second lens units have aspherical lens surface, respectively, a coma of an off-axial light flux can mainly satisfactorily be corrected in the first lens unit. In the second lens unit, an axial or off-axial light flux can satisfactorily be converged. Further, spherical aberration and coma are satisfactorily reduced.

In addition, when the condition (1) is satisfied, the shape of the at least one aspherical surface can be designed so as to reduce the coma and an astigmatism over the whole zooming range while keeping a wide angle of field.

If the value of $R_1/h_1$ is above the upper limit of the condition (1), the paraxial radius of curvature of the at least one aspherical surface increases (or an incidence position of the off-axial light flux upon the at least one aspherical surface relatively lowers), and it becomes difficult to distinguish between the function of the aspherical surface with respect to the axial light flux and that of the aspherical surface with respect to the off-axial light flux. This deteriorates the function of correcting the coma and the astigmatism by the at least one aspherical surface.

The condition (1) is more preferably changed to the following condition (1-1):

$$R_1/h_1 < 1.3 \tag{1-1}.$$

Moreover, the condition (1) may be changed to the following condition (1-2):

$$0.5 < R_1/h_1 < 1.35 \tag{1-2}.$$

If the value of $R_1/h_1$ is below the lower limit of the condition (1-2), the paraxial radius of curvature excessively decreases, and correction of a spherical aberration in the telephoto end in which the diameter of an axial light flux is large is not easily balanced with the correction of coma and astigmatism in the wide-angle end.

It is to be noted that the upper limit value of the condition (1-2) is more preferably set to 1.3. It is further preferable that the upper limit value is set to 1.1.

Moreover, the lower limit value of the condition (1-2) is more preferably set to 0.7. It is further preferable that the lower limit value is set to 0.9.

Furthermore, the at least one aspherical surface preferably satisfies the following condition (2):

$$R_1/h_2 < 1.2 \tag{2},$$

wherein $R_1$ denotes a paraxial radius of curvature of the at least one aspherical surface, and $h_2$ denotes the length from the second intersection between a chief ray reaching a point of maximum image height on an image surface and the at least one aspherical surface to an optical axis in the wide-angle end at a time when the chief ray enters the zoom lens system with an angle of incidence equal to or larger than 40 degrees and passes through the at least one aspherical surface.

In a case where the above condition (2) is satisfied, even when a wider angle of field is imparted to the zoom lens system, the shape of the at least one aspherical surface can be designed so as to reduce coma and astigmatism.

If the value of $R_1/h_2$ is above the upper limit of the condition (2), the paraxial radius of curvature of the at least one aspherical surface enlarges (or the incidence position of the off-axial light flux upon the at least one aspherical surface relatively lowers), and it becomes difficult to distinguish between the function of the aspherical surface with respect to the axial light flux and that of the aspherical surface with respect to the off-axial light flux. This deteriorates the function of correcting coma and astigmatism by the at least one aspherical surface.

Moreover, the condition (2) is more preferably changed to the following condition (2-1):

$$R_1/h_2<1.1 \quad (2\text{-}1).$$

Furthermore, the condition (2) may be changed to the following condition (2-2):

$$0.5<R_1/h_2<1.2 \quad (2\text{-}2).$$

If the value of $R_1/h_2$ is below the lower limit of the condition (2-2), the paraxial radius of curvature excessively decreases, and the correction of spherical aberration in the telephoto end in which the diameter of the axial light flux is large is not easily balanced with the correction of coma and astigmatism in the wide-angle end.

It is to be noted that the upper limit value of the condition (2-2) is more preferably set to 1.1. It is further preferable that the upper limit value is set to 1.07.

Moreover, the lower limit value of the condition (2-2) is more preferably set to 0.7. It is further preferable that the lower limit value is set to 0.9.

The first lens unit preferably includes a negative lens component. When the image-side surface of this negative lens component is formed into a concave surface, the chief ray having an angle of field of 36 degrees or more, further 40 degrees or more can be passed while securing the negative refractive power of the first lens unit.

Moreover, when the concave surface of the image-side surface of the negative lens component of the first lens unit is constituted of the at least one aspherical surface, it is possible to satisfactorily correct the aberration of the off-axial light flux.

Furthermore, it is preferable that the at least one aspherical surface satisfies both of the following conditions (3) and (4):

$$0.35<Z_1/h_1<1.0 \quad (3);$$

and $$1.01<\{h_1^2+(R_1-Z_1)^2\}/R_1^2<1.5 \quad (4),$$

wherein $Z_1$ denotes the length from the vertex of the at least one aspherical surface to the first intersection in an optical axis direction.

The condition (3) defines the depth of the at least one aspherical surface.

If the value of $Z_1/h_1$ is above the upper limit of the condition (3), there increases a difference between the refraction given to the axial light flux by the at least one aspherical surface and the refraction given to an off-axial light flux having a large incidence angle. Therefore, the burden imposed on another surface in correcting the aberration increases, and it becomes difficult to correct the aberration in the other lens surfaces with a good balance. Alternatively, spherical aberration is not easily balanced with the off-axial aberration on the telephoto side.

On the other hand, if the value of $Z_1/h_1$ is below the lower limit of the condition (3), the at least one aspherical surface becomes shallow, and the incidence angle of the chief ray, which corresponds to a wide angle of field (36 degrees or more), onto the at least one aspherical surface becomes large. Therefore, it becomes difficult to obtain an effect of correcting the off-axial aberration by the aspherical surface.

It is to be noted that the upper limit value of the condition (3) is more preferably set to 0.8. It is further preferable that the upper limit value is set to 0.7.

Moreover, the lower limit value of the condition (3) is more preferably set to 0.4.

The condition (4) defines the order of amount of the aspherical surface.

If the value of $\{h_1^2+(R_1-Z_1)^2\}/R_1^2$ is above the upper limit of the condition (4), the difference enlarges between the refraction given to the axial light flux by the at least one aspherical surface and the refraction given to the off-axial light flux having a large incidence angle. Therefore, the burden imposed on the other surface in correcting the aberration increases, and it becomes difficult to balance the aberration. Alternatively, spherical aberration is not easily balanced with the off-axial aberration on the telephoto side.

On the other hand, if the value of $\{h_1^2+(R_1-Z_1)^2\}/R_1^2$ is below the lower limit of the condition (4), the effect of correcting the off-axial aberration deteriorates.

It is to be noted that the upper limit value of the condition (4) is more preferably set to 1.4. It is further preferable that the upper limit value is set to 1.3.

Moreover, the lower limit value of the condition (4) is more preferably set to 1.05. It is further preferable that the lower limit value is set to 1.1.

Furthermore, the aspherical surface preferably satisfies both of the following conditions (5) and (6):

$$0.45<Z_2/h_2<1.0 \quad (5);$$

and $$1.05<\{h_2^2+(R_1-Z_2)^2\}/R_1^2<1.5 \quad (6),$$

wherein $Z_2$ denotes a length from the vertex of the at least one aspherical surface to the second intersection in the optical axis direction.

The condition (5) defines the depth of the at least one aspherical surface.

If the value of $Z_2/h_2$ is above the upper limit of the condition (5), the difference enlarges between the refraction given to the axial light flux by the at least one aspherical surface and the refraction given to the off-axial light flux having a large incidence angle. Therefore, the burden imposed on another surface in correcting the aberration increases, and it becomes difficult to correct the aberration in the other lens surfaces with a good balance. Alternatively, spherical aberration is not easily balanced on the telephoto side.

On the other hand, if the value of $Z_2/h_2$ is below the lower limit of the condition (5), the at least one aspherical surface becomes shallow, and the incidence angle of the chief ray, which corresponds to a wide angle of field (40 degrees or more), onto the at least one aspherical surface becomes large. Therefore, it becomes difficult to obtain the effect of correcting the off-axial aberration by the aspherical surface.

It is to be noted that the upper limit value of the condition (5) is more preferably set to 0.8. It is further preferable that the upper limit value is set to 0.7.

Moreover, the lower limit value of the condition (5) is more preferably set to 0.5. It is further preferable that the lower limit value is set to 0.53.

The condition (6) defines the order of amount of the aspherical surface.

If the value of $\{h_2^2+(R_1-Z_2)^2\}/R_1^2$ is above the upper limit of the condition (6), the difference enlarges between the refraction given to the axial light flux and the refraction given to the off-axial light flux having a large incidence angle. Therefore, the burden imposed on the other surface in correcting the aberration increases, and it becomes difficult to balance the aberration. Alternatively, spherical aberration is not easily balanced with the off-axial aberration on the telephoto side.

On the other hand, if the value of $\{h_2^2+(R_1-Z_2)^2\}/R_1^2$ is below the lower limit of the condition (6), the effect of correcting the off-axial aberration deteriorates.

It is to be noted that the upper limit value of the condition (6) is more preferably set to 1.4. It is further preferable that the upper limit value is set to 1.3.

Moreover, the lower limit value of the condition (6) is more preferably set to 1.1. It is further preferable that the lower limit value is set to 1.13.

Furthermore, in the zoom lens system, when the first lens unit has a negative refractive power as a whole, and the second lens unit has a positive refractive power as a whole, the first lens unit can have a function of broadening the angle of field, and this is advantageous in reducing the diameter of the first lens unit even when the zoom lens system has a wide angle of field.

In addition, when the first lens unit is constituted of a negative lens component and a positive lens component in order from the object side, the first lens unit can have a function like a wide converter.

Moreover, since the position of the principal point can be brought closer to the object, the constitution is advantageous in reducing the diameter of the first lens unit.

Furthermore, when the first lens unit is constituted so as to include a lens component having a different sign of the refractive power as described above, it is possible to correct the chromatic aberration in the first lens unit.

In addition, when the first lens unit is constituted of the negative lens component and the positive lens component in order from the object side as described above, the first lens unit can secure a necessary negative power while correcting the coma and the astigmatism.

Moreover, in the zoom lens system, the second lens unit is constituted of a lens component having a convex surface on the object side, and an absolute value of the paraxial radius of curvature of the convex surface is smaller than that of the paraxial radius of curvature of any lens surface in the second lens unit that comes into contact with air. In this case, it is possible to immediately reduce a degree of divergence of the axial light flux which diverges in the first lens unit and enters the second lens unit. Alternatively, the axial light flux which diverges in the first lens unit can be converged and enters the second lens unit. Therefore, this constitution is advantageous for the miniaturization of the second lens unit.

Furthermore, the zoom lens system preferably satisfies both of the following conditions (7) and (8):

$$2.0 < f_2/IH < 2.5 \quad (7);$$

and $$5.0 < L_W/IH < 9.0 \quad (8),$$

wherein $f_2$ denotes a focal length of the second lens unit, and $L_W$ denotes a length to the image forming surface from the vertex of the lens surface closest to the object side in the zoom lens system, and IH denotes an image height. When an electronic image sensor is used for receiving the image formed by the zoom lens system, the image height IH means a half of a diagonal length of an effective image pickup region of the image sensor.

The condition (7) defines the focal length of the second lens unit.

If the value of $f_2/IH$ is above the upper limit of the condition (7), it becomes difficult to enlarge the angle of field while keeping the zoom lens system to be small-sized. An outer diameter of the first lens unit enlarges, and it becomes difficult to correct the aberration by two lens components in the first lens unit.

On the other hand, if the value of $f_2/IH$ is below the lower limit of the condition (7), it becomes difficult to sufficiently correct coma generated in the second lens unit.

It is to be noted that the upper limit value of the condition (7) is more preferably set to 2.4. It is further preferable that the upper limit value is set to 2.35.

It is to be noted that the lower limit value of the condition (7) is more preferably set to 2.1. It is further preferable that the lower limit value is set to 2.15.

The condition (8) defines the total length of the zoom lens system in the wide-angle end.

If the value of $L_W/IH$ is above the upper limit of the condition (8), the total length of the zoom lens system enlarges.

On the other hand, if the value of $L_W/IH$ is below the lower limit of the condition (8), the total length of the zoom lens system in the wide-angle end can be reduced, but the diameter of the second lens unit in the telephoto end easily enlarges, and this constitution is disadvantageous in miniaturizing the lens barrel.

It is to be noted that the upper limit value of the condition (8) is more preferably set to 8.5.

Moreover, the lower limit value of the condition (8) is more preferably set to 6.0. It is further preferable that the lower limit value is set to 7.5.

Furthermore, in the zoom lens system, the concave surface of the negative lens component of the first lens unit is constituted of the at least one aspherical surface, and the at least one aspherical surface is formed into such shape that the negative refractive power is reduced with distance from the optical axis. In this case, the negative refractive power can be secured on the optical axis, and it is possible to reduce fluctuations of the incidence angle of the light flux incident on the surface at a wide angle of field. Further, the aberration such as coma can sufficiently be corrected.

In addition, in the zoom lens system, the absolute value of the paraxial radius of curvature of the incidence surface of the lens component on the object side in the first lens unit is set to be larger than that of the paraxial radius of curvature of any lens surface in the first lens unit that comes into contact with air. In this case, it is possible to reduce the fluctuations of the incidence angle of the off-axial light flux incident on the lens surface closest to the object side. This constitution can be advantageous in correcting coma.

Moreover, when the incidence surface of the lens component on the object side in the first lens unit is constituted as described above, the off-axial light flux has a larger incidence angle upon the incidence surface. Therefore, the constitution contributes to generation of negative distortion, and a photographing region easily enlarges.

It is to be noted that when an electronic image sensor such as a CCD image sensor or a CMOS image sensor is used as the image sensor, the distortion can be corrected by signal processing. Therefore, when the negative distortion is intentionally generated, and the photographing region is enlarged to suppress another aberration, it is possible to realize miniaturization and performance enhancement. Even in a case where the distortion of an image in which the negative distortion is generated is corrected by the signal processing, an image quality of the center of the image surface is not easily deteriorated. Therefore, when the image sensor has pixels to a certain degree, any practical problem is not generated.

Furthermore, when the zoom lens system is constituted of a two-unit zoom lens system, the number of the lens components involved in the zooming is three in total. Therefore, the constitution is advantageous in the miniaturization.

Moreover, the zoom lens system may additionally include a third lens unit having one positive lens component, and may be constituted as a three-unit zoom lens system. This constitution is advantageous in securing telecentricity.

Furthermore, the positive lens component constituting the third lens unit may be constituted of a single lens. The third lens unit may be constituted so as to move during the zooming.

In addition, in the zoom lens system, the incidence-side surface of the lens component in the second lens unit is constituted of an aspherical surface formed into such shape that the positive refractive power weakens with distance from the optical axis. According to this constitution, the positive refractive power can be weakened in the peripheral portion of the off-axial light flux, and spherical aberration and coma can be corrected. In a case where the aspherical surface is disposed on the incidence-side surface of the lens component in the second lens unit on which the light flux is concentrated, spherical aberration and coma can effectively be corrected.

Moreover, in the zoom lens system, the exit side surface of the lens component in the second lens unit is constituted of an aspherical surface formed into such shape that the positive refractive power weakens with distance from the optical axis. In this case, since the axial light flux is appropriately separated from the off-axial light flux in the position of this aspherical surface, a correcting effect with respect to the axial light flux can be differentiated from that with respect to the off-axial light flux. As a result, coma and astigmatism can satisfactorily be corrected.

Furthermore, in the zoom lens system, when two lens components of the first lens unit are constituted of single lenses, respectively, the number of the lenses of the first lens unit can be reduced, and the constitution can be advantageous in forming the system to be compact.

In addition, in the zoom lens system, when the second lens unit is constituted of one cemented lens including the positive lens and the negative lens, aberrations including chromatic aberration can advantageously be corrected.

Moreover, in the zoom lens system, the lens component of the second lens unit is constituted of a cemented lens including a positive lens and a negative lens in order from the object side, and the surfaces of the lens component closest to the object side and the image side in the second lens unit are formed into convex shapes, respectively, on the optical axis. In this case, miscellaneous aberrations can satisfactorily be corrected while maintaining the positive refractive power required for the second lens unit.

Furthermore, in the zoom lens system, when an aperture stop is disposed between the first lens unit and the second lens unit, the size of the first lens unit is easily balanced with that of the second lens unit.

That is, if the aperture stop is disposed in the first lens unit or on the object side of the first lens unit, the diameter of the second lens unit enlarges on the wide-angle side, and the off-axial aberration is easily generated in the second lens unit.

On the other hand, if the aperture stop is disposed in the second lens unit or on the image side of the second lens unit, the diameter of the first lens unit enlarges, and the off-axial aberration is easily generated in the first lens unit.

Moreover, the aperture stop is disposed between the first lens unit and the second lens unit, a ray emitted from the second lens unit comes close to a parallel state to the optical axis as compared with a case where the aperture stop is disposed between the lens surfaces of the second lens unit or on the image side of the second lens unit. This constitution can be advantageous in bringing the incident light flux close to a perpendicular state with respect to the image surface.

Furthermore, an aperture stop having a certain aperture size is disposed on the image side of the vertex of the incidence surface of the second lens unit (i.e., the aperture stop is disposed so that the vertex of the incidence surface of the second lens unit protrudes from the aperture of the aperture stop toward the object side). This constitution can be advantageous in further reducing the length between the first lens unit and the second lens unit in the telephoto end.

In addition, when the aperture stop having the certain aperture size is disposed as described above, the length between the first lens unit and the second lens unit in the telephoto end can be reduced in the zoom lens system having, in order from the object side, the first lens unit having the negative refractive power and the second lens unit having the positive refractive power. Therefore, the zooming ratio of the zoom lens system can further be large.

Moreover, the above arrangement of the aperture stop having the certain aperture size can be advantageous in reducing the thickness of the system when collapsed.

Furthermore, in the zoom lens system, the image-side surface of the first lens unit is constituted of a concave surface, and the object-side surface of the second lens unit is constituted of a convex surface. This constitution can be advantageous in further reducing the thickness of the system when collapsed.

In addition, in the zoom lens system, during the zooming from the wide-angle end to the telephoto end, the first lens unit is moved so as to once moves toward the image side and thereafter moves toward the object side, and the second lens unit is moved so as to reduce the length between the first lens unit and the second lens unit. In this case, the second lens unit can have a zooming function whereas change of the length from the first lens unit to the image surface can be suppressed.

In consequence, telecentricity is easily secured on the exit side of the aperture stop, and the ray incident on the image sensor can come close to the perpendicular state. These characteristics of the zoom lens system are advantageous in a case where the system is mounted for use on an electronic image pickup apparatus such as a digital camera or a video camera including an electronic image sensor having a light receiving surface to convert an optical image into an electric signal.

In the zoom lens system, during the focusing from infinity to the minimum focus distance, one or both of the first lens unit and the second lens unit may be moved toward the object side, or the image sensor may be moved so as to increase the length between the lens units and the image sensor. The third lens unit to be moved for the focusing may be disposed on the image side of the second lens unit.

In implementation of the present invention, the zoom lens system can be constituted to satisfy the above constitutions and conditions alone or an appropriate combination of them. In such case, the above-described effects can be obtained alone or in combination.

There will be described hereinafter numerical examples of the zoom lens system of the present invention with reference to the drawings.

EXAMPLE 1

Figure 1B:
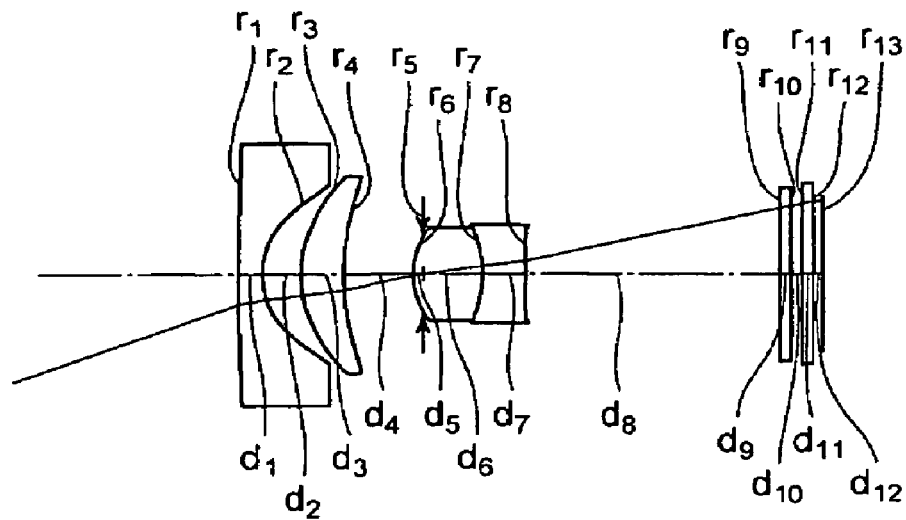
Figure 1C:
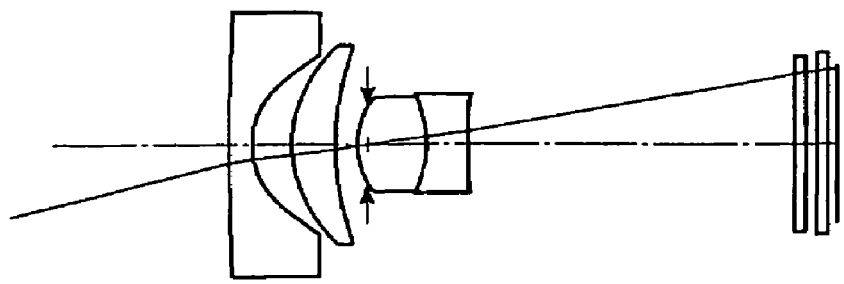
Figure 2A:
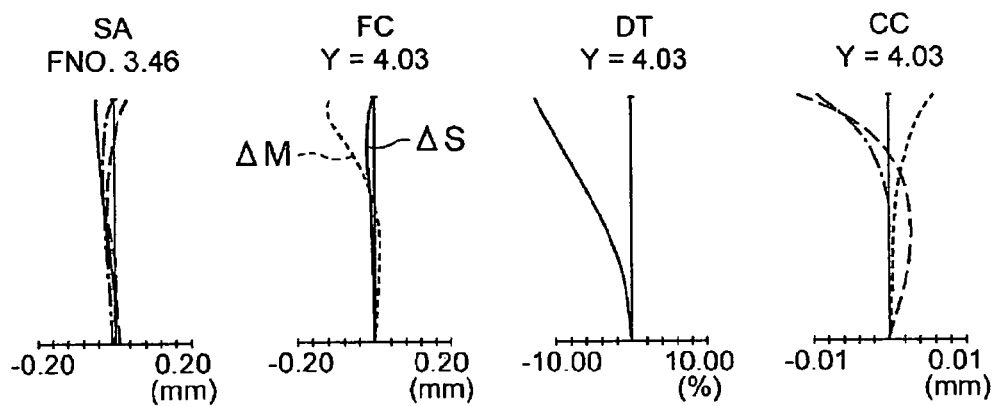
FIGS. 2A to 2C are diagrams showing a spherical aberration SA, an astigmatism FC, a distortion DT and a chromatic aberration CC of magnification when focused on an infinite object in Example 1.
Figure 2B:
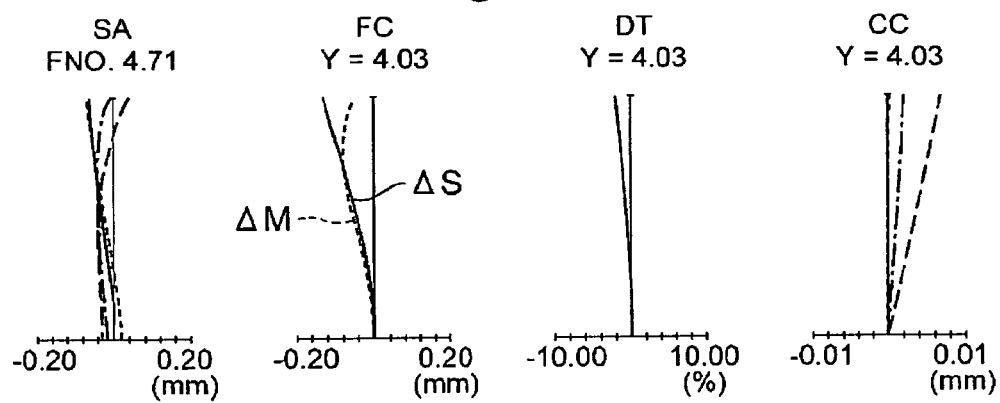
Figure 2C:
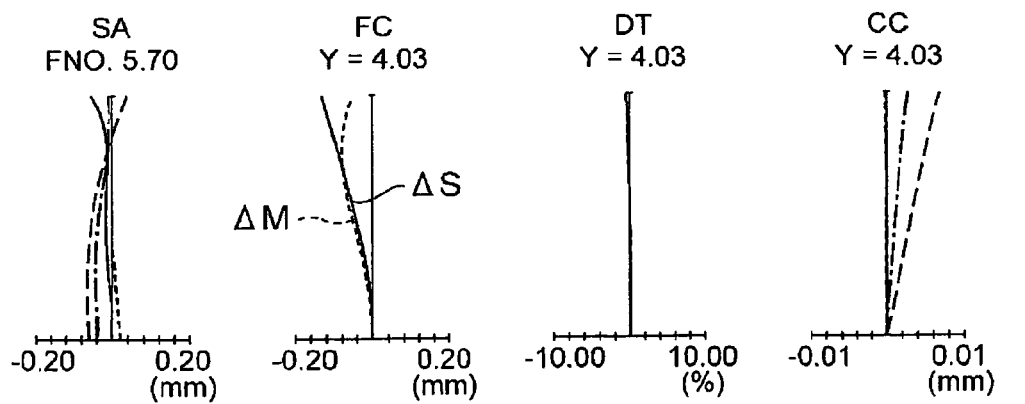

FIGS. 1A to 1C show sectional views along an optical axis, showing an optical constitution of a zoom lens system in Example 1 of the present invention, FIG. 1A shows a state in a wide-angle end, FIG. 1B shows an intermediate state, and FIG. 1C shows a state in a telephoto end. FIGS. 2A to 2C are diagrams showing a spherical aberration SA, an astigmatism FC, a distortion DT and a chromatic aberration CC of magnification when the zoom lens system is focused on an infinite object in Example 1, FIG. 2A shows a state in the wide-angle end, FIG. 2B shows an intermediate state, and FIG. 2C shows a state in the telephoto end.

As shown in FIGS. 1A to 1C, the zoom lens system of Example 1 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

In the drawings, character A denotes the at least one aspherical surface. As to a ray, a chief ray is shown which enters the zoom lens system from the object side and reaches the point of maximum image height on the image surface. In FIG. 1A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that an object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 1A) toward the telephoto end (FIG. 1C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 1.

Here, in the numerical data, R denotes a curvature radius (mm) of the surface of each optical member, D denotes a thickness of each optical member or an air space (mm) between the members, Nd denotes a refractive index of each optical member at the wavelength (587.6 nm) of d-line, and Vd denotes the Abbe number of each optical member at the wavelength (587.6 nm) of d-line. Moreover, f denotes a focal length of the zoom lens system, IH denotes an image height (a length corresponding to a half of a diagonal length of the effective image pickup region, Y denotes a radius of an image circle of the zoom lens system, FNO denotes the F number, and 2ω denotes an angle of field. Furthermore, WE denotes a wide-angle end, ST denotes an intermediate state, and TE denotes a telephoto end.

Moreover, the shape of an aspherical surface which is rotationally symmetrical with respect to the optical axis is represented by the following equation in a coordinate system in which it is assumed that an optical axis direction is a z-axis, a direction crossing the optical axis at right angles is a y-axis, and an intersection between the z-axis and the y-axis is an origin:

$$z = (y^2/r)/[1+\{1-(1+k)(y/r)^2\}^{1/2}] + A_4 y^4 + A_6 y^6 + A_8 y^8 + A_{10} y^{10} + \ldots$$

wherein k denotes a conic coefficient, and $A_4, A_6, A_8$ and $A_{10}$ are aspherical coefficients.

In the table of the aspherical coefficients, e means multiplication by the power of 10. For example, the aspherical coefficient $A_4$ of the second surface is described as 1.62770e-3, and this means $1.62770 \times 10^{-3}$. These symbols are common to numerical data of Example 2 and the subsequent examples described later.

TABLE 1

Numerical Data 1

| Surface | R | D | Nd | Vd |
|---|---|---|---|---|
| 1 | 200.901 | 1.05 | 1.69350 | 53.21 |
| 2* | 3.918 | 1.71 | | |
| 3 | 6.920 | 2.00 | 1.75520 | 27.51 |

TABLE 1-continued

Numerical Data 1

| Surface | R | D | Nd | Vd |
|---|---|---|---|---|
| 4 | 15.556 | D4 | | |
| 5(AS) | ∞ | −0.50 | | |
| 6* | 3.770 | 3.19 | 1.49700 | 81.61 |
| 7 | −6.504 | 1.88 | 1.68893 | 31.08 |
| 8* | −50.825 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 2

Aspherical coefficient

| Surface | k | $A_4$ | $A_6$ | $A_8$ | $A_{10}$ |
|---|---|---|---|---|---|
| 2 | −1.331 | 1.62770e−3 | 2.32516e−7 | 9.71956e−9 | 0 |
| 6 | −0.114 | −7.69894e−5 | 7.72669e−7 | 5.50870e−6 | −4.96447e−7 |
| 8 | 0.000 | 3.13161e−3 | 3.13219e−4 | −2.35235e−5 | 8.20802e−6 |

TABLE 3

Zoom Data

| | WE | ST | TE |
|---|---|---|---|
| f (mm) | 4.846 | 10.000 | 14.052 |
| FNO | 3.46 | 4.71 | 5.70 |
| 2ω | 83.41° | 42.27° | 30.40° |
| IH | 3.8 | 3.8 | 3.8 |
| Y | 4.03 | 4.03 | 4.03 |
| D4 | 13.31 | 4.02 | 1.50 |
| D8 | 7.40 | 11.58 | 14.90 |

EXAMPLE 2

Figure 3A:
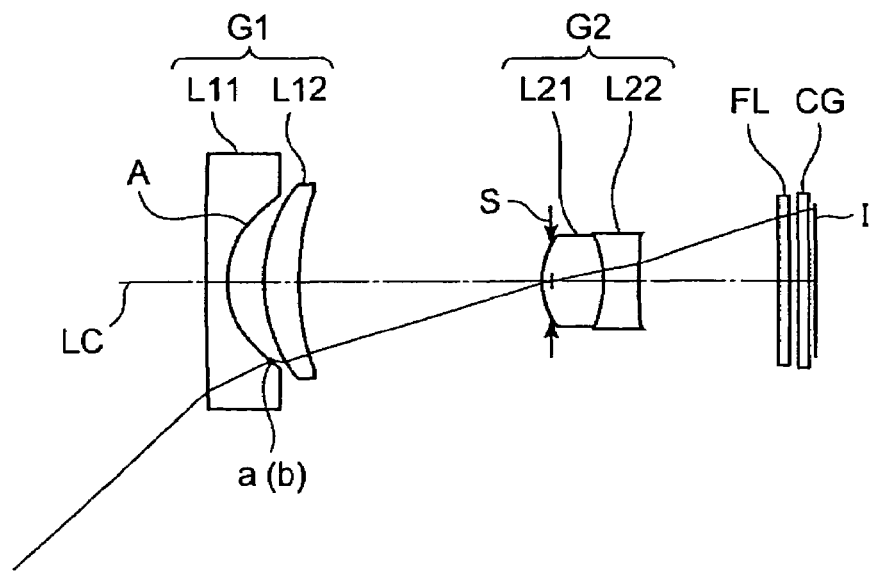
FIGS. 3A to 3C are sectional views along an optical axis, showing an optical constitution of a zoom lens system in Example 2 of the present invention.
Figure 3B:
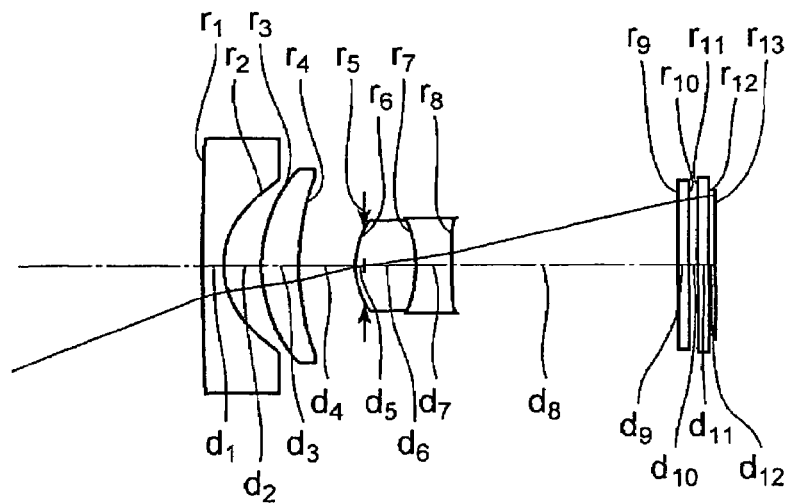
Figure 3C:
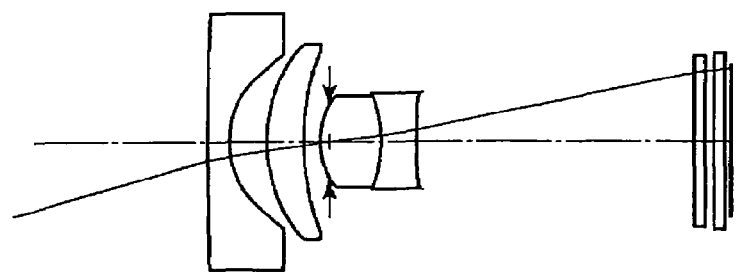
Figure 4A:
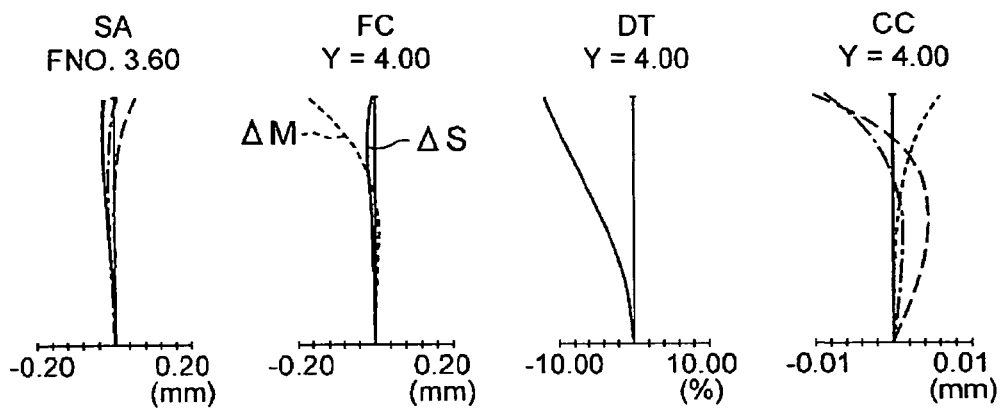
FIGS. 4A to 4C are diagrams showing a spherical aberration SA, an astigmatism FC, a distortion DT and a chromatic aberration CC of magnification when focused on an infinite object in Example 2.
Figure 4B:
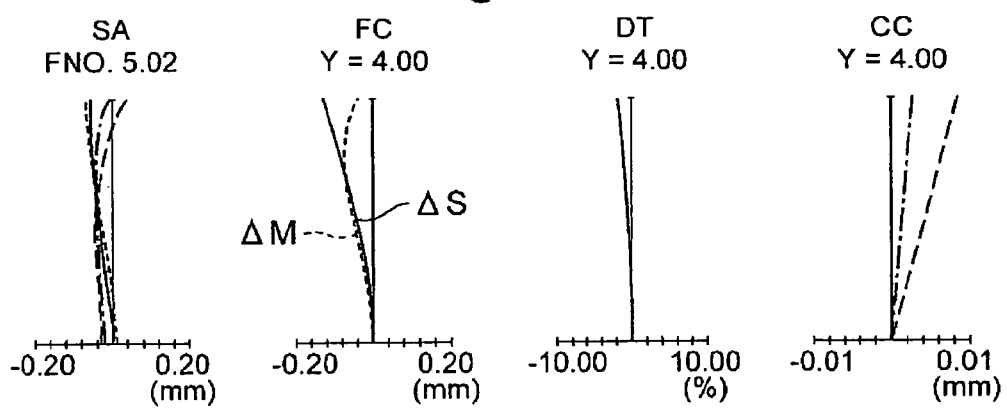
Figure 4C:
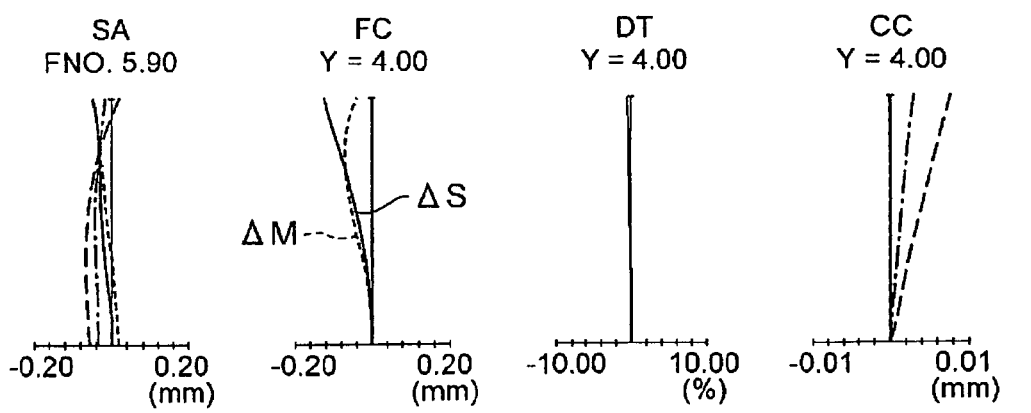

FIGS. 3A to 3C show sectional views along an optical axis, showing an optical constitution of a zoom lens system in Example 2, FIG. 3A shows a state in a wide-angle end, FIG. 3B shows an intermediate state, and FIG. 3C shows a state in a telephoto end. FIGS. 4A to 4C are diagrams showing a spherical aberration SA, an astigmatism FC, a distortion DT and a chromatic aberration CC of magnification when focused on an infinite object in Example 2, FIG. 4A shows a state in the wide-angle end, FIG. 4B shows an intermediate state, and FIG. 4C shows a state in the telephoto end.

As shown in FIGS. 3A to 3C, the zoom lens system of Example 2 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 3A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that an object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 3A) toward the telephoto end (FIG. 3C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 2.

TABLE 4

Numerical Data 2

| Surface | R | D | Nd | Vd |
|---|---|---|---|---|
| 1 | 66.272 | 1.05 | 1.74320 | 49.34 |
| 2* | 4.042 | 2.01 | | |
| 3 | 7.392 | 2.00 | 1.84666 | 23.78 |
| 4 | 13.998 | D4 | | |
| 5(AS) | ∞ | −0.50 | | |
| 6* | 3.718 | 3.20 | 1.49700 | 81.61 |
| 7 | −5.741 | 1.94 | 1.68893 | 31.08 |
| 8* | −36.913 | D8 | | |

TABLE 4-continued

Numerical Data 2

| Surface | R | D | Nd | Vd |
|---|---|---|---|---|
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 5

Aspherical coefficient

| Surface | k | $A_4$ | $A_6$ | $A_8$ | $A_{10}$ |
|---|---|---|---|---|---|
| 2 | −1.389 | 1.60987e−3 | 3.02423e−7 | 7.98708e−9 | 0 |
| 6 | −0.116 | −1.03147e−4 | 7.85406e−7 | 5.03254e−6 | −4.94245e−7 |
| 8 | 0.000 | 3.14971e−3 | 3.24044e−4 | −2.52543e−5 | 8.18075e−6 |

TABLE 6

Zoom Data

| | WE | ST | TE |
|---|---|---|---|
| f (mm) | 4.603 | 10.000 | 13.358 |
| FNO | 3.60 | 5.02 | 5.90 |
| 2ω | 86.11° | 42.20° | 31.92° |
| IH | 3.8 | 3.8 | 3.8 |
| Y | 4.00 | 4.00 | 4.00 |
| D4 | 13.25 | 3.58 | 1.50 |
| D8 | 7.14 | 11.60 | 14.40 |

EXAMPLE 3

Figure 5A:
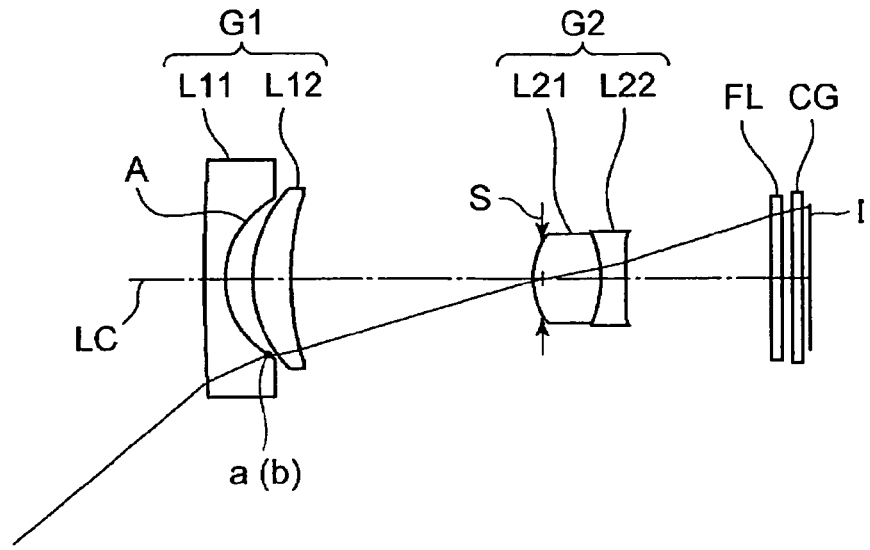
FIGS. 5A to 5C are sectional views along an optical axis, showing an optical constitution of a zoom lens system in Example 3 of the present invention.
Figure 5B:
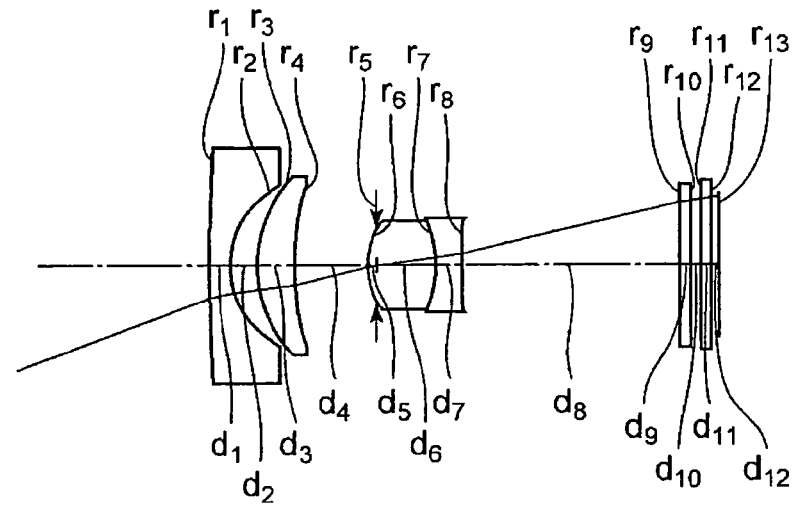
Figure 5C:
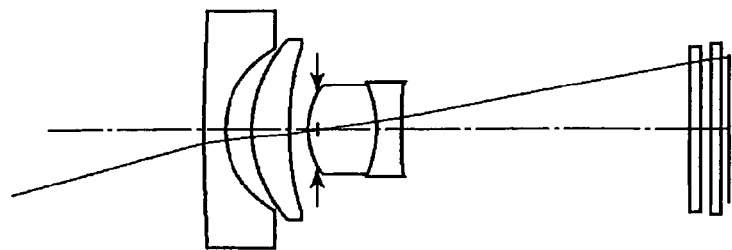
Figure 6A:
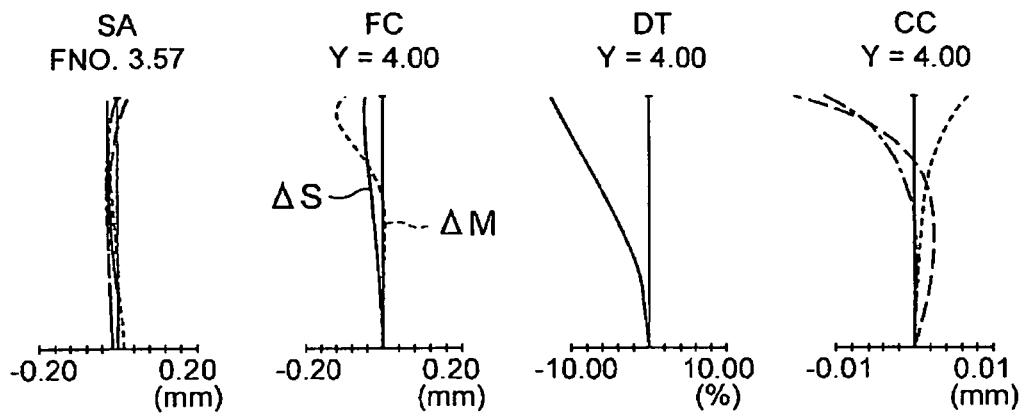
FIGS. 6A to 6C are diagrams showing a spherical aberration SA, an astigmatism FC, a distortion DT and a chromatic aberration CC of magnification when focused on an infinite object in Example 3.
Figure 6B:
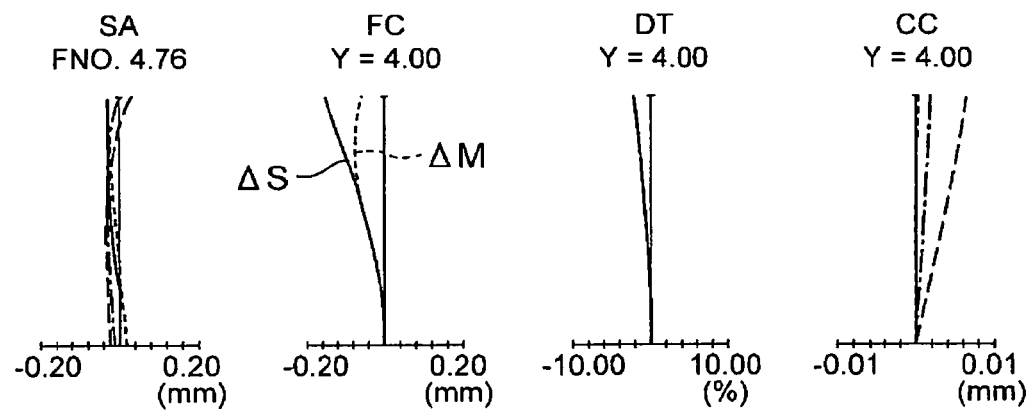
Figure 6C:
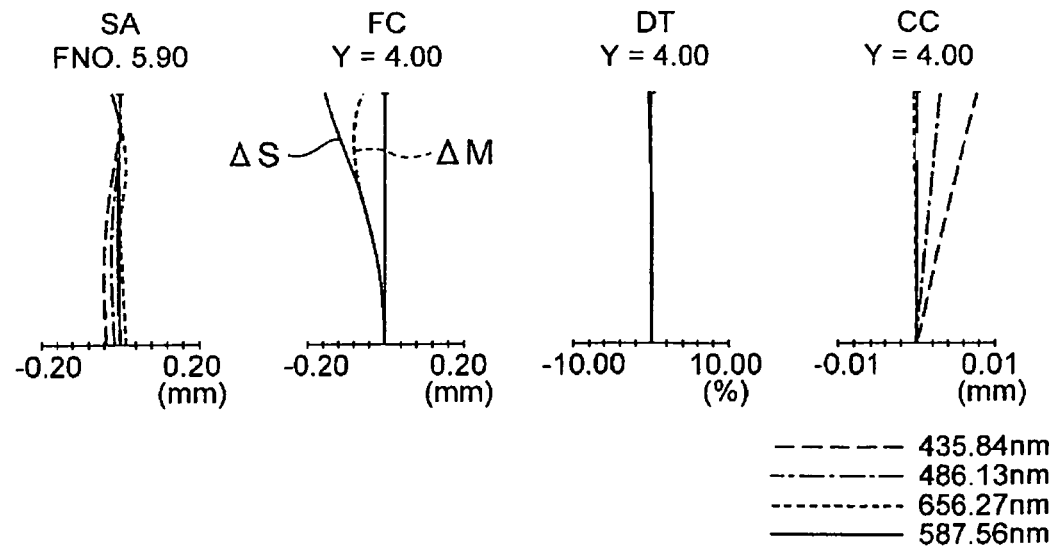

FIGS. 5A to 5C show sectional views along an optical axis, showing an optical constitution of a zoom lens system in Example 3, FIG. 5A shows a state in a wide-angle end, FIG. 5B shows an intermediate state, and FIG. 5C shows a state in a telephoto end. FIGS. 6A to 6C are diagrams showing a spherical aberration SA, an astigmatism FC, a distortion DT and a chromatic aberration CC of magnification when focused on an infinite object in Example 3, FIG. 6A shows a state in the wide-angle end, FIG. 6B shows an intermediate state, and FIG. 6C shows a state in the telephoto end.

As shown in FIGS. 5A to 5C, the zoom lens system of Example 3 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one spherical surface. As to a ray, a chief ray is shown which enters the zoom lens system from the object side and reaches the point of maximum image height on the image surface. In FIG. 5A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that the object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 5A) toward the telephoto end (FIG. 5C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 3.

TABLE 7

Numerical Data 3

| Surface | R | D | Nd | Vd |
|---|---|---|---|---|
| 1 | 63.991 | 1.05 | 1.80610 | 40.92 |
| 2* | 4.206 | 1.47 | | |
| 3 | 6.891 | 2.00 | 1.84666 | 23.78 |
| 4 | 15.686 | D4 | | |
| 5(AS) | ∞ | −0.50 | | |
| 6* | 3.793 | 3.59 | 1.49700 | 81.61 |
| 7 | −6.303 | 1.35 | 1.68893 | 31.08 |
| 8* | −47.625 | D8 | | |
| 9 | ∞ | 0.50 | 1.51633 | 64.14 |
| 10 | ∞ | 0.50 | | |
| 11 | ∞ | 0.50 | 1.51633 | 64.14 |

TABLE 7-continued

Numerical Data 3

| Surface | R | D | Nd | Vd |
|---|---|---|---|---|
| 12 | ∞ | 0.37 | | |
| 13(IS) | ∞ | | | |

*Aspherical surface AS: Aperture stop IS: Image surface

TABLE 8

Aspherical coefficient

| Surface | k | $A_4$ | $A_6$ | $A_8$ | $A_{10}$ |
|---|---|---|---|---|---|
| 2 | −1.470 | 1.68103e−3 | 3.44796e−7 | 3.85208e−9 | 0 |
| 6 | −0.097 | −1.17879e−4 | 8.08361e−7 | 5.03271e−6 | −4.94250e−7 |
| 8 | 0.000 | 3.14651e−3 | 3.24179e−4 | −2.52553e−5 | 8.18076e−6 |

TABLE 9

Zoom Data

| | WE | ST | TE |
|---|---|---|---|
| f (mm) | 5.078 | 10.000 | 14.727 |
| FNO | 3.57 | 4.76 | 5.90 |
| 2ω | 80.75° | 42.31° | 29.03° |
| IH | 3.8 | 3.8 | 3.8 |
| Y | 4.00 | 4.00 | 4.00 |
| D4 | 13.22 | 4.42 | 1.50 |
| D8 | 7.44 | 11.28 | 14.98 |

EXAMPLE 4

Figure 7A:
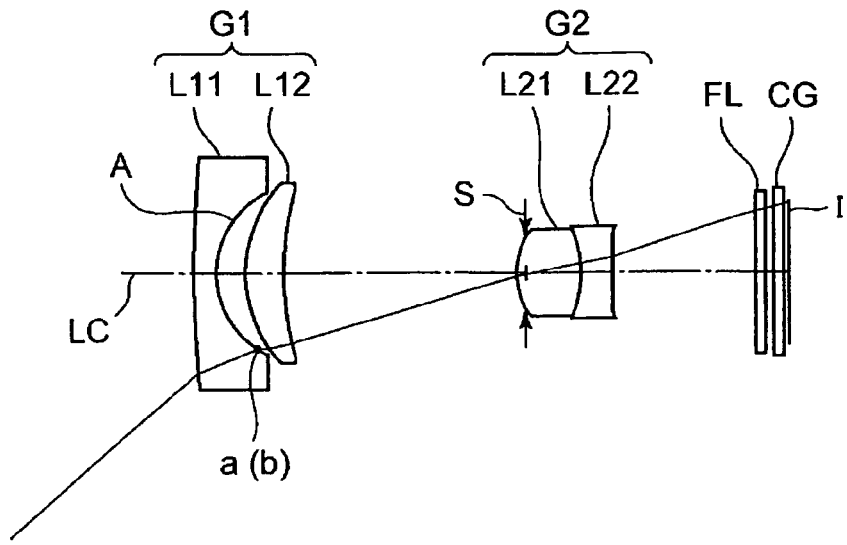
FIGS. 7A to 7C are sectional views along an optical axis, showing an optical constitution of a zoom lens system in Example 4 of the present invention.
Figure 7B:
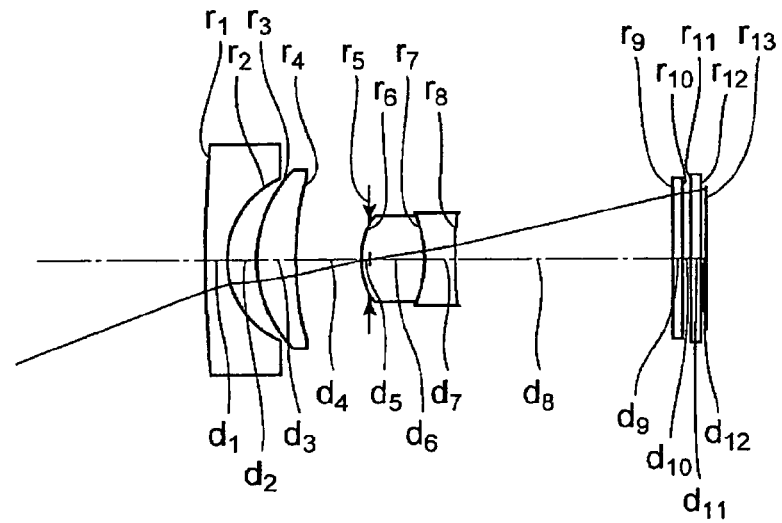
Figure 7C:
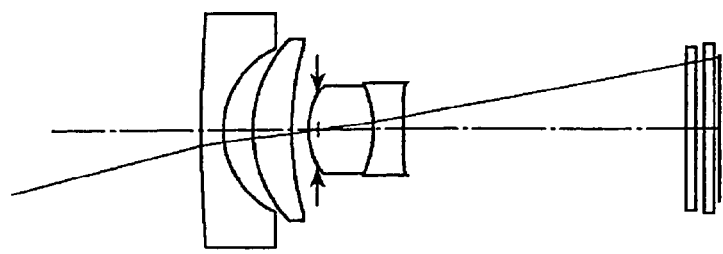
Figure 8A:
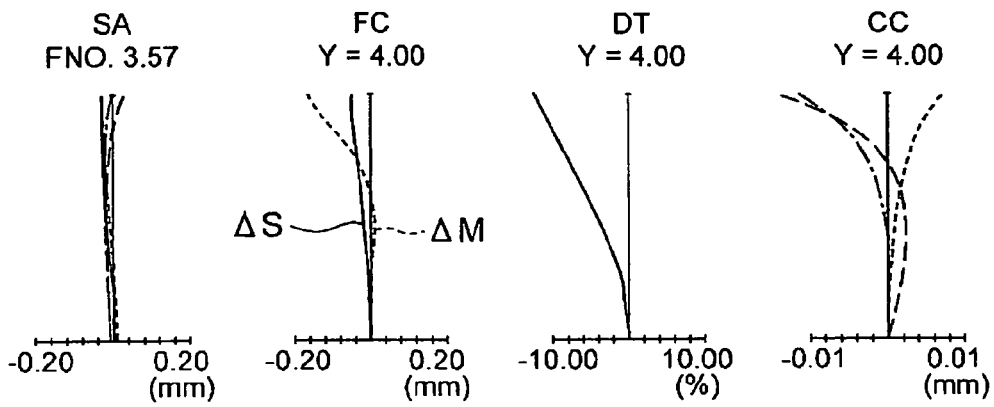
FIGS. 8A to 8C are diagrams showing a spherical aberration SA, an astigmatism FC, a distortion DT and a chromatic aberration CC of magnification when focused on an infinite object in Example 4.
Figure 8B:
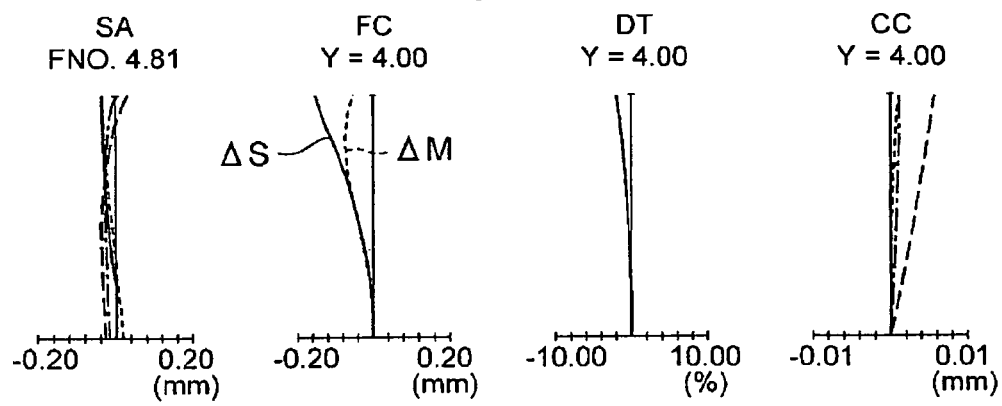
Figure 8C:
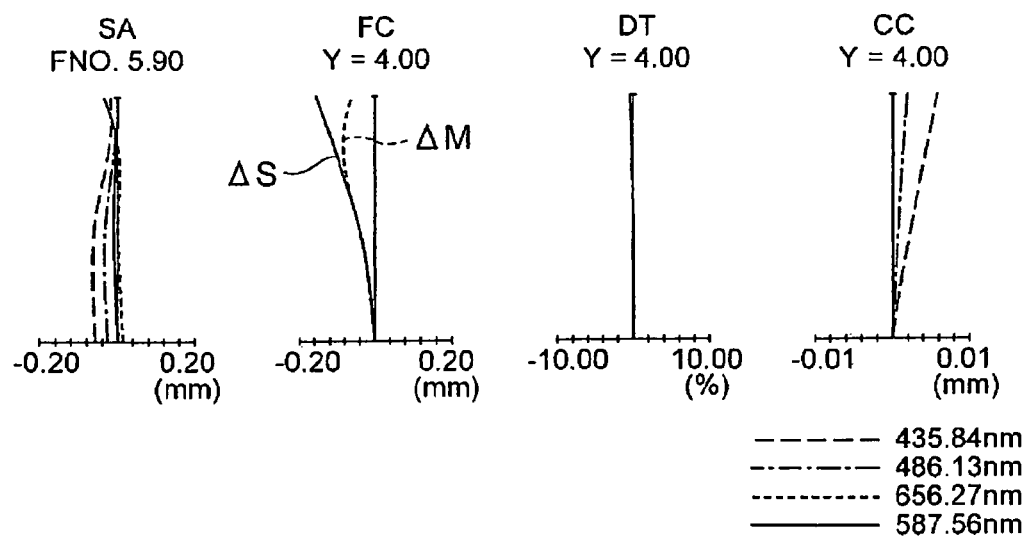

FIGS. 7A to 7C show sectional views along an optical axis, showing an optical constitution of a zoom lens system in Example 4, FIG. 7A shows a state in a wide-angle end, FIG. 7B shows an intermediate state, and FIG. 7C shows a state in a telephoto end. FIGS. 8A to 8C are diagrams showing a spherical aberration SA, an astigmatism FC, a distortion DT and a chromatic aberration CC of magnification when focused on an infinite object in Example 4, FIG. 8A shows a state in the wide-angle end, FIG. 8B shows an intermediate state, and FIG. 8C shows a state in the telephoto end.

As shown in FIGS. 7A to 7C, the zoom lens system of Example 4 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 7A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that an object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 7A) toward the telephoto end (FIG. 7C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 4.

TABLE 10

Numerical Data 4

| Surface | R | D | Nd | Vd |
|---|---|---|---|---|
| 1 | 60.415 | 1.05 | 1.80610 | 40.92 |
| 2* | 4.190 | 1.55 | | |
| 3 | 6.958 | 2.00 | 1.80810 | 22.76 |
| 4 | 16.192 | D4 | | |
| 5(AS) | ∞ | −0.50 | | |
| 6* | 3.773 | 3.36 | 1.49700 | 81.61 |
| 7 | −6.313 | 1.61 | 1.68893 | 31.08 |
| 8* | −46.363 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 11

Aspherical coefficient

| Surface | k | A4 | A6 | A8 | A10 |
|---|---|---|---|---|---|
| 2 | −1.453 | 1.65375e−3 | 3.61571e−7 | 4.33113e−9 | |
| 6 | −0.090 | −1.30702e−4 | 7.14693e−7 | 5.03276e−6 | −4.94251e−7 |
| 8 | 0.000 | 3.15231e−3 | 3.24186e−4 | −2.52554e−5 | 8.18076e−6 |

TABLE 12

Zoom Data

| | WE | ST | TE |
|---|---|---|---|
| f (mm) | 4.974 | 10.000 | 14.425 |
| FNO | 3.57 | 4.81 | 5.90 |
| 2ω | 81.90° | 42.30° | 29.64° |
| IH | 3.8 | 3.8 | 3.8 |
| Y | 4.00 | 4.00 | 4.00 |
| D4 | 13.09 | 4.20 | 1.50 |
| D8 | 7.44 | 11.45 | 15.00 |

EXAMPLE 5

Figure 9A:
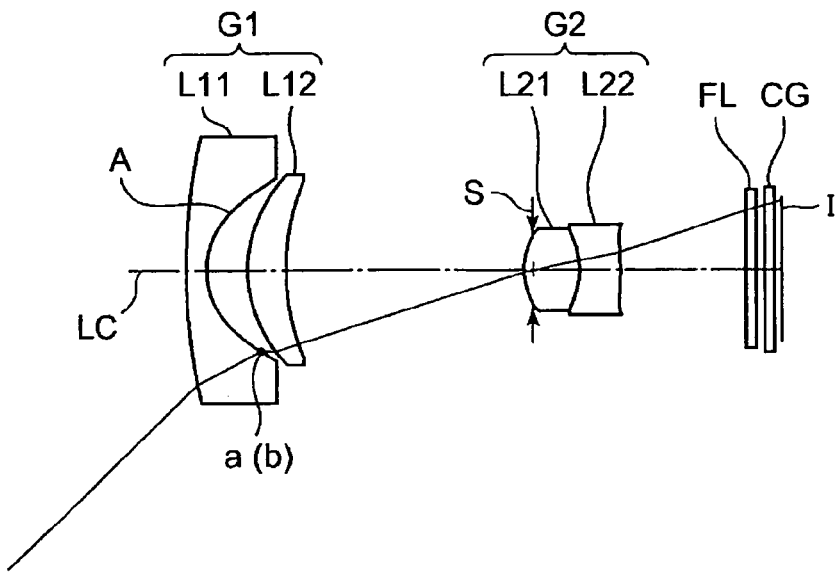
FIGS. 9A to 9C are sectional views along an optical axis, showing an optical constitution of a zoom lens system in Example 5 of the present invention.
Figure 9B:
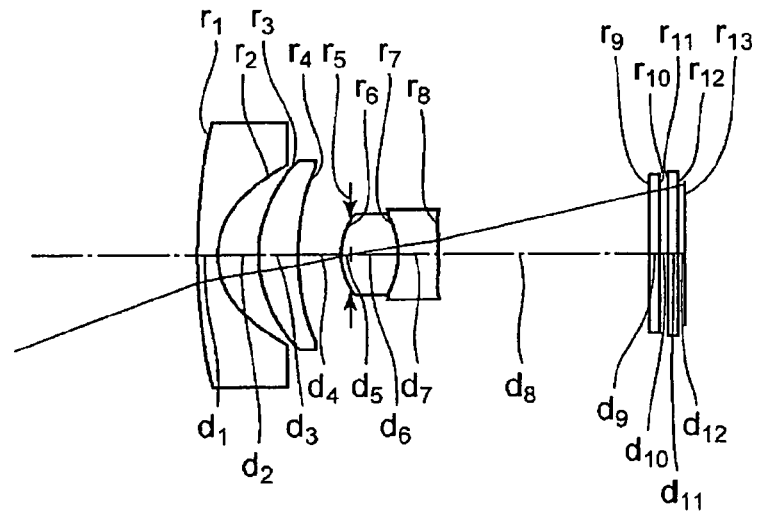
Figure 9C:
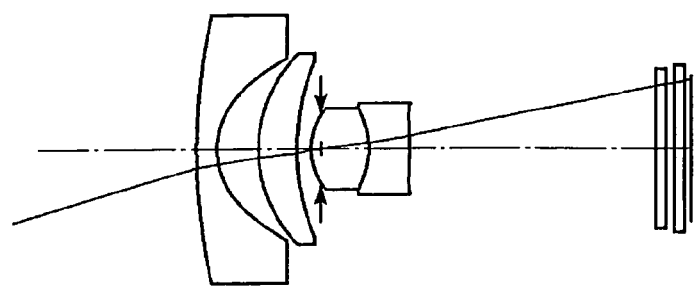
Figure 10A:
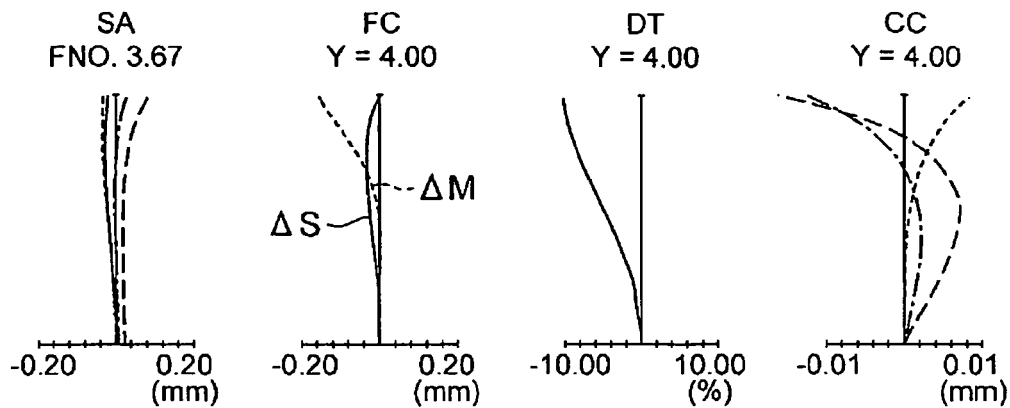
FIGS. 10A to 10C are diagrams showing a spherical aberration SA, an astigmatism FC, a distortion DT and a chromatic aberration CC of magnification when focused on an infinite object in Example 5.
Figure 10B:
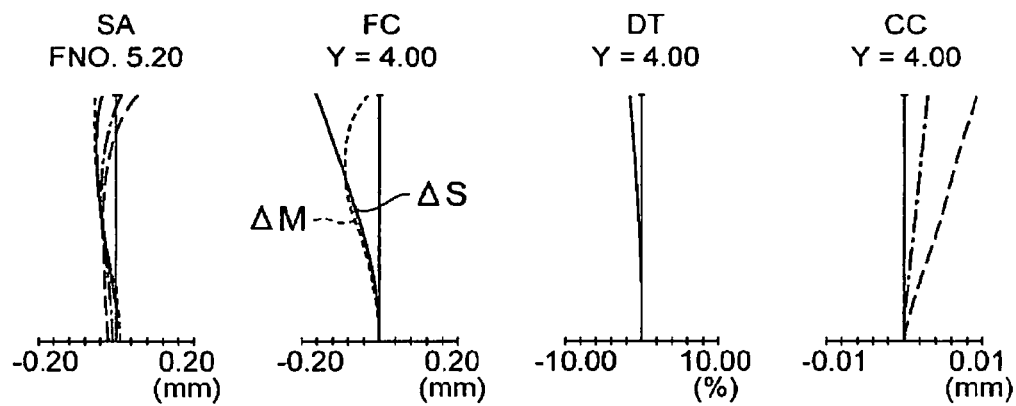
Figure 10C:
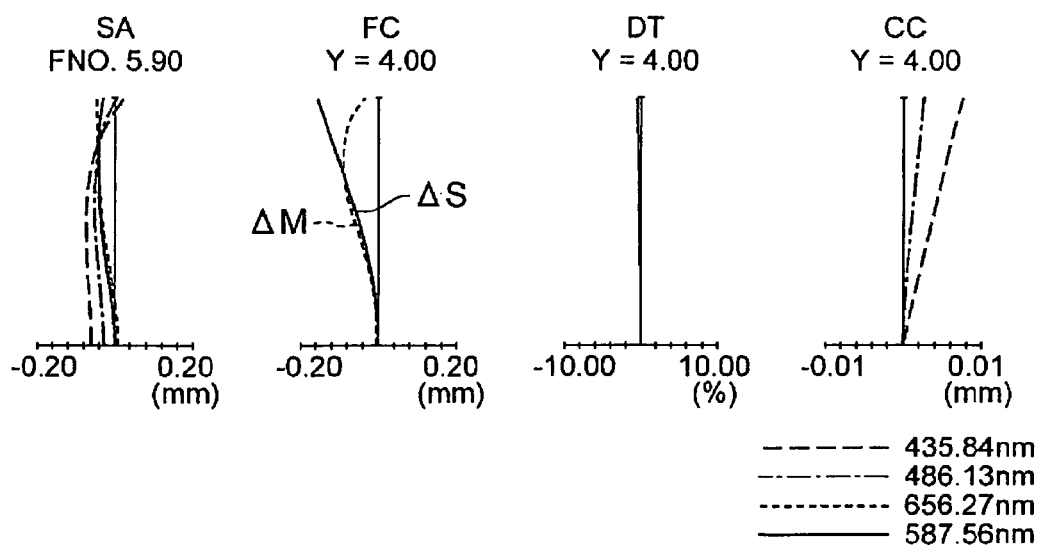

FIGS. 9A to 9C show sectional views along an optical axis, showing an optical constitution of a zoom lens system in Example 5, FIG. 9A shows a state in a wide-angle end, FIG. 9B shows an intermediate state, and FIG. 9C shows a state in a telephoto end. FIGS. 10A to 10C are diagrams showing a spherical aberration SA, an astigmatism FC, a distortion DT and a chromatic aberration CC of magnification when focused on an infinite object in Example 5, FIG. 10A shows a state in the wide-angle end, FIG. 10B shows an intermediate state, and FIG. 10C shows a state in the telephoto end.

As shown in FIGS. 9A to 9C, the zoom lens system of Example 5 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 9A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that the object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 9A) toward the telephoto end (FIG. 9C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 5.

TABLE 13

Numerical Data 5

| Surface | R | D | Nd | Vd |
|---|---|---|---|---|
| 1 | 34.439 | 1.05 | 1.80610 | 40.92 |
| 2* | 4.134 | 2.19 | | |
| 3 | 7.484 | 2.00 | 1.92286 | 18.90 |
| 4 | 12.537 | D4 | | |
| 5(AS) | ∞ | −0.50 | | |
| 6* | 3.664 | 3.09 | 1.49700 | 81.61 |
| 7 | −4.880 | 2.11 | 1.68893 | 31.08 |
| 8* | −25.118 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 14

Aspherical coefficient

| Surface | k | A4 | A6 | A8 | A10 |
|---|---|---|---|---|---|
| 2 | −1.461 | 1.69886e−3 | 1.38587e−7 | 7.97660e−8 | 0 |
| 6 | 0.000 | −4.06186e−4 | −1.03691e−6 | 4.55126e−6 | −9.92644e−7 |
| 8 | 0.000 | 3.01522e−3 | 3.97987e−4 | −3.18342e−5 | 7.23335e−6 |

TABLE 15

Zoom Data

|  | WE | ST | TE |
|---|---|---|---|
| f (mm) | 4.331 | 10.000 | 12.559 |
| FNO | 3.67 | 5.20 | 5.90 |
| 2ω | 88.76° | 42.11° | 33.85° |
| IH | 3.8 | 3.8 | 3.8 |
| Y | 4.00 | 4.00 | 4.00 |
| D4 | 13.55 | 3.12 | 1.50 |
| D8 | 6.78 | 11.43 | 13.53 |

EXAMPLE 6

Figure 11A:
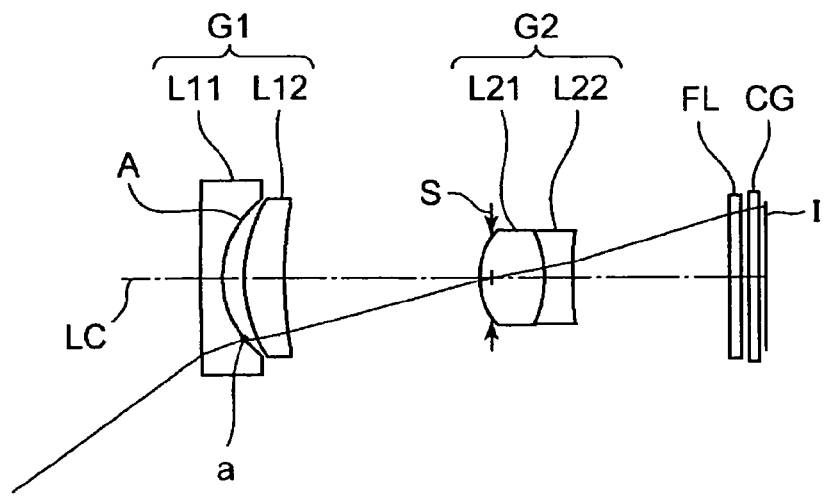
FIGS. 11A to 11C are sectional views along an optical axis, showing an optical constitution of a zoom lens system in Example 6 of the present invention.
Figure 11B:
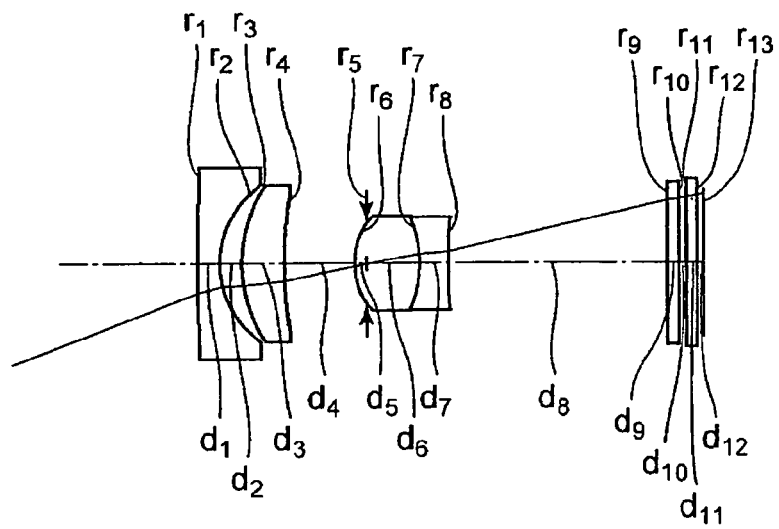
Figure 11C:
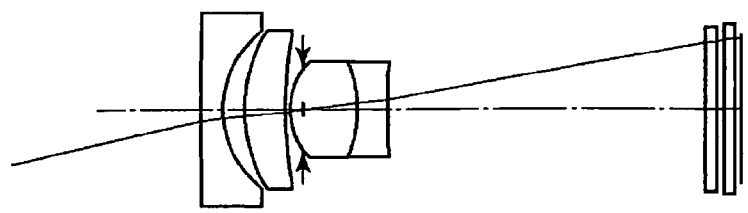
Figure 12A:
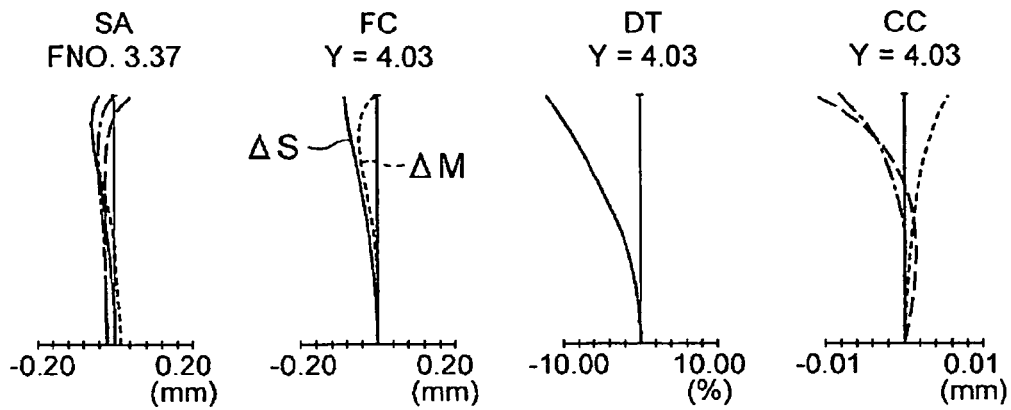
FIGS. 12A to 12C are diagrams showing a spherical aberration SA, an astigmatism FC, a distortion DT and a chromatic aberration CC of magnification when focused on an infinite object in Example 6.
Figure 12B:
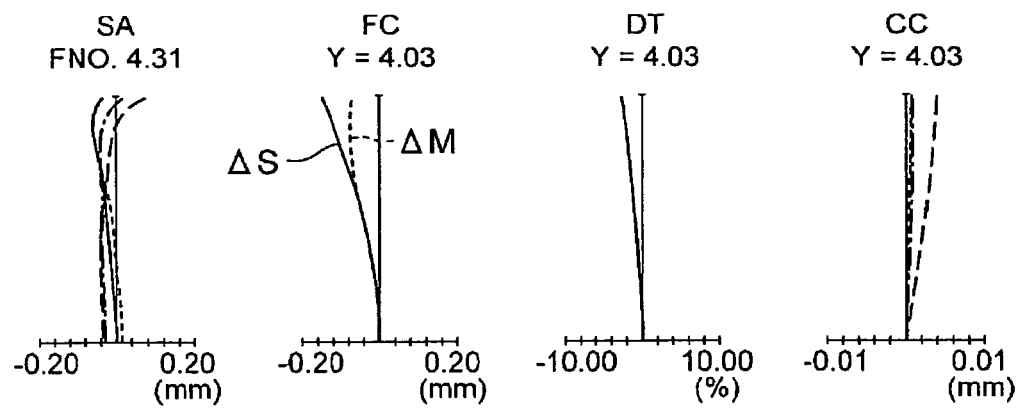
Figure 12C:
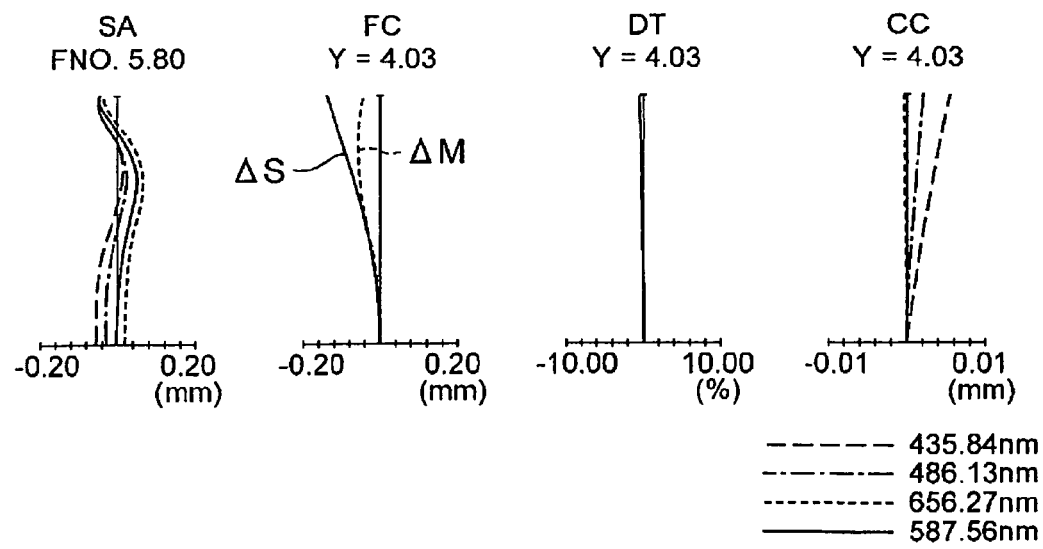

FIGS. 11A to 11C show sectional views along an optical axis, showing an optical constitution of a zoom lens system in Example 6, FIG. 11A shows a state in a wide-angle end, FIG. 11B shows an intermediate state, and FIG. 11C shows a state in a telephoto end. FIGS. 12A to 12C are diagrams showing a spherical aberration SA, an astigmatism FC, a distortion DT and a chromatic aberration CC of magnification when focused on an infinite object in Example 6, FIG. 12A shows a state in the wide-angle end, FIG. 12B shows an intermediate state, and FIG. 12C shows a state in the telephoto end.

As shown in FIGS. 11A to 11C, the zoom lens system of Example 6 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 11A, the point a denotes an intersection between the chief ray of maximum image height and the at least one aspherical surface A. In this example, since an incidence angle (angle formed by the chief ray with the optical axis Lc) of the chief ray of maximum image height does not exceed 40 degrees, a second intersection b does not exist.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that the object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 11A) toward the telephoto end (FIG. 11C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 6.

TABLE 16

Numerical Data 6

| Surface | R | D | Nd | Vd |
|---|---|---|---|---|
| 1 | 45490491.794 | 1.00 | 1.88300 | 40.76 |
| 2* | 4.374 | 1.19 | | |
| 3 | 7.457 | 2.20 | 2.00069 | 25.46 |
| 4 | 21.232 | D4 | | |
| 5(AS) | ∞ | −0.50 | | |
| 6* | 3.857 | 3.47 | 1.49700 | 81.61 |
| 7 | −6.375 | 1.44 | 1.68893 | 31.08 |
| 8* | −37.690 | D8 | | |
| 9 | ∞ | 0.50 | 1.54771 | 62.84 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 17

Aspherical coefficient

| Surface | k | A4 | A6 | A8 | A10 |
|---|---|---|---|---|---|
| 2 | −1.004 | 6.73565e−4 | 1.98908e−7 | 3.09992e−9 | 0 |
| 6 | −0.045 | −2.11882e−4 | 1.30949e−5 | 5.22912e−6 | −8.08996e−7 |
| 8 | 0.000 | 2.93782e−3 | 3.09559e−4 | −2.48524e−5 | 8.00739e−6 |

TABLE 18

Zoom Data

|  | WE | ST | TE |
|---|---|---|---|
| f (mm) | 5.765 | 10.000 | 16.720 |
| FNO | 3.37 | 4.31 | 5.80 |
| 2ω | 73.46° | 42.58° | 25.70° |
| IH | 3.8 | 3.8 | 3.8 |
| Y | 4.03 | 4.03 | 4.03 |

TABLE 18-continued

Zoom Data

|  | WE | ST | TE |
|---|---|---|---|
| D4 | 10.88 | 4.43 | 0.90 |
| D8 | 8.21 | 11.62 | 17.08 |

EXAMPLE 7

Figure 13A:
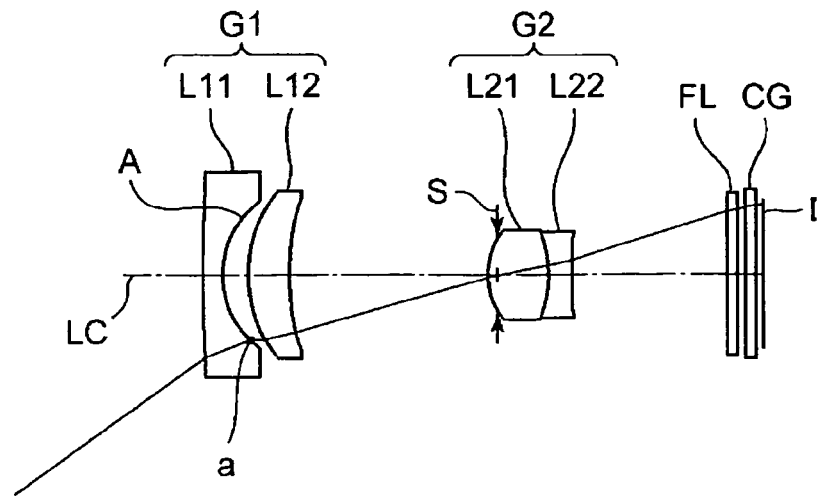
FIGS. 13A to 13C are sectional views along an optical axis, showing an optical constitution of a zoom lens system in Example 7 of the present invention.
Figure 13B:
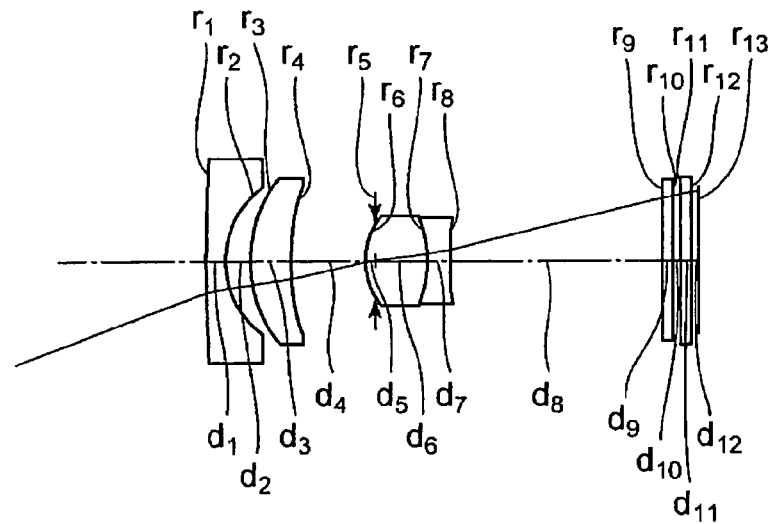
Figure 13C:
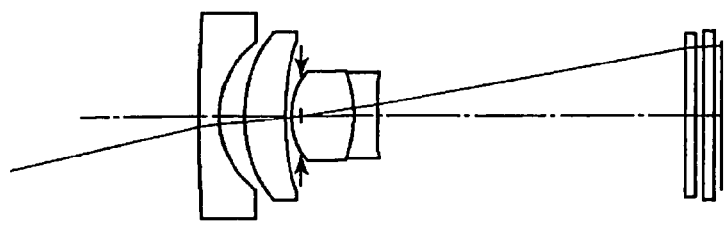
Figure 14A:
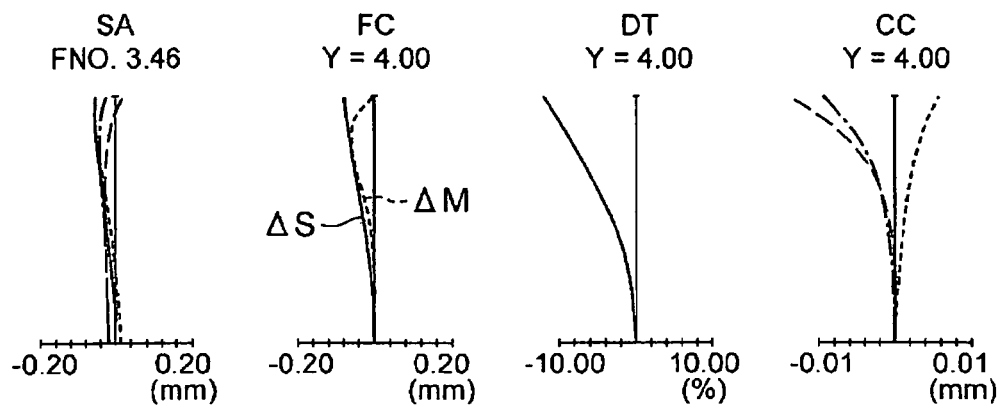
FIGS. 14A to 14C are diagrams showing a spherical aberration SA, an astigmatism FC, a distortion DT and a chromatic aberration CC of magnification when focused on an infinite object in Example 7.
Figure 14B:
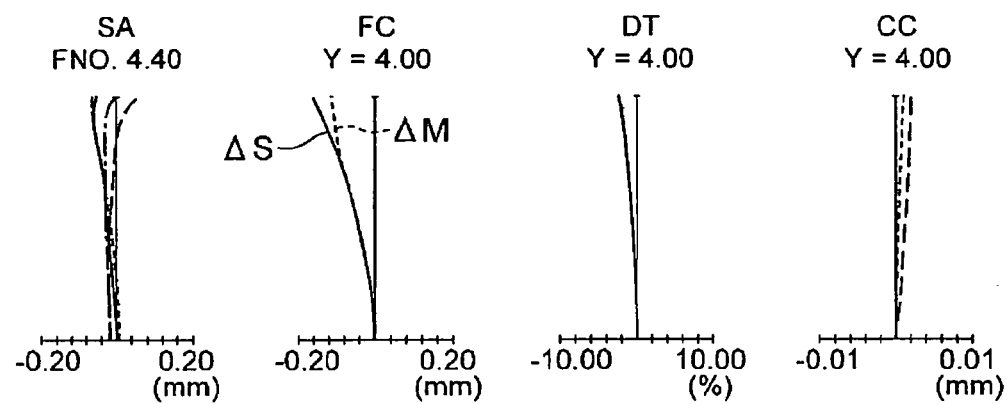
Figure 14C:
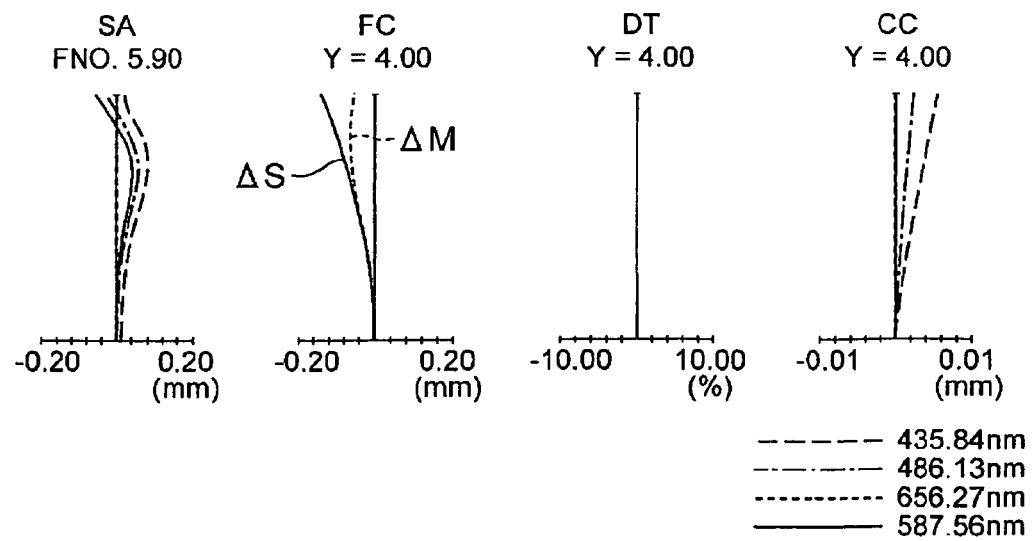

FIGS. 13A to 13C show sectional views along an optical axis, showing an optical constitution of a zoom lens system in Example 7, FIG. 13A shows a state in a wide-angle end, FIG. 13B shows an intermediate state, and FIG. 13C shows a state in a telephoto end. FIGS. 14A to 14C are diagrams showing a spherical aberration SA, an astigmatism FC, a distortion DT and a chromatic aberration CC of magnification when focused on an infinite object in Example 7, FIG. 14A shows a state in the wide-angle end, FIG. 14B shows an intermediate state, and FIG. 14C shows a state in the telephoto end.

As shown in FIGS. 13A to 13C, the zoom lens system of Example 7 is constituted of, in order from an object side toward an image pickup surface I, a first lens unit G1 having a negative refractive power and a second lens unit G2 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 13A, the point a denotes an intersection between the chief ray of maximum image height and the at least one aspherical surface A. In this example, since an incidence angle (angle formed by the chief ray with the optical axis Lc) of the chief ray of maximum image height does not exceed 40 degrees, the second intersection b does not exist.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that the object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21 and a negative lens L22 having a negative meniscus shape directing its convex surface on the image side in the vicinity (lens center) of the optical axis. The second lens unit has a positive refractive power as a whole.

It is to be noted that the object-side surface of the double-convex positive lens L21 is constituted so that the positive refractive power gradually weakens from the center of the lens toward the peripheral portion. The image-side surface of the negative lens L22 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; and the image-side surface of the negative lens L22 of the second lens unit G2, respectively.

When the zooming is performed from the wide-angle end (FIG. 13A) toward the telephoto end (FIG. 13C), the first lens unit G1 moves along a locus convex toward the image side, and the second lens unit G2 moves from the image pickup surface I side toward the object side. At this time, the respective lens units move so that the space between the first lens unit G1 and the second lens unit G2 decreases, and the space between the second lens unit G2 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 7.

TABLE 19

Numerical Data 7

| Surface | R | D | Nd | Vd |
|---|---|---|---|---|
| 1 | 120.174 | 1.00 | 1.80610 | 40.92 |
| 2* | 4.335 | 1.37 | | |
| 3 | 7.102 | 2.20 | 2.00069 | 25.46 |
| 4 | 14.126 | D4 | | |
| 5(AS) | ∞ | −0.50 | | |
| 6* | 3.761 | 3.30 | 1.49700 | 81.61 |
| 7 | −6.821 | 1.30 | 1.68893 | 31.08 |
| 8* | −54.958 | D8 | | |
| 9 | ∞ | 0.50 | 1.54771 | 62.84 |
| 10 | ∞ | 0.50 | | |
| 11 | ∞ | 0.50 | 1.51633 | 64.14 |
| 12 | ∞ | 0.37 | | |
| 13(IS) | ∞ | | | |

*Aspherical surface AS: Aperture stop IS: Image surface

TABLE 20

Aspherical coefficient

| Surface | k | A4 | A6 | A8 | A10 |
|---|---|---|---|---|---|
| 2 | −0.650 | 3.26438e−4 | 2.45237e−8 | 2.38731e−9 | 0 |
| 6 | 0.001 | −2.27652e−4 | 2.55258e−6 | 4.85690e−6 | −6.18093e−7 |
| 8 | 0.000 | 3.32294e−3 | 3.07299e−4 | −1.36715e−5 | 8.96211e−6 |

TABLE 21

Zoom Data

|  | WE | ST | TE |
|---|---|---|---|
| f (mm) | 5.769 | 10.000 | 16.729 |
| FNO | 3.46 | 4.40 | 5.90 |
| 2ω | 73.37° | 42.51° | 25.65° |
| IH | 3.8 | 3.8 | 3.8 |
| Y | 4.00 | 4.00 | 4.00 |
| D4 | 11.20 | 4.55 | 0.90 |
| D8 | 8.04 | 11.28 | 16.50 |

EXAMPLE 8

Figure 15A:
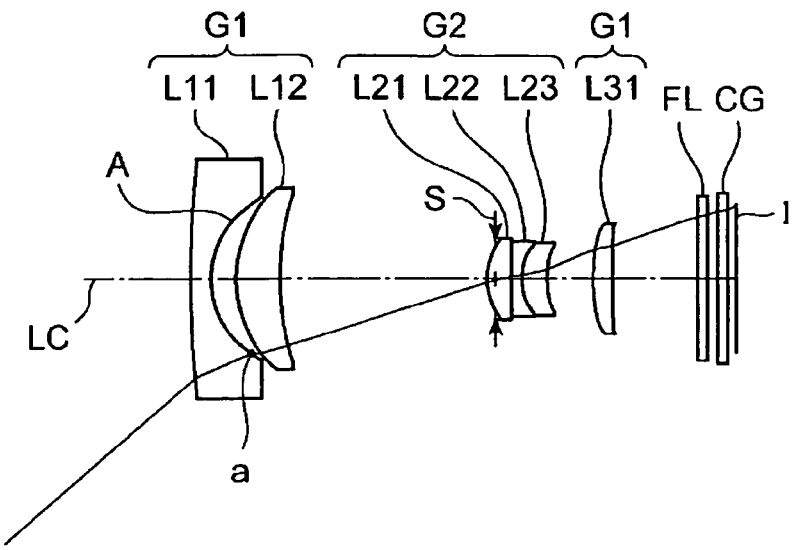
FIGS. 15A to 15C are sectional views along an optical axis, showing an optical constitution of a zoom lens system in Example 8 of the present invention.
Figure 15B:
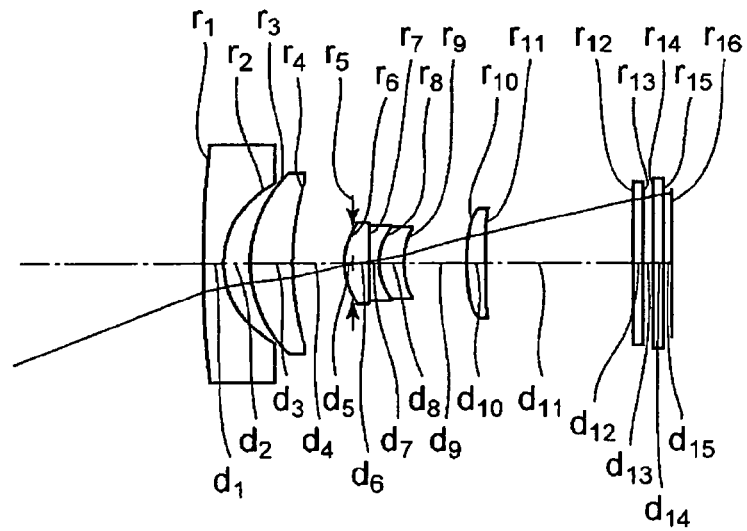
Figure 15C:
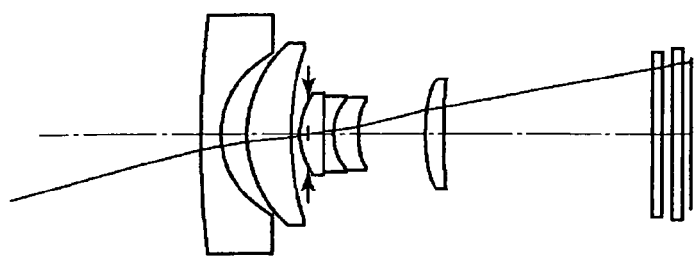
Figure 16A:
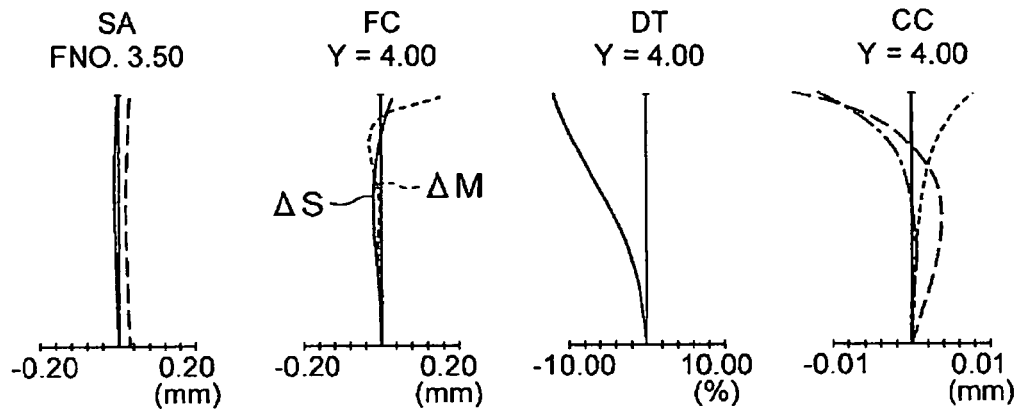
FIGS. 16A to 16C are diagrams showing a spherical aberration SA, an astigmatism FC, a distortion DT and a chromatic aberration CC of magnification when focused on an infinite object in Example 8.
Figure 16B:
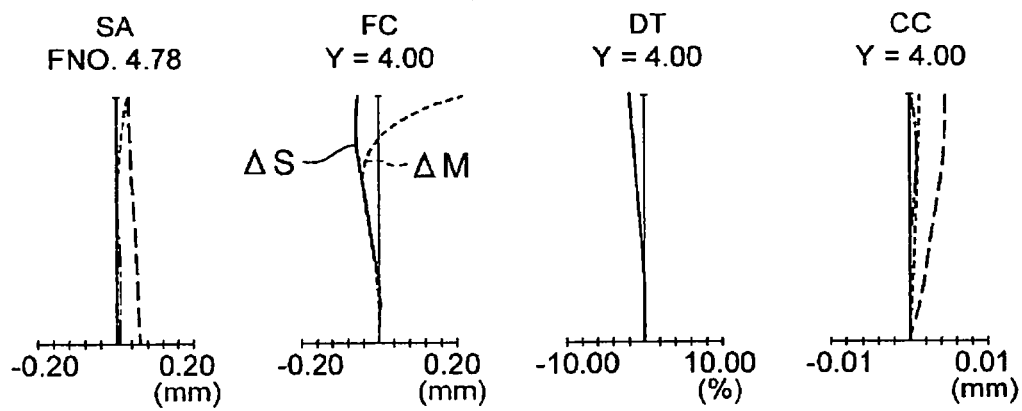
Figure 16C:
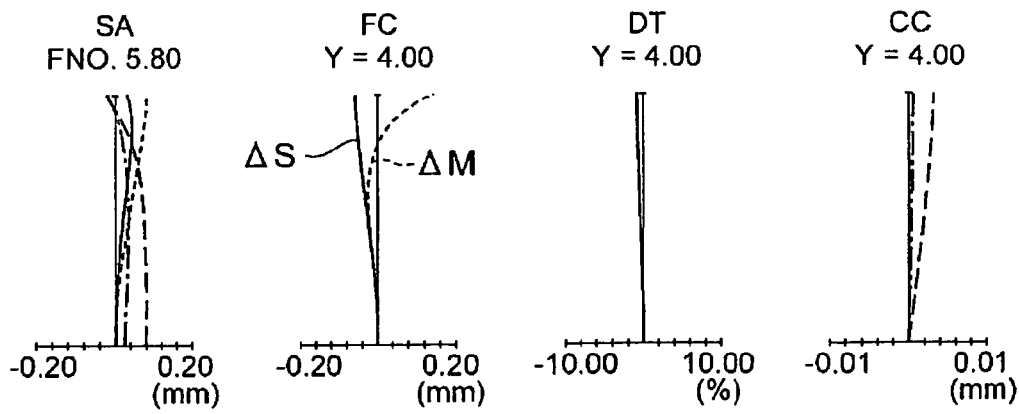

FIGS. 15A to 15C show sectional views along an optical axis, showing an optical constitution of a zoom lens system in Example 8, FIG. 15A shows a state in a wide-angle end, FIG. 15B shows an intermediate state, and FIG. 15C shows a state in a telephoto end. FIGS. 16A to 16C are diagrams showing a spherical aberration SA, an astigmatism FC, a distortion DT and a chromatic aberration CC of magnification when focused on an infinite object in Example 8, FIG. 16A shows a state in the wide-angle end, FIG. 16B shows an intermediate state, and FIG. 16C shows a state in the telephoto end.

As shown in FIGS. 15A to 15C, the zoom lens system of Example 8 is constituted of, in order from an object side toward an image pickup surface I, a first lens unit G1 having a negative refractive power, a second lens unit G2 having a positive refractive power, and a third lens unit G3 having a positive refractive power. In the drawings, S denotes an aperture stop, FL denotes a parallel flat plate such as a low pass filter or an infrared absorptive filter, CG denotes cover glass, I denotes the image pickup surface of an image sensor (CCD, CMOS or the like), and Lc denotes an optical axis.

Moreover, in the drawings, character A denotes the at least one aspherical surface. As to a ray, a chief ray is shown which enters the zoom lens system from the object side and reaches the point of maximum image height on the image surface. In FIG. 15A, the point a (b) denotes an intersection between the chief ray of maximum image height and the at least one aspherical surface A. In this example, since an incidence angle (angle formed by the chief ray with the optical axis Lc) of the chief ray of maximum image height exceeds 40 degrees, the first intersection a agrees with the second intersection b.

The first lens unit G1 is constituted of: a negative meniscus lens L11 which directs its concave surface toward the image surface; and a positive meniscus lens L12 which directs its convex surface on the object side with an air space between the negative meniscus lens and the positive meniscus lens. The first lens unit has a negative refractive power as a whole. It is to be noted that the object-side surface of the negative meniscus lens L11 is constituted so that the absolute value of the paraxial radius of curvature is larger than that of the paraxial radius of curvature of any lens surface of the first lens unit that comes into contact with air. The image-side surface of the negative meniscus lens L11 is constituted so that the negative refractive power gradually weakens from the center of the lens toward the peripheral portion.

The second lens unit G2 is constituted of a cemented lens including, in order from the object side, a double-convex positive lens L21, a double-concave negative lens L22, and a positive meniscus lens L23 which directs its concave surface toward the image surface. The second lens unit has a positive refractive power as a whole.

It is to be noted that the object-side surface of the double-convex positive lens L21 is constituted so that the positive refractive power gradually weakens from the center of the lens toward the peripheral portion. An image-side surface of the positive meniscus lens L23 is constituted so that the negative refractive power gradually weakens from the lens center toward the peripheral portion.

The third lens unit G3 is constituted of a single lens of a positive lens L31 having a double-convex shape in the vicinity of the optical axis (in the center of the lens), and has a positive refractive power as a whole.

It is to be noted that in the vicinity of the optical axis (in the center of the lens), the object-side surface of the double-convex positive lens L31 is constituted so that the positive refractive power gradually weakens from the center of the lens toward the peripheral portion. In the vicinity of the optical axis (in the center of the lens), the image-side surface of the double-convex positive lens L31 is constituted so that the curvature differs in the vicinity of the optical axis and in the periphery of the surface.

Aspherical surfaces are disposed on: the image-side surface of the negative meniscus lens L11 in the first lens unit G1; the object-side surface of the double-convex positive lens L21 of the second lens unit G2; an image-side surface of the positive meniscus lens L23 of the second lens unit G2; and both of the object-side surface and the image-side surface of the double-convex positive lens L31 in the third lens unit G3.

When the zooming is performed from the wide-angle end (FIG. 15A) toward the telephoto end (FIG. 15C), the first lens unit G1 moves along a locus convex toward the image side, and the second lens unit G2 and the third lens unit G3 move from the image pickup surface I side toward the object side. At this time, the respective lens units move so that the space between the first lens unit G1 and the second lens unit G2 decreases, the space between the second lens unit G2 and the third lens unit G3 increases, and the space between the third lens unit G3 and the parallel flat plate FL increases. It is to be noted that the maximum image height of the image pickup surface I is disposed in the diagonal direction of the effective image pickup region of the CCD image sensor or CMOS image sensor.

Next, there will be described hereinafter numerical data of optical members constituting the zoom lens system of Example 8.

TABLE 22

Numerical Data 8

| Surface | R | D | Nd | Vd |
|---|---|---|---|---|
| 1 | 60.010 | 1.00 | 1.80610 | 40.92 |
| 2* | 4.112 | 1.31 | | |
| 3 | 6.467 | 2.40 | 1.80810 | 22.76 |
| 4 | 14.808 | D4 | | |
| 5 (AS) | ∞ | −0.45 | | |
| 6* | 3.564 | 1.30 | 1.74320 | 49.34 |
| 7 | −1031719.443 | 0.50 | 1.69895 | 30.13 |
| 8 | 3.002 | 1.30 | 1.51633 | 64.14 |
| 9* | 7.168 | D9 | | |
| 10* | 15.178 | 1.00 | 1.52511 | 56.23 |
| 11* | −93.662 | D11 | | |
| 12 | ∞ | 0.50 | 1.51633 | 64.14 |
| 13 | ∞ | 0.50 | | |
| 14 | ∞ | 0.50 | 1.51633 | 64.14 |
| 15 | ∞ | 0.37 | | |
| 16 (IS) | ∞ | | | |

*Aspherical surface AS: Aperture stop IS: Image surface

TABLE 23

Aspherical coefficient

| Surface | k | A4 | A6 | A8 | A10 |
|---|---|---|---|---|---|
| 2 | −0.499 | 5.91222e−5 | −8.72039e−7 | 9.67999e−9 | −2.20434e−8 |
| 6 | −0.600 | 1.74918e−3 | 6.12367e−5 | 1.39082e−5 | −7.25135e−8 |
| 9 | 0.000 | 8.62550e−3 | 6.77041e−4 | 1.92629e−4 | 1.93182e−5 |
| 10 | 0.000 | −6.01806e−6 | 2.06640e−4 | 1.45236e−5 | 2.75747e−6 |
| 11 | 0.000 | 1.88770e−9 | 1.61596e−4 | 4.63746e−6 | 4.35434e−6 |

TABLE 24

Zoom Data

|        | WE     | ST     | TE     |
|--------|--------|--------|--------|
| f (mm) | 4.90   | 9.97   | 14.16  |
| FNO    | 3.50   | 4.78   | 5.80   |
| 2ω     | 82.78° | 42.57° | 30.32° |
| IH     | 3.8    | 3.8    | 3.8    |
| Y      | 4.00   | 4.00   | 4.00   |
| D4     | 11.52  | 3.38   | 0.95   |
| D9     | 2.37   | 3.31   | 3.63   |
| D11    | 4.36   | 7.65   | 10.78  |

In the above examples, the zoom lens system is constituted so that during the zooming performed from the wide-angle end to the telephoto end, the first lens unit G1 moves along a locus convex toward the image side, and the second lens unit G2 moves from the image pickup surface side toward the object side. When the focusing from infinity to the minimum focus distance is performed, the first lens unit G1 moves toward the object side.

It is to be noted that in the above examples, all the lenses constituting the zoom lens system are made of a homogeneous optical material, but a diffractive optical surface having a lens function or a graded refractive index lens may be used.

Next, Table 25 shows values corresponding to the conditions in the above example as follows.

TABLE 25

| Parameter | Example ||||||||
|---|---|---|---|---|---|---|---|---|
|  | 1 | 2 | 3 | 4 | 5 | 6 | 7 | 8 |
| f2 | 8.43 | 8.28 | 8.42 | 8.39 | 8.10 | 8.41 | 8.33 | 8.74 |
| R1 | 3.919 | 4.042 | 4.206 | 4.190 | 4.134 | 4.374 | 4.335 | 4.113 |
| IH | 3.8 | 3.8 | 3.8 | 3.8 | 3.8 | 3.8 | 3.8 | 3.8 |
| Lw | 31.94 | 31.99 | 31.52 | 31.51 | 32.15 | 29.80 | 29.82 | 28.51 |
| ω | 41.71 | 43.05 | 40.38 | 40.95 | 44.38 | 36.73 | 36.69 | 41.39 |
| h1 | 4.602 | 4.183 | 3.999 | 3.989 | 4.434 | 3.282 | 3.478 | 3.922 |
| h2 | 4.602 | 4.183 | 3.999 | 3.989 | 4.434 | — | — | 3.922 |
| Z1 | 2.390 | 2.471 | 2.164 | 2.157 | 2.796 | 1.309 | 1.531 | 2.145 |
| Z2 | 2.390 | 2.471 | 2.164 | 2.157 | 2.796 | — | — | 2.145 |
| R1/h1 | 0.965 | 0.966 | 1.052 | 1.050 | 0.932 | 1.333 | 1.247 | 1.049 |
| R1/h2 | 0.965 | 0.966 | 1.052 | 1.050 | 0.932 | — | — | 1.049 |
| Z1/h1 | 0.588 | 0.591 | 0.541 | 0.541 | 0.631 | 0.399 | 0.440 | 0.547 |
| $\{h_1^2 + (R_1 - Z_1)^2\}/R_1^2$ | 1.227 | 1.222 | 1.139 | 1.142 | 1.255 | 1.054 | 1.062 | 1.138 |
| Z2/h2 | 0.588 | 0.591 | 0.541 | 0.541 | 0.631 | — | — | 0.547 |
| $\{h_2^2 + (R_1 - Z_2)^2\}/R_1^2$ | 1.227 | 1.222 | 1.139 | 1.142 | 1.255 | — | — | 1.138 |
| f2/IH | 2.217 | 2.179 | 2.216 | 2.207 | 2.133 | 2.214 | 2.193 | 2.300 |
| Lw/IH | 8.406 | 8.418 | 8.294 | 8.291 | 8.460 | 7.842 | 7.848 | 7.503 |

When any of these zoom lens systems is combined with an electronic image sensor for receiving an optical image formed by the zoom lens system by a light receiving surface (an image pickup surface) to convert the image into an electric signal, an image pickup apparatus can be constituted. That is, the zoom lens system can be used as a photographing lens of the image pickup apparatus.

Next, a second type of zoom lens system will be described.

The second type of zoom lens system comprises, in order from an object side: first lens unit having a negative refractive power and comprising a negative lens component and a positive lens component; and second lens unit having a positive refractive power and comprising a positive lens component which includes a plurality of lens elements, the number of the lens components included in the first lens unit and the second lens unit being three in total, a space between the lens units changing during zooming from a wide-angle end to a telephoto end or during focusing.

In the second type of zoom lens system, in one aspect, an image-side surface of the negative lens component of the first lens unit has an aspherical surface on which a diverging function decreases with distance from the optical axis.

Moreover, in the second type of zoom lens system, in another aspect, 50% or less of all refractive surfaces constituting the first lens unit are aspherical surfaces.

Furthermore, in the second type of zoom lens system, in still another aspect, the positive lens component of the first lens unit comprises a positive lens element constituted of a material having a refractive index of 1.87 or more.

It is to be noted that the lens component means a single lens or a cemented lens which has only two air contact surfaces: an incidence surface; and an exit surface in a clear aperture and which does not have any air space between the surfaces.

The second type of zoom lens system has a basic constitution comprising, in order from an object side: the first lens unit having the negative refractive power and including two lens components of the negative lens component and the positive lens component; and the second lens unit including one lens component disposed adjacent to the image side of the first lens unit, having a positive refractive power and constituted by cementing a plurality of lens elements. A relative space between the lens units changes during a zooming or focusing operation. Moreover, in a further aspect, it is preferable that the image-side surface of at least one negative lens component of the first lens unit is constituted of an aspherical surface in which a diverging function weakens, that is, a curvature becomes gentle (a radius of curvature enlarges) with distance from the optical axis.

That is, in addition to the constitution in which the second lens unit is constituted of one lens component, at least the image-side surface of the negative lens component of the first lens unit is constituted of the aspherical surface in which the curvature becomes gentle with distance from the optical axis. According to such combined constitution, a depth of the lens system when collapsed is remarkably easily reduced while securing a high image forming performance. Here, there will further be described a reason why the image-side surface of the negative lens component of the first lens unit is constituted of the aspherical surface in which the curvature becomes gentle with distance from the optical axis. When the surface having a high aberration-correcting capability is disposed in the center (as viewed in the optical axis direction) of the first lens unit slightly closer to the object side, it is possible to correct an axial/off-axial aberration, an astigmatic difference, a coma and a distortion with a good balance. Accordingly, the number of the aspherical surfaces can be reduced, or manufacturing of another aspherical surface can be facilitated. Such constitution is advantageous in respect of cost and productivity. Furthermore, the image-side surface of the negative lens component of the first lens unit is constituted of a concave surface, and the aspherical surface is used in this surface, the radius of curvature of the aspherical surface being increased with distance from the optical axis. Accordingly, the paraxial power of this surface can be strengthened, and the principal point is preferably disposed closer to the object side to thereby facilitate the zooming (movement amount of the lens unit can be reduced).

In a further aspect, it is preferable that 50% or less of all the optical refractive surfaces constituting the first lens unit are aspherical surfaces. To reduce the thickness of the zoom lens system when collapsed, and obtain a high image forming performance, it is preferable that the aspherical surface is introduced into the first lens unit. However, if a large number of aspherical surfaces are introduced, costs increase, productivity deteriorates, and there is not generally any effect. The aspherical surfaces may be disposed on 50% or less of all the refractive surfaces constituting the first lens unit. It is especially preferable that the image-side surface of the negative lens is formed into the aspherical surface as described above. Furthermore, in a case where the other surfaces of the first lens unit are constituted of spherical surfaces, a constitution can be obtained in which an image forming performance is improved and which is not disadvantageous in respect of costs and productivity.

In a further aspect, the positive lens component of the first lens unit preferably includes a positive lens formed of a material having a refractive index of 1.87 or more. When the total length of the zoom lens system is reduced to reduce the collapsed thickness, the Petzval sum ($1/\Sigma f \cdot n$) easily enlarges on a positive side. Therefore, to solve the problem, at least one positive lens formed of the material having a refractive index of at least 1.87 may be used in the positive lens component of the first lens unit.

In a further aspect, the second type of zoom lens system preferably satisfies the following condition (9):

$$0.8 < \Sigma T/fw < 2.5 \qquad (9),$$

wherein $\Sigma T$ denotes a sum of lengths along the optical axis from surfaces closest to the object side to surfaces closest to an image side of all the lens units, and fw denotes a focal length of the zoom lens system in the wide-angle end.

According to this constitution, a curvature of field or an astigmatism can be corrected comparatively easily and satisfactorily, and the lens system can be constituted to be thin when collapsed. Above the upper limit of the condition (9), the lens system can be constituted to be thin, even if the number of the lens components is reduced while maintaining a satisfactory image forming performance of the zoom lens system. Below the lower limit of the condition (9), it becomes difficult to correct the aberration by use of the difference of ray height between the incidence surface and the exit surface of each lens unit, even if the number of the lenses constituting the zoom lens system is increased. Therefore, the curvature of field or the astigmatism is easily generated.

Moreover, it is more preferable that the following condition (9-1) is satisfied:

$$1.0 < \Sigma T/fw < 2.2 \qquad (9\text{-}1).$$

Furthermore, it is more preferable that the following condition (9-2) is satisfied:

$$1.4 < \Sigma T/fw < 1.9 \qquad (9\text{-}2).$$

In a further aspect, it is preferable that the following condition (10) is satisfied:

$$0.4 < fR/|fA| < 1.2 \qquad (10),$$

wherein fA denotes a focal length of the first lens unit, and fR denotes a composite focal length of all lens units arranged on an image side of the first lens unit in the wide-angle end. To reduce the total length, it is effective to reduce the composite focal length of all the lens units arranged on the image side of the first lens unit in the wide-angle end. However, below the lower limit of the condition (10), the image surface is easily curved from a paraxial image forming position toward the object side in the peripheral portion. Above the upper limit, the total length of the zoom lens system easily increases.

Moreover, it is further preferable that the following condition (10-1) is satisfied:

$$0.6 < fR/|fA| < 1.0 \qquad (10\text{-}1).$$

Furthermore, it is further preferable that the following condition (10-2) is satisfied:

$$0.7 < fR/|fA| < 0.9 \qquad (10\text{-}2).$$

In a further aspect, it is preferable that the following condition (11) is satisfied:

$$1.20 < |\beta RT| < 2.30 \qquad (11),$$

wherein $\beta RT$ denotes a composite magnification of all lens units arranged on the image side of the first lens unit in the telephoto end when focused on an infinite object. To secure a high zooming ratio while keeping the total length to be short, it is preferable to increase the synthesized magnification (negative value) of all the lens units arranged on the image side of the first lens unit. Below the lower limit, the total length in the wide-angle end increases. Above the upper limit, aberrations mainly including a spherical aberration, an axial chromatic aberration and the like are easily deteriorated.

Moreover, any of the following conditions (11-1), (11-2) and (11-3) may be satisfied:

$$1.30 < |\beta 2T| < 1.90 \qquad (11\text{-}1);$$

$$1.20 < |\beta 2T| < 1.85 \qquad (11\text{-}2);$$

and $$1.40 < |\beta 2T| < 1.75 \qquad (11\text{-}3).$$

In a further aspect, it is preferable that the following condition (12) is satisfied concerning movement of the lens unit during the zooming:

$$0.17 < (D12W - D12T)/(fw \cdot \gamma^2) < 0.45 \qquad (12),$$

wherein D12W and D12T denote air spaces between the first lens unit and the lens unit adjacent to an image side of the first lens unit along the optical axis in the wide-angle end and the telephoto end, respectively, $\gamma$ denotes a ratio (so-called zooming ratio) of a focal length of the zoom lens system in the telephoto end to that of the zoom lens system in the wide-angle end when focused on an infinite object, and fw denotes the focal length of the zoom lens system in the wide-angle end. Above the upper limit of the condition (12), the aberration is advantageously corrected, but the off-axial ray height in the first lens unit in the wide-angle end increases, and the diameter of the first lens unit easily enlarges. Therefore, the thickness of each lens component increases, which is against the miniaturization. Below the lower limit of the condition (12), the lens system is advantageously thinned, but in the first lens unit and the composite system of the lens units arranged on the image side of the first lens unit, both refractive powers have to be enlarged. In addition, the number of the lenses for use is small. This causes a problem that it becomes difficult to correct each aberration, or sensitivity to eccentricity increases.

It is more preferable that the following condition (12-1) is satisfied:

$$0.19 < (D12W - D12T)/(fw \cdot \gamma^2) < 0.30 \quad (12\text{-}1).$$

Furthermore, it is most preferable that the following condition (12-2) is satisfied:

$$0.21 < (D12W - D12T)/(fw \cdot \gamma^2) < 0.27 \quad (12\text{-}2).$$

In a further aspect, it is preferable that the following condition (13) is satisfied:

$$0.06 < d11/fw < 0.53 \quad (13),$$

wherein fw denotes a focal length of the zoom lens system in the wide-angle end, and d11 denotes an air space between the negative lens component and the positive lens component of the first lens unit along the optical axis. Above the upper limit of the condition (13), the thickness of the lens system when collapsed easily increases. Below the lower limit of the condition (13), a capability of correcting the aberration by use of a difference of ray height between the incidence surface and the exit surface of the lens unit weakens, and an astigmatism is easily deteriorated.

Moreover, it is more preferable that the following condition (13-1) is satisfied:

$$0.10 < d11/fw < 0.40 \quad (13\text{-}1).$$

Furthermore, it is most preferable that the following condition (13-2) is satisfied:

$$0.20 < d11/fw < 0.35 \quad (13\text{-}2).$$

Moreover, in the zoom lens system, assuming that the first lens unit has a positive lens and a negative lens disposed on an object side of the positive lens, and refractive indexes and the Abbe numbers of materials constituting the positive lens and the negative lens are $n1p$, $V1p$, $n1n$ and $V1n$, the following conditions are preferably satisfied:

$$0.08 < n1p - n1n < 0.35 \quad (14);$$

and $$5 < V1n - V1p < 25 \quad (15).$$

In consideration of an aberration other than the curvature of field, the refractive index of the negative lens may be set to be as high as possible, but the refractive index of the positive lens may not be set to be high. Below the lower limit of the condition (14), a spherical aberration in the telephoto end and a coma in the wide-angle end are easily deteriorated. Above the upper limit, the curvature of field is easily deteriorated. The condition (15) defines the difference of the Abbe number between the negative lens and the positive lens. However, above the upper limit or below the lower limit, aberrations are easily deteriorated such as a chromatic aberration of magnification in the wide-angle end, an axial chromatic aberration in the telephoto end and a spherochromatic aberration.

Moreover, the following conditions may be satisfied:

$$0.12 < n1p - n1n < 0.33 \quad (14\text{-}1);$$

and $$10 < V1n - V1p < 24 \quad (15\text{-}1).$$

Furthermore, the following conditions may be satisfied:

$$0.18 < n1p - n1n < 0.27 \quad (14\text{-}2);$$

and $$14 < V1n - V1p < 22 \quad (15\text{-}2).$$

In a further aspect, it is preferable that the following condition (16) is satisfied:

$$0.66 < (R23 + R21)/(R23 - R21) < 1.5 \quad (16),$$

wherein R21 and R23 denote radii of curvature (paraxial radii of curvature) of the surfaces closest to the object side and closest to the image side on the optical axis in the second lens unit, respectively. In the second lens unit, each lens element tends to have a high relative sensitivity to eccentricity. Therefore, when a plurality of lens elements are cemented to one another, a high centering precision is easily obtained. In general, when two or more lens elements are cemented, a degree of freedom in correcting the aberration decreases, and it becomes difficult to set all the aberrations to satisfactory levels. To solve the problem, a shape factor of the cemented lens may be set so as to satisfy the condition (16). Above the upper limit, it becomes difficult to correct the spherical aberration. Below the lower limit, it becomes difficult to correct the coma and the astigmatism.

Moreover, it is further preferable that the following condition (16-1) is satisfied:

$$0.69 < (R23 + R21)/(R23 - R21) < 1.2 \quad (16\text{-}1).$$

Furthermore, it is most preferable that the following condition (16-2) is satisfied:

$$0.72 < (R23 + R21)/(R23 - R21) < 1.0 \quad (16\text{-}2).$$

In a further aspect, it is preferable that the following condition (17) is satisfied:

$$V2p > 65 \quad (17),$$

wherein V2p denotes the Abbe number (d-line reference) of a material of the positive lens included in the second lens unit. Below the lower limit, aberrations including a chromatic aberration are easily deteriorated.

Moreover, it is further preferable that the following condition (17-1) is satisfied, $$V2p > 70 \quad (17\text{-}1).$$

Furthermore, it is most preferable that the following condition (17-2) is satisfied, $$V2p > 80 \quad (17\text{-}2).$$

In a still further aspect, it is preferable that the second lens unit is constituted of a cemented lens of a positive lens and a negative lens, and the following condition (18) is satisfied:

$$-1.5 < fw/R22 < -0.50 \quad (19),$$

wherein R22 denotes a radius of curvature (paraxial radius of curvature) of a cemented surface of the second lens unit on the optical axis. Above the upper limit of the condition (18), the axial chromatic aberration is insufficiently corrected. Below the lower limit, the spherochromatic aberration is easily generated.

Moreover, it is further preferable that the following condition (18-1) is satisfied:

$$-1.0 < fw/R22 < -0.75 \tag{18-1}$$

Furthermore, it is most preferable that the following condition (18-2) is satisfied:

$$-0.94 < fw/R22 < -0.82 \tag{18-2}$$

These zoom lens systems can be used as a photographing optical system of an electronic image pickup apparatus including an electronic image sensor.

Moreover, the electronic image pickup apparatus may be constituted as follows by use of these zoom lens systems. That is, the electronic image pickup apparatus comprises: a zoom lens system; an electronic image sensor disposed on an image side of the zoom lens system and having an image pickup surface; and an image processing unit which may process image data obtained by picking up, by the electronic image sensor, an image formed through the zoom lens system to output the image data in which a shape of the image has been changed.

The zoom lens system comprises, in order from an object side:

a first lens unit having a negative refractive power and comprising a negative lens component and a positive lens component; and a second lens unit having a positive refractive power and comprising a positive lens component which includes a plurality of lens elements, a total number of the lens components included in the first lens unit and the second lens unit being three, a space between the lens units changing during zooming from a wide-angle end to a telephoto end or during focusing.

In this electronic image pickup apparatus, when especially a barrel-type distortion is positively generated by the zoom lens system, and corrected by processing the image, an optical system portion can be miniaturized or thinned. In a case where the barrel-type distortion is generated, object information corresponding to a wider angle of field than the angle of field of an ideal image forming state is captured in the formed image. Therefore, when the barrel-type distortion is positively generated, and the distortion is corrected by processing the image, it is possible to design the zoom lens system to have a small angle of field, and the thinning of the zoom lens system is further facilitated.

Figure 43:
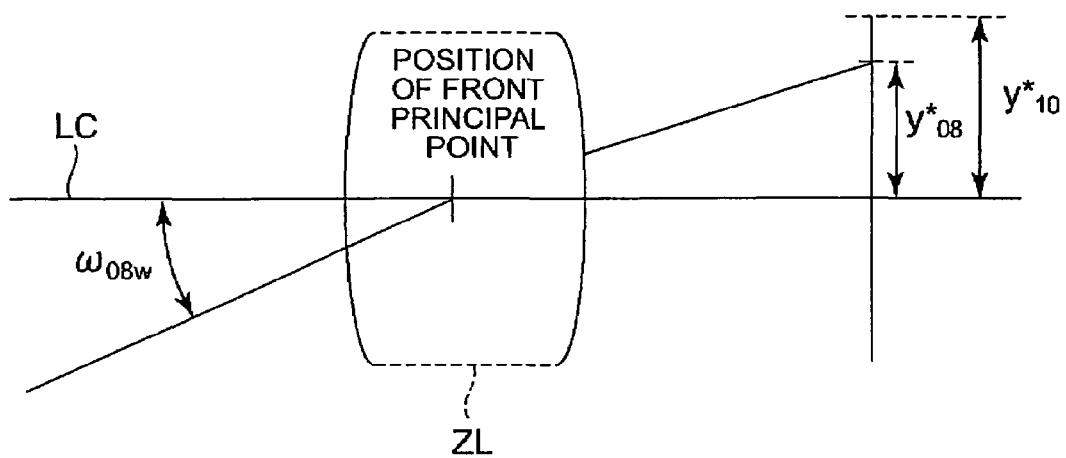
FIG. 43 is a diagram showing a relation between an image height and an angle of a chief ray.

It is preferable that such electronic image pickup apparatus satisfies the following condition (19), when the zoom lens system focuses on an object distance that is 50-folds or more of the focal length fw in the wide-angle end:

$$0.75 < y^*_{08}/(fw \cdot \tan \omega_{08w}) < 0.96 \tag{19}$$

wherein assuming that $y^*_{10}$ denotes a length from the center of the image pickup surface of the electronic image sensor to the farthest point corresponding to the farthest point from the center of an image having a distortion corrected, $y^*_{08} = 0.8 y^*_{10}$, and $\omega_{08w}$ denotes an angle formed by a ray being incident upon the zoom lens system and reaching an image point that has an image height $y^*_{08}$ from the center the image pickup surface in the wide-angle end, and an optical axis in an object side, as shown in FIG. 43. In FIG. 43, ZL denotes the zoom lens system. In a case where an image is formed on the image pickup surface of the electronic image sensor in a state in which a large barrel-type distortion is intentionally generated in the vicinity of the wide-angle end of the zoom lens system, it is possible to reduce an effective diameter of the first lens unit in which the diameter most easily becomes large. As a result, the system can be thinned.

Furthermore, when the first lens unit is constituted of only two lens components of a negative lens component and a positive lens component, a length between two lens components has to be set to be not less than a certain value in order to correct the distortion. However, when the generation of the distortion is allowed, this distance is hardly required. This also contributes to the thinning of the system. This is also advantageous in correcting the astigmatism. Moreover, an image distorted into a barrel shape is photoelectrically converted by the image sensor to obtain image data, and the data is subjected to processing which corresponds to electrical deformation of the image by a signal processing unit of the electronic image pickup apparatus. Finally, the image data output from the electronic image pickup apparatus is reproduced by a certain display unit. In this case, the distortion is corrected, and there is obtained an image having a shape substantially similar to that of the object.

In a case where an image of an infinite object is formed, and the resultant image does not have any distortion, the following is established:

$$f = y^*/\tan \omega = y/\tan \omega,$$

wherein y* denotes an actual image height, that is, a height of an image point from the optical axis, y denotes an ideal image height, that is, a height of an ideal image point (image point at a time when no distortion is generated in the optical system) from the optical axis, f denotes a focal length of an image forming system. The reference symbol ω denotes an angle formed with a chief ray corresponding to the image point having an image height of y* from the center of the image pickup surface (which is an intersection of the image pickup surface and the optical axis) and the optical axis in the object side. In a case where a barrel-type distortion is generated in the image forming system, the following is established:

$$f > y^*/\tan \omega,$$

and, if f and y are set to be constant, ω has a larger value.

That is, the condition (19) defines an order of magnitude of the barrel-type distortion in the wide-angle end of the zoom lens system. Above the upper limit of the condition (19), it becomes difficult to miniaturize or thin the system. If the condition is below the lower limit, and an image distortion generated by the distortion of the zoom lens system is corrected by the image processing, an enlargement ratio of a peripheral portion of the image surface in a radial direction becomes excessively high, and deterioration of sharpness of an image peripheral portion becomes conspicuous. As described above, there is introduced a method in which the distortion is intentionally generated in the zoom lens system, and the image is electrically processed after image pickup by the electronic image sensor, thereby correcting the distortion. This method aims at the miniaturization or enlargement of the angle of field (an angle of field including the distortion in a perpendicular direction is set to 38° or more) of the zoom lens system.

Moreover, it is further preferable that the following condition is satisfied:

$$0.80 < y^*_{08}/(fw \cdot \tan \omega_{08w}) < 0.95 \tag{19-1}$$

Furthermore, it is most preferable that the following condition is satisfied:

$$0.85 < y^*_{08}/(fw \cdot \tan \omega_{08w}) < 0.94 \tag{19-2}$$

In addition, when the zoom lens system focuses on any object distance that is 50-folds or more of the focal length fw, the following condition (20) is preferably satisfied:

$$0.50 < (dy^*/dy)_{y^*_{08}}/(dy^*/dy)_{y^*_{00}} < 0.90 \qquad (20),$$

wherein $(dy^*/dy)_{y^*_{08}}$ denotes a derivative of $dy^*/dy$ at $y^*_{08}$, and $(dy^*/dy)_{y^*_{00}}$ denotes a derivative of $dy^*/dy$ at $y^*_{00}$, that is, a derivative at the center of the image pickup surface. The actual image height $y^*$ is a function of the ideal image height y. However, in such local value of y that the derivative $dy^*/dy$ enlarges above a certain degree, a local enlargement ratio for correcting the distortion becomes excessively large, and it becomes difficult to obtain a desired resolution in the portion. Below the lower limit of the condition (20), the local enlargement ratio for correcting the distortion becomes excessively large, and it becomes difficult to obtain the desired resolution in the portion. If the condition is above the upper limit, the constitution is disadvantageous in miniaturizing the zoom lens system.

Moreover, it is further preferable that the following condition (20-1) is satisfied:

$$0.60 < (dy^*/dy)_{y^*_{08}}/(dy^*/dy)_{y^*_{00}} < 0.87 \qquad (20\text{-}1).$$

Furthermore, it is most preferable that the following condition (20-2) is satisfied:

$$0.70 < (dy^*/dy)_{y^*_{08}}/(dy^*/dy)_{y^*_{00}} < 0.84 \qquad (20\text{-}2).$$

In addition, it is preferable that the following condition (21) is satisfied:

$$2.55 < (Dw+Dt)/(2 \cdot \Sigma Dt) < 4.0 \qquad (21),$$

wherein Dw and Dt denote a length to an image surface from a vertex of a lens surface closest to the object side in the first lens unit in the wide-angle end and the telephoto end, respectively, and $\Sigma Dt$ denotes a length from the vertex of the lens surface closest to the object side in the first lens unit to the vertex of the lens surface closest to the image side in the second lens unit in the telephoto end. Above the upper limit of the condition (21), the total length of the zoom lens system in the wide-angle end or the telephoto end lengthens, and the collapsible lens barrel is easily complicated and enlarged. Below the lower limit, the thickness of the lens increases, and the collapsible lens barrel is easily complicated and enlarged.

Moreover, it is further preferable that the following condition (21-1) is satisfied:

$$2.60 < (Dw+Dt)/(2 \cdot \Sigma Dt) < 4.0 \qquad (21\text{-}1).$$

Furthermore, it is most preferable that the following condition (21-2) is satisfied:

$$2.70 < (Dw+Dt)/(2 \cdot \Sigma Dt) < 3.2 \qquad (21\text{-}2).$$

To reduce the thickness of the lens system when collapsed, it is preferable that the following condition (22) is satisfied:

$$0.8 < \Sigma Dt/fw < 3.3 \qquad (22),$$

wherein $\Sigma Dt$ is a length from the vertex of the lens surface closest to the object side in the first lens unit to the vertex of the lens surface closest to the image side in the second lens unit in the telephoto end. Above the upper limit of the condition (22), the thickness of the lens system when collapsed is insufficiently reduced. Below the lower limit, it becomes difficult to form the lens component having a desired refractive power.

Moreover, it is further preferable that the following condition (22-1) is satisfied:

$$1.2 < \Sigma Dt/fw < 2.8 \qquad (22\text{-}1).$$

Furthermore, it is most preferable that the following condition (22-2) is satisfied:

$$1.5 < \Sigma Dt/fw < 2.2 \qquad (22\text{-}2).$$

Further, the above zoom lens system preferably satisfies the following condition (23):

$$1.0 < y^*_{10}/a < 3.0 \qquad (23),$$

wherein $y^*_{10}$ denotes a length from the center of the image pickup surface of the electronic image sensor to the farthest point corresponding to the farthest point from the center of an image having its distortion corrected, a unit of $y^*_{10}$ is mm, a denotes a length between pixels in a longitudinal direction of the image pickup surface of the electronic image sensor, and a unit of a is μm.

Furthermore, it is further preferable that the following condition (23-1) is satisfied:

$$1.1 < y^*_{10}/a < 2.5 \qquad (23\text{-}1).$$

In addition, it is most preferable that the following condition (23-2) is satisfied:

$$1.2 < y^*_{10}/a < 2.2 \qquad (23\text{-}2).$$

Moreover, in order to constitute the electronic image pickup apparatus to be thin, the following condition (24) is preferably satisfied so that an optical low pass filter is not used if possible:

$$Fw \geq 1.1a \ (\mu m) \qquad (24),$$

wherein Fw denotes the full aperture F number of the zoom lens system in the wide-angle end, and a denotes the length between the pixels in the longitudinal direction of the image pickup surface of the electronic image sensor by a unit of μm. If this condition is satisfied, aliasing falls in an allowable level without any optical low pass filter.

Furthermore, it is further preferable that the following condition is satisfied:

$$Fw \geq 1.2a \ (\mu m) \qquad (24\text{-}1).$$

In addition, it is most preferable that the following condition is satisfied:

$$Fw \geq 1.3a \ (\mu m) \qquad (24\text{-}2).$$

This utilizes a characteristic that if a pixel size is below a certain degree, a spatial frequency component which is not less than the Nyquist frequency is eliminated by an influence of diffraction in the zoom lens system. If these conditions are not satisfied, the optical low pass filter is required.

To secure an image quality, it is preferable to use only the full aperture of the aperture stop. Therefore, in a case where the aperture size of the aperture stop is fixed, a mechanism for changing an aperture diameter of the aperture stop can be omitted. In consequence, it is possible to miniaturize and thin the system.

In the zoom lens system, it is preferable that any of lens units arranged on the image side of the first lens unit is constituted of only one lens component. As constitutions of the lens units arranged on the image side of the first lens unit, there are considered, for example, "only one positive lens unit", "two positive lens units", "two lens units of a positive lens unit and a negative lens unit", "three positive lens units", "three lens units of a positive lens unit, a negative lens unit and a positive lens unit" and the like. In these cases, when any of the lens units is constituted of one lens component (one lens component has only two lens surfaces that come into contact with air), that is, one single lens or one cemented lens, a depth of the lens system when collapsed can remarkably be reduced.

It is to be noted that the above-described constitutions or conditions may be used alone or as a combination of them. In a case where a plurality of conditions having different ranges is set with respect to the same parameter, the upper limits may appropriately be combined with the lower limits to set a new condition. For example, the lower limit of the condition (10) may be combined with the upper limit of the condition (10-1) to set the following new condition:

$$9.4 < fR/|fA| < 1.0 \tag{10-4}.$$

This also applies to another combination of conditions. Such new condition is not explicitly described, but is a part of matters disclosed in the present specification.

Next, there will be described numerical examples of the second type of zoom lens system with reference to the drawings.

EXAMPLE 9

Figure 17A:
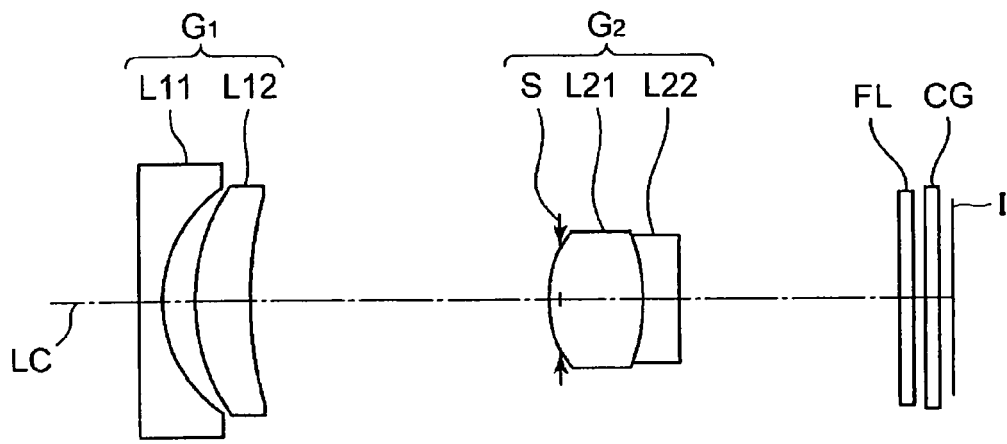
FIGS. 17A to 17C are sectional views along an optical axis, showing an optical constitution of a zoom lens system in Example 9 of the present invention.
Figure 17B:
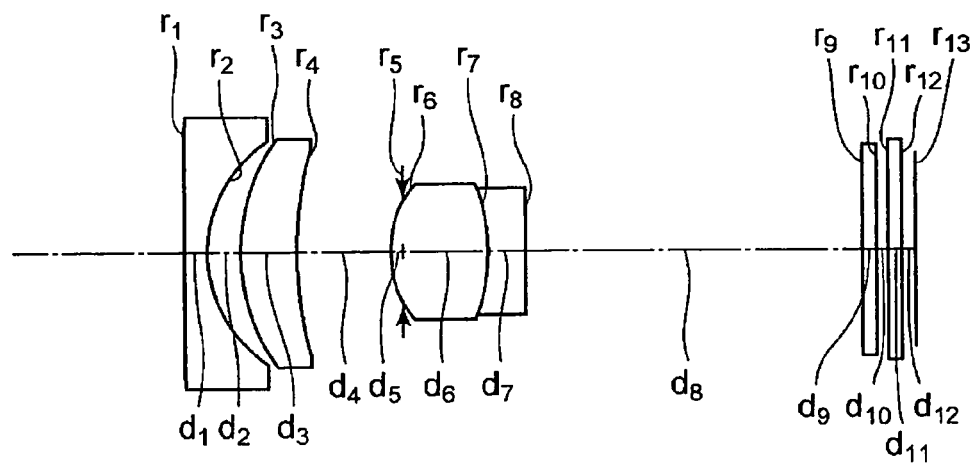
Figure 17C:
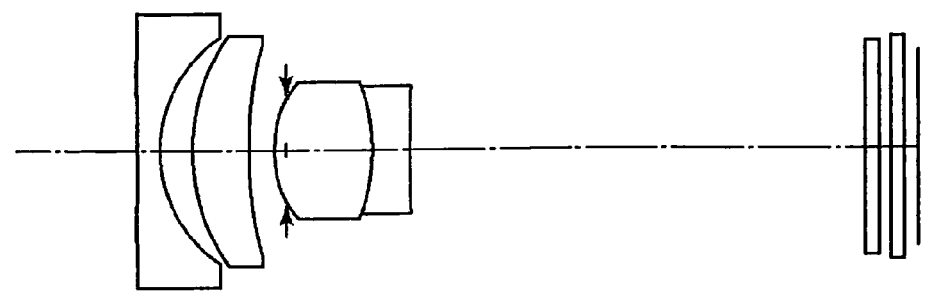
Figure 18A:
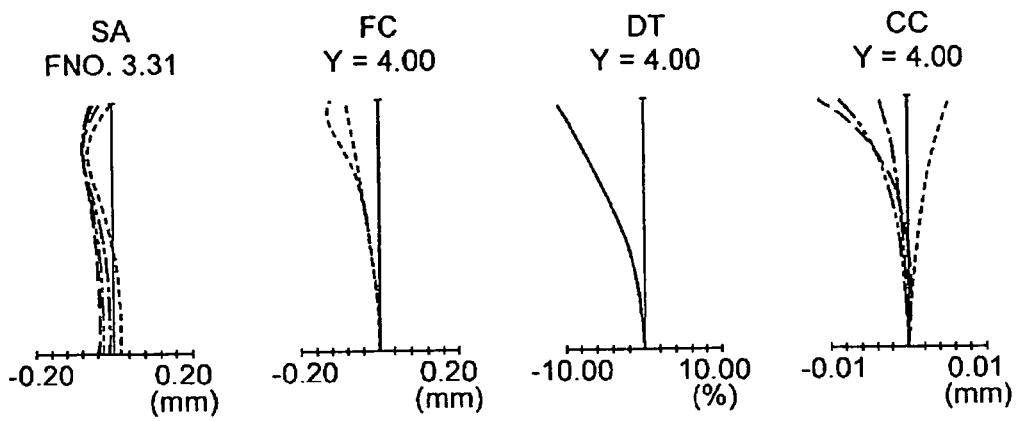
FIGS. 18A to 18C are diagrams showing a spherical aberration SA, an astigmatism FC, a distortion DT and a chromatic aberration CC of magnification when focused on an infinite object in Example 9.
Figure 18B:
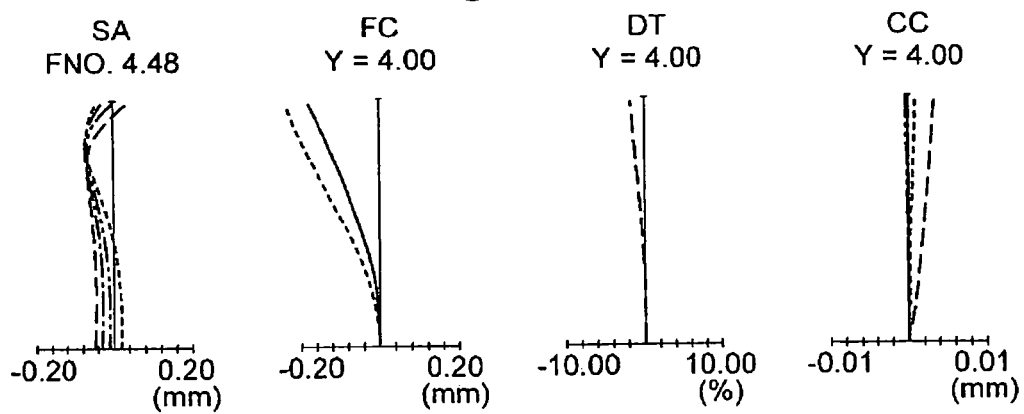
Figure 18C:
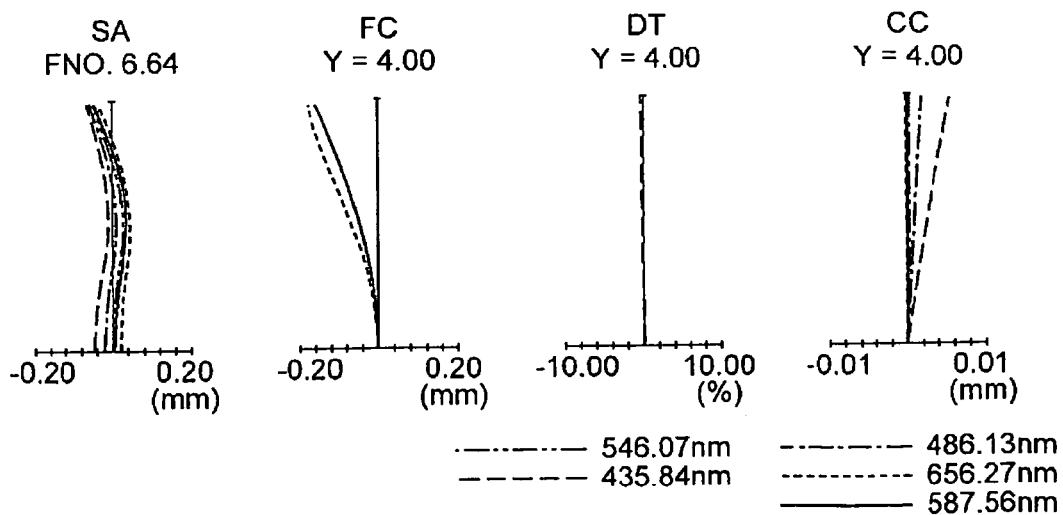

FIGS. 17A to 17C show sectional views along an optical axis, showing an optical constitution of a zoom lens system in Example 9, FIG. 17A shows a state in a wide-angle end, FIG. 17B shows an intermediate state, and FIG. 17C shows a state in a telephoto end. FIGS. 18A to 18C are diagrams showing a spherical aberration SA, an astigmatism FC, a distortion DT and a chromatic aberration CC of magnification when focused on an infinite object in Example 9, FIG. 18A shows a state in the wide-angle end, FIG. 18B shows an intermediate state, and FIG. 18C shows a state in the telephoto end.

The zoom lens system of Example 9 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the lens L11 and the positive meniscus lens L12. The negative meniscus lens L11 has an aspherical surface on the image side.

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 moves toward the object side, the second lens unit G2 further moves toward the object side, and the space therebetween further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 9.

TABLE 26

Numerical Data 9

| Surface | R | D | Nd | Vd |
|---|---|---|---|---|
| 1 | 250.068 | 1.00 | 1.80610 | 40.92 |
| 2* | 4.556 | 1.33 | | |
| 3 | 7.527 | 2.33 | 2.00069 | 25.46 |
| 4 | 15.845 | D4 | | |
| 5 (AS) | ∞ | −0.53 | | |
| 6* | 4.395 | 4.00 | 1.49700 | 81.61 |
| 7 | −7.297 | 1.49 | 1.68893 | 31.08 |
| 8* | −32.808 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.60 | | |
| 13 (IS) | ∞ | | | |

*Aspherical surface AS: Aperture stop IS: Image surface

TABLE 27

Aspherical Coefficient

| Surface | k | $A_4$ | $A_6$ | $A_8$ | $A_{10}$ |
|---|---|---|---|---|---|
| 2 | −1.136 | 8.08242e−04 | 1.04700e−05 | −5.12099e−07 | 1.19042e−08 |
| 6 | −0.225 | 3.84983e−07 | 6.98188e−05 | −8.04616e−06 | 5.30603e−07 |
| 8 | 0.000 | 1.87726e−0 | 1.60277e−04 | −5.65876e−05 | 1.51576e−06 |

TABLE 28

Zoom Data

| | WE | ST | TE |
|---|---|---|---|
| F (mm) | 6.226 | 12.175 | 17.996 |
| FNO | 3.31 | 4.48 | 6.64 |
| Y (mm) | 4.00 | 4.00 | 4.00 |
| D4 | 12.62 | 4.37 | 1.58 |
| D8 | 7.78 | 12.15 | 16.51 |

EXAMPLE 10

Figure 19A:
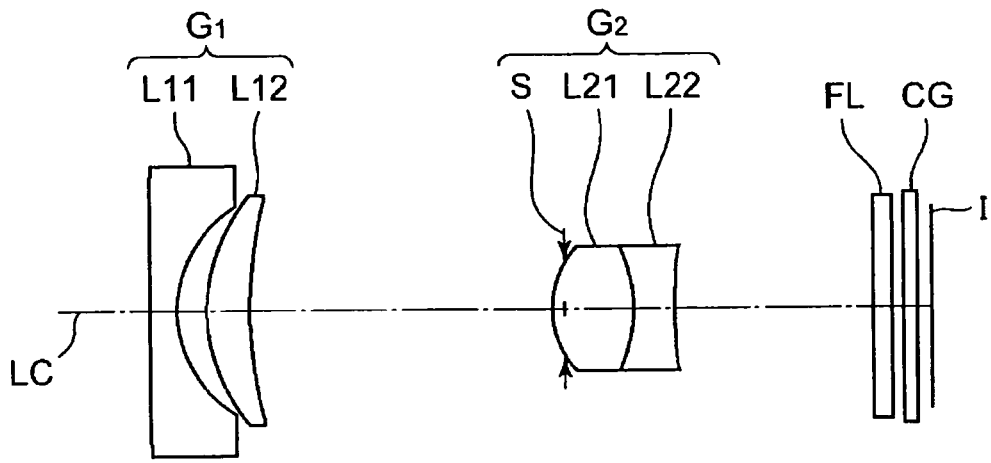
FIGS. 19A to 19C are sectional views along an optical axis, showing an optical constitution of a zoom lens system in Example 10 of the present invention.
Figure 19B:
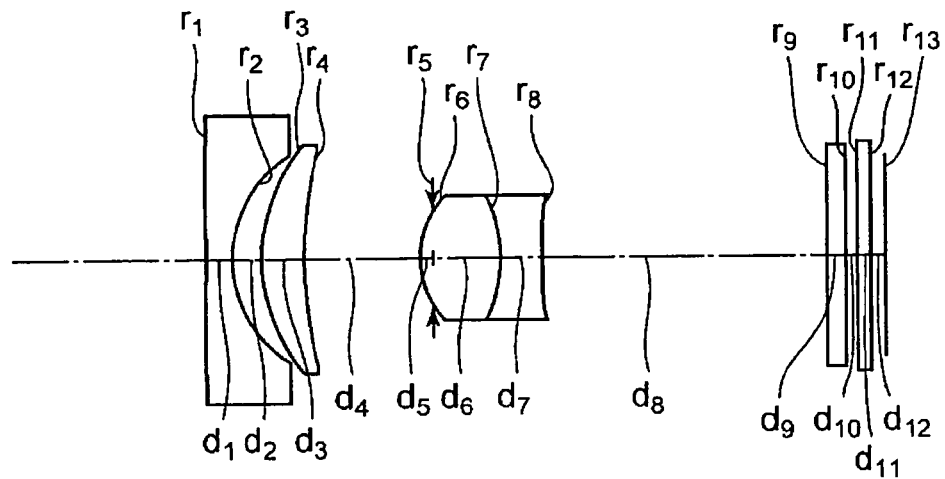
Figure 19C:
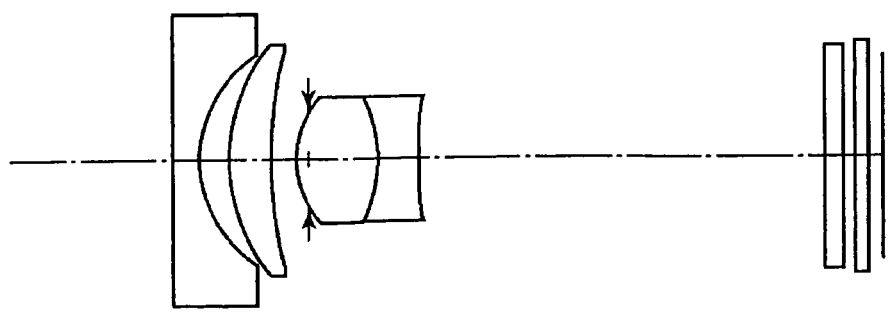
Figure 20A:
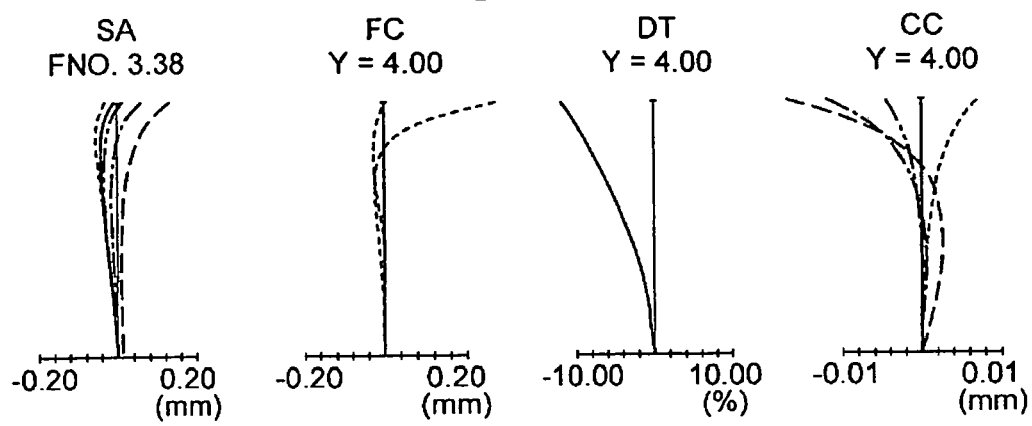
FIGS. 20A to 20C are diagrams showing a spherical aberration SA, an astigmatism FC, a distortion DT and a chromatic aberration CC of magnification when focused on an infinite object in Example 10.
Figure 20B:
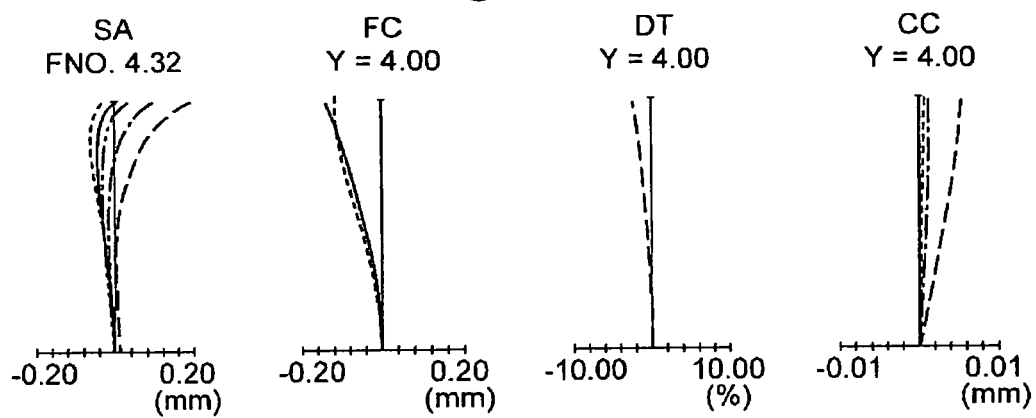
Figure 20C:
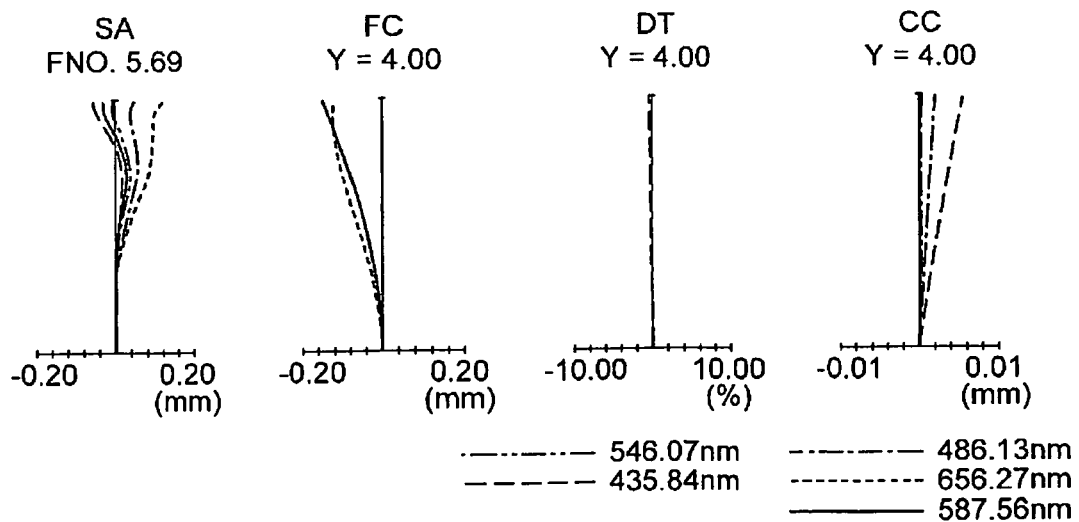

FIGS. 19A to 19C are sectional views along an optical axis, showing an optical constitution of a zoom lens system in Example 10, FIG. 19A shows a state in a wide-angle end, FIG. 19B shows an intermediate state, and FIG. 19C shows a state in a telephoto end. FIGS. 20A to 20C are diagrams showing a spherical aberration SA, an astigmatism FC, a distortion DT and a chromatic aberration CC of magnification when focused on an infinite object in Example 10, FIG. 20A shows a state in the wide-angle end, FIG. 20B shows an intermediate state, and FIG. 20C shows a state in the telephoto end.

The zoom lens system of Example 10 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the negative meniscus lens and the positive meniscus lens. The negative meniscus lens L11 has an aspherical surface on the image side.

TABLE 29

Numerical Data 10

| Surface | R | D | Nd | Vd |
|---|---|---|---|---|
| 1 | 922.031 | 1.05 | 1.80610 | 40.92 |
| 2* | 4.095 | 1.17 | | |
| 3 | 6.921 | 1.70 | 2.00069 | 25.46 |
| 4 | 17.300 | D4 | | |
| 5 (AS) | ∞ | −0.50 | | |
| 6* | 3.828 | 3.19 | 1.49700 | 81.61 |
| 7 | −6.086 | 1.67 | 1.68893 | 31.07 |
| 8* | −50.863 | D8 | | |
| 9 | ∞ | 0.76 | 1.54771 | 62.84 |
| 10 | ∞ | 0.50 | | |
| 11 | ∞ | 0.50 | 1.51633 | 64.14 |
| 12 | ∞ | 0.60 | | |
| 13 (IS) | ∞ | | | |

*Aspherical surface AS: Aperture stop IS: Image surface

TABLE 30

Aspherical Coefficient

| Surface | k | $A_4$ | $A_6$ | $A_8$ | $A_{10}$ |
|---|---|---|---|---|---|
| 2 | −1.024 | 8.79240e−04 | 1.70698e−06 | 2.25859e−09 | 1.19042e−08 |
| 6 | −0.033 | −8.00844e−05 | 2.50122e−06 | 6.74718e−06 | −7.28132e−07 |
| 8 | 0.000 | 3.04106e−03 | 3.34496e−04 | −2.45110e−05 | 8.04457e−06 |

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 again moves toward the object side, and the space between the first lens unit and the second lens unit G2 further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 10.

TABLE 31

Zoom Data

| | WE | ST | TE |
|---|---|---|---|
| f (mm) | 5.620 | 9.998 | 16.279 |
| FNO | 3.38 | 4.32 | 5.69 |
| Y (mm) | 4.00 | 4.00 | 4.00 |
| D4 | 12.68 | 5.20 | 1.50 |
| D8 | 7.83 | 11.24 | 16.18 |

EXAMPLE 11

Figure 21A:
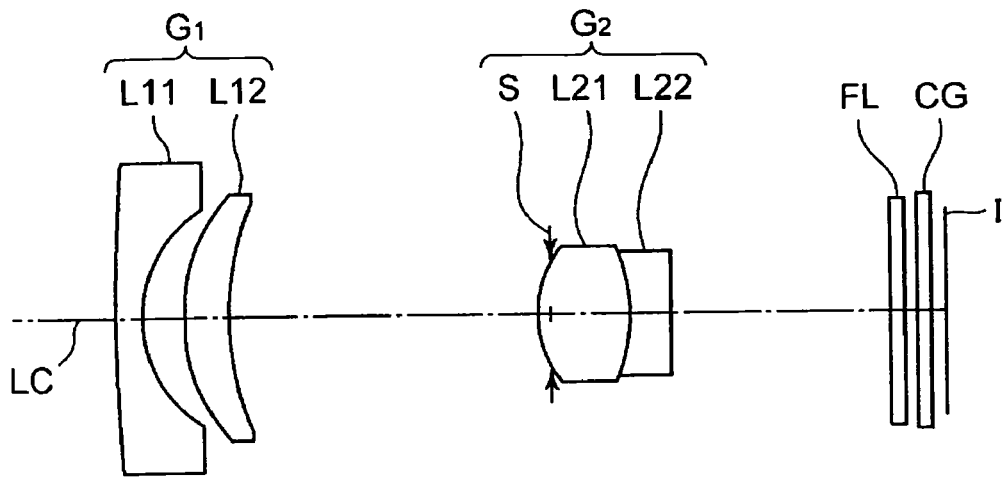
FIGS. 21A to 21C are sectional views along an optical axis, showing an optical constitution of a zoom lens system in Example 11 of the present invention.
Figure 21B:
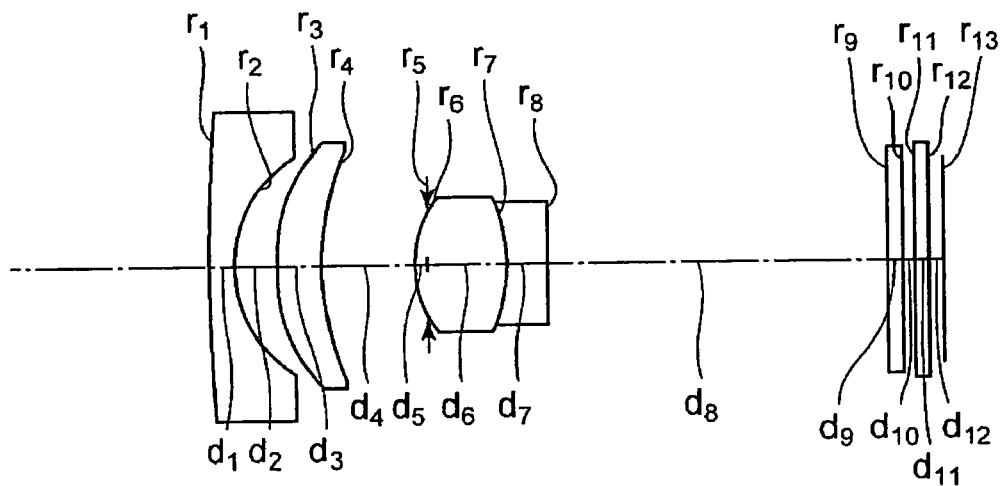
Figure 21C:
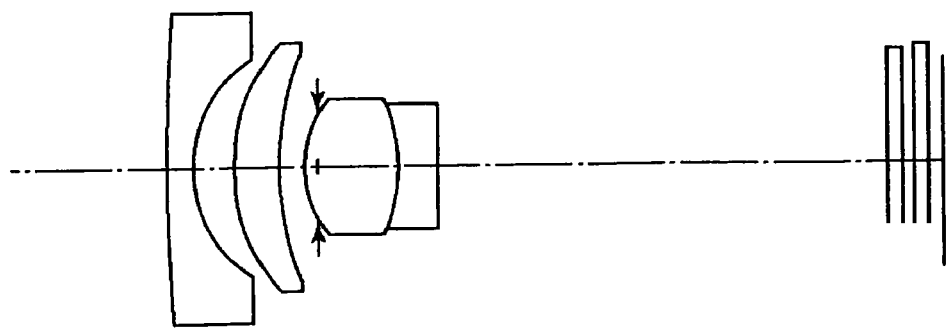
Figure 22A:
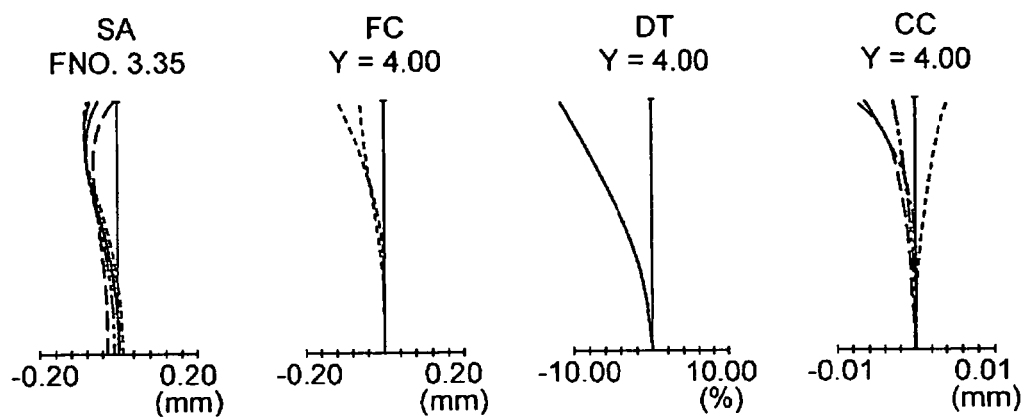
FIGS. 22A to 22C are diagrams showing a spherical aberration SA, an astigmatism FC, a distortion DT and a chromatic aberration CC of magnification when focused on an infinite object in Example 11.
Figure 22B:
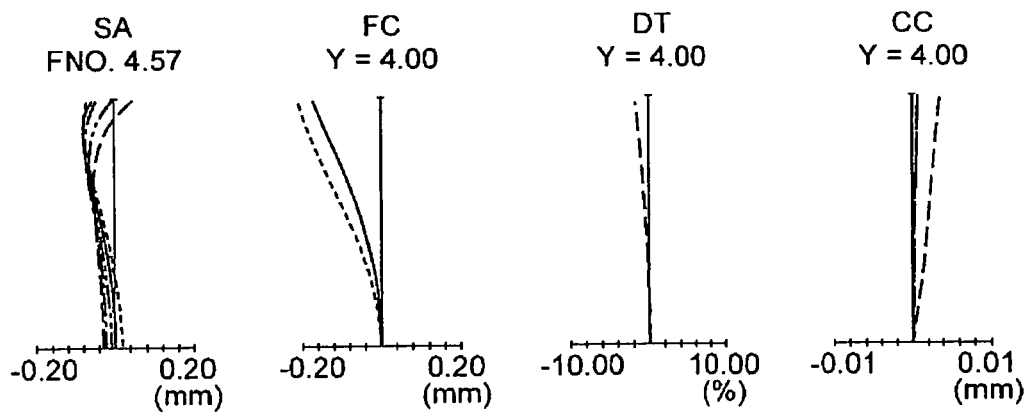
Figure 22C:
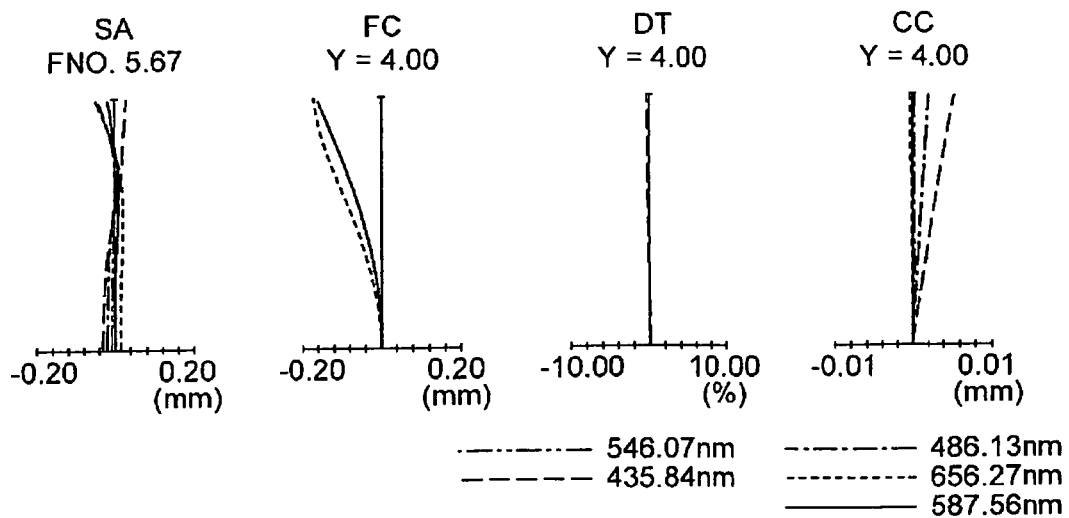

FIGS. 21A to 21C are sectional views along an optical axis, showing an optical constitution of a zoom lens system in Example 11, FIG. 21A shows a state in a wide-angle end, FIG. 21B shows an intermediate state, and FIG. 21C shows a state in a telephoto end. FIGS. 22A to 22C are diagrams showing a spherical aberration SA, an astigmatism FC, a distortion DT and a chromatic aberration CC of magnification when focused on an infinite object in Example 11, FIG. 22A shows a state in the wide-angle end, FIG. 22B shows an intermediate state, and FIG. 22C shows a state in the telephoto end.

The zoom lens system of Example 11 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the negative meniscus lens and the positive meniscus lens. The negative meniscus lens L11 has an aspherical surface on the image side.

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 again moves toward the object side, and the space between the first lens unit and the second lens unit G2 further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 11.

TABLE 32

Numerical Data 11

| Surface | R | D | Nd | Vd |
|---|---|---|---|---|
| 1 | 67.974 | 1.00 | 1.74320 | 49.34 |
| 2* | 4.359 | 1.59 | | |
| 3 | 6.938 | 1.83 | 2.00330 | 28.27 |
| 4 | 11.039 | D4 | | |
| 5 (AS) | ∞ | −0.50 | | |
| 6* | 4.141 | 3.59 | 1.49700 | 81.61 |
| 7 | −7.008 | 1.53 | 1.68893 | 31.08 |
| 8* | −35.323 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.60 | | |
| 13 (IS) | ∞ | | | |

*Aspherical surface AS: Aperture stop IS: Image surface

TABLE 33

Aspherical Coefficient

| Surface | k | $A_4$ | $A_6$ | $A_8$ | $A_{10}$ |
|---|---|---|---|---|---|
| 2 | −0.835 | 6.72372e−04 | −8.32895e−06 | 1.03527e−07 | 0 |
| 6 | −0.825 | 1.18328e−03 | 1.04436e−04 | −8.41120e−06 | 8.39173e−07 |
| 8 | 0.000 | 2.25904e−03 | 2.54243e−04 | −2.28439e−05 | 4.60983e−06 |

TABLE 34

Zoom Data

| | WE | ST | TE |
|---|---|---|---|
| f (mm) | 5.909 | 11.818 | 17.110 |
| FNO | 3.35 | 4.57 | 5.67 |
| Y (mm) | 4.00 | 4.00 | 4.00 |
| D4 | 12.46 | 4.10 | 1.51 |
| D8 | 8.40 | 13.10 | 17.38 |

EXAMPLE 12

Figure 23A:
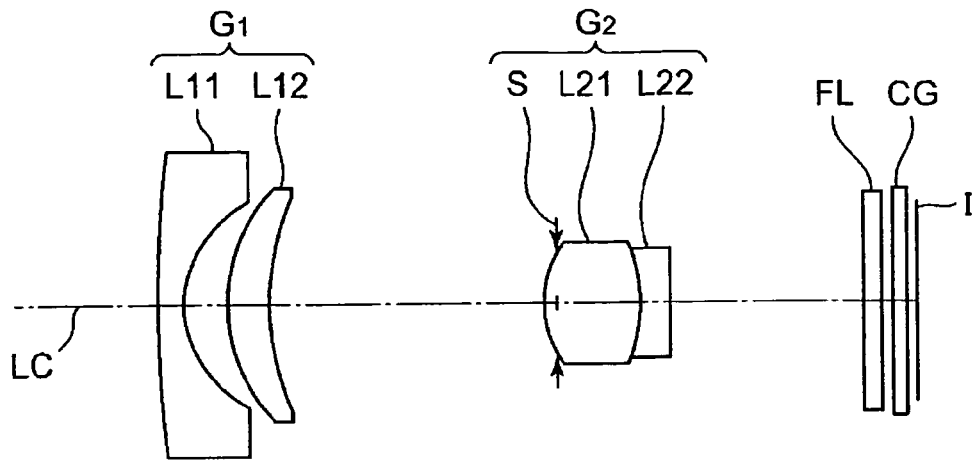
FIGS. 23A to 23C are sectional views along an optical axis, showing an optical constitution of a zoom lens system in Example 12 of the present invention.
Figure 23B:
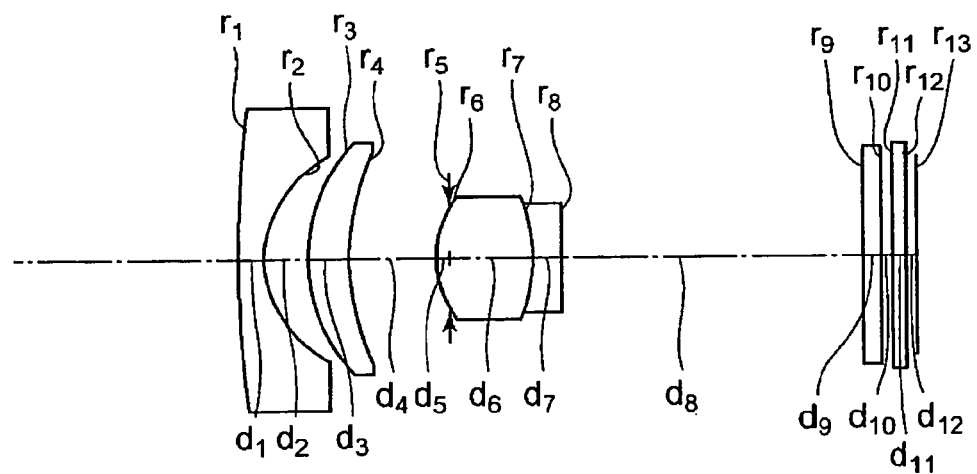
Figure 23C:
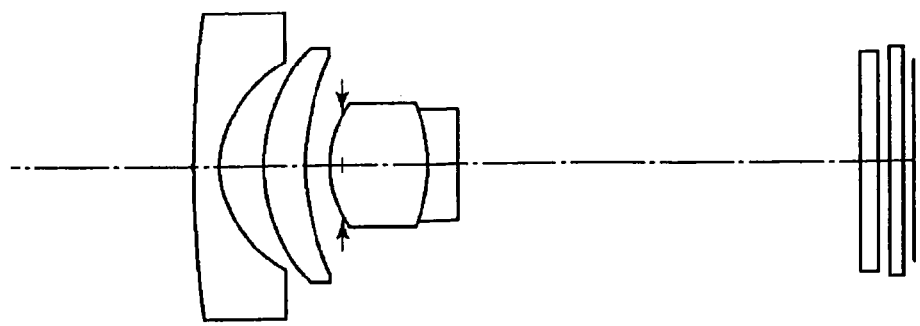
Figure 24A:
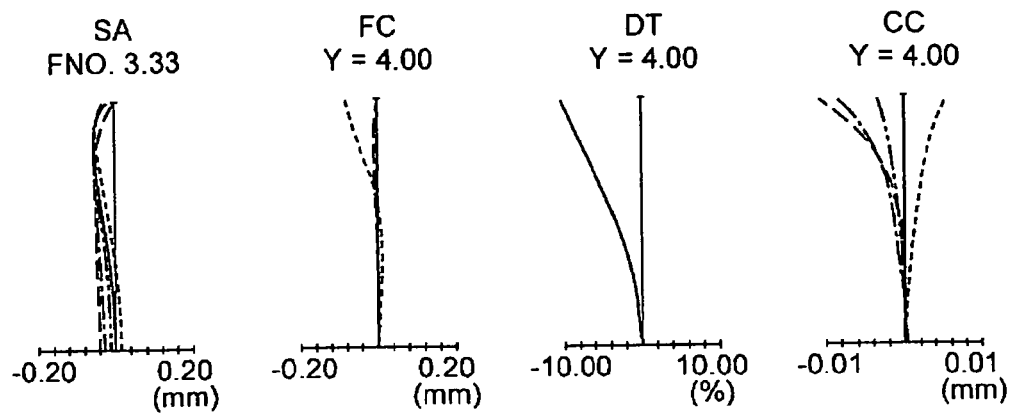
FIGS. 24A to 24C are diagrams showing a spherical aberration SA, an astigmatism FC, a distortion DT and a chromatic aberration CC of magnification when focused on an infinite object in Example 12.
Figure 24B:
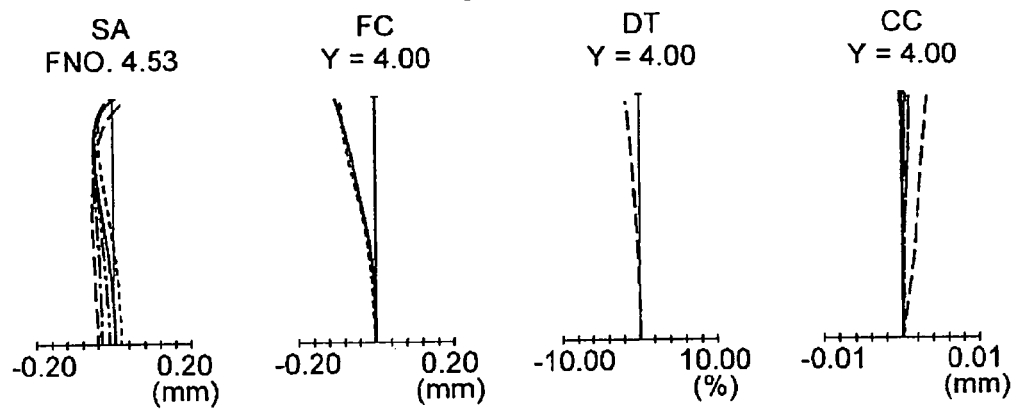
Figure 24C:
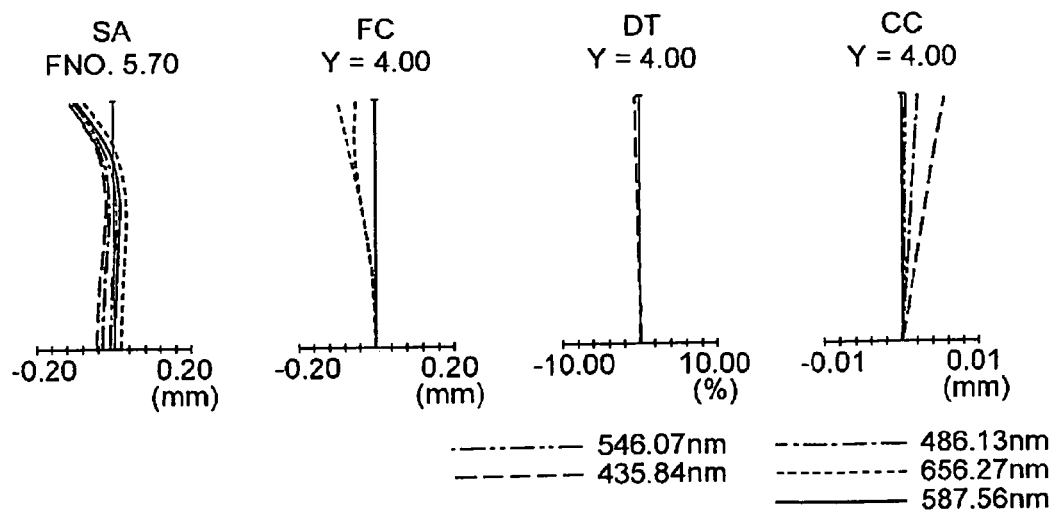

FIGS. 23A to 23C are sectional views along an optical axis, showing an optical constitution of a zoom lens system in Example 12, FIG. 23A shows a state in a wide-angle end, FIG. 23B shows an intermediate state, and FIG. 23C shows a state in a telephoto end. FIGS. 24A to 24C are diagrams showing a spherical aberration SA, an astigmatism FC, a distortion DT and a chromatic aberration CC of magnification when focused on an infinite object in Example 12, FIG. 24A shows a state in the wide-angle end, FIG. 24B shows an intermediate state, and FIG. 24C shows a state in the telephoto end.

The zoom lens system of Example 12 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the negative meniscus lens and the positive meniscus lens. The negative meniscus lens L11 has an aspherical surface on the image side.

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 again moves toward the object side, and the space between the first lens unit and the second lens unit G2 further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 12.

TABLE 35

Numerical Data 12

| Surface | R | D | Nd | Vd |
|---|---|---|---|---|
| 1 | 42.910 | 1.05 | 1.74320 | 49.34 |
| 2* | 3.901 | 1.80 | | |
| 3 | 6.598 | 1.74 | 2.00330 | 28.27 |
| 4 | 10.102 | D4 | | |
| 5 (AS) | ∞ | −0.50 | | |
| 6* | 4.005 | 4.00 | 1.49700 | 81.61 |
| 7 | −6.224 | 1.20 | 1.68893 | 31.07 |
| 8* | −26.605 | D8 | | |
| 9 | ∞ | 0.76 | 1.57441 | 62.84 |
| 10 | ∞ | 0.50 | | |
| 11 | ∞ | 0.50 | 1.51633 | 64.14 |
| 12 | ∞ | 0.39 | | |
| 13 (IS) | ∞ | | | |

*Aspherical surface AS: Aperture stop IS: Image surface

TABLE 36

Aspherical Coefficient

| Surface | k | $A_4$ | $A_6$ | $A_8$ | $A_{10}$ |
|---|---|---|---|---|---|
| 2 | −0.868 | 9.04885e−04 | 1.06270e−05 | 2.60847e−07 | 0 |
| 6 | −0.136 | −6.47187e−05 | −4.94017e−07 | 5.38159e−06 | −5.22063e−07 |
| 8 | 0.000 | 2.69143e−03 | 1.32771e−04 | −2.74676e−05 | −8.19770e−07 |

TABLE 37

Zoom Data

| | WE | ST | TE |
|---|---|---|---|
| f (mm) | 5.358 | 10.585 | 15.669 |
| FNO | 3.33 | 4.53 | 5.70 |
| Y (mm) | 4.00 | 4.00 | 4.00 |
| D4 | 11.78 | 4.07 | 1.50 |
| D8 | 7.78 | 12.15 | 16.51 |

EXAMPLE 13

Figure 25A:
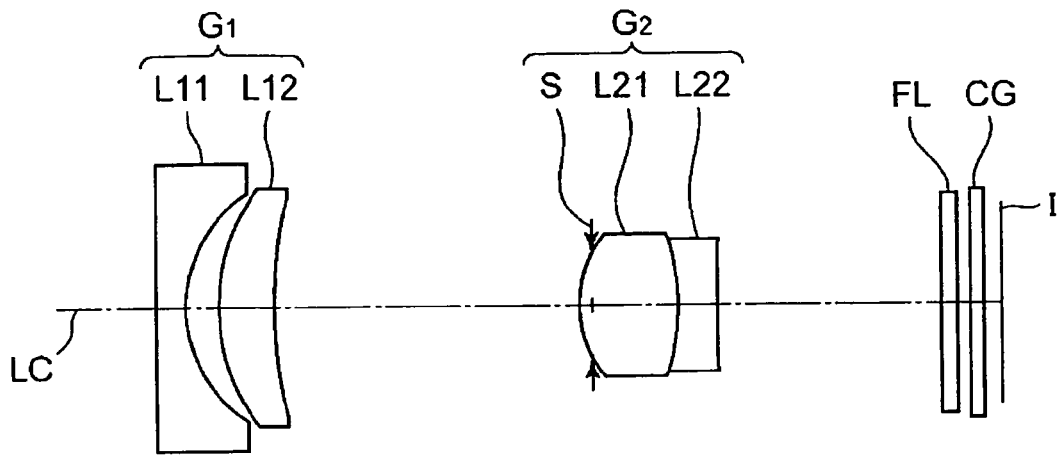
FIGS. 25A to 25C are sectional views along an optical axis, showing an optical constitution of a zoom lens system in Example 13 of the present invention.
Figure 25B:
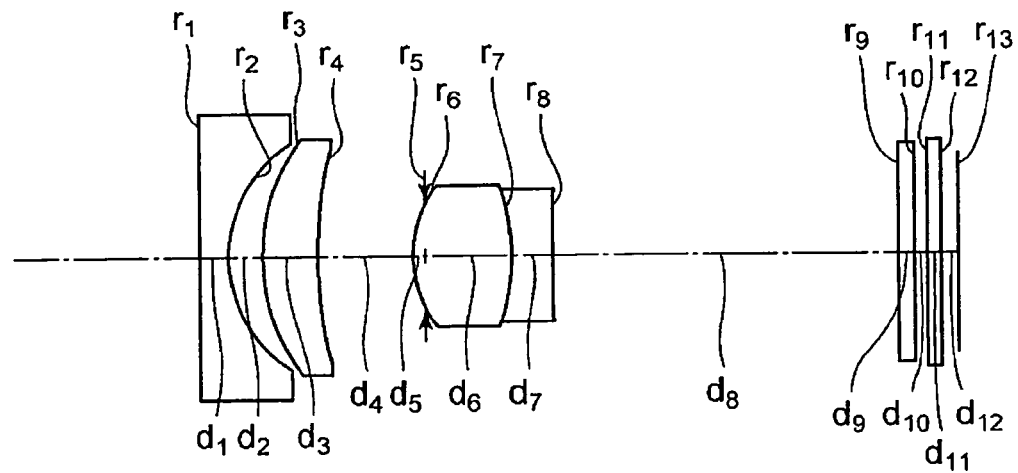
Figure 25C:
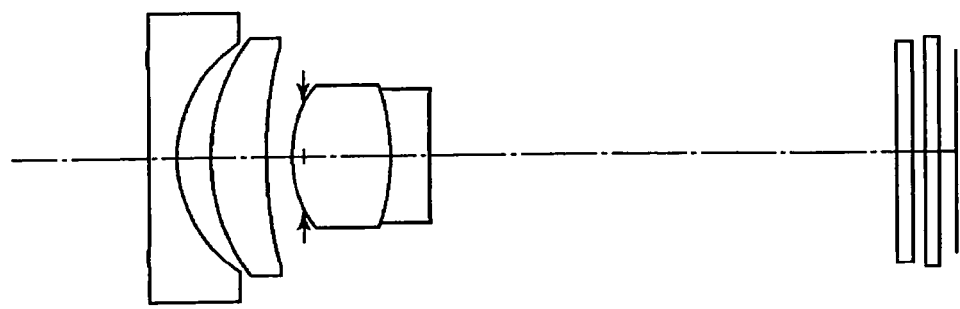
Figure 26A:
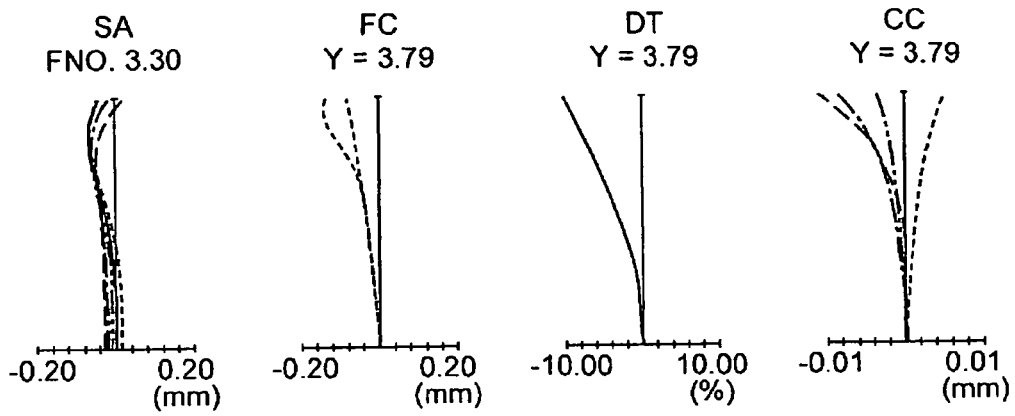
FIGS. 26A to 26C are diagrams showing a spherical aberration SA, an astigmatism FC, a distortion DT and a chromatic aberration CC of magnification when focused on an infinite object in Example 13.
Figure 26B:
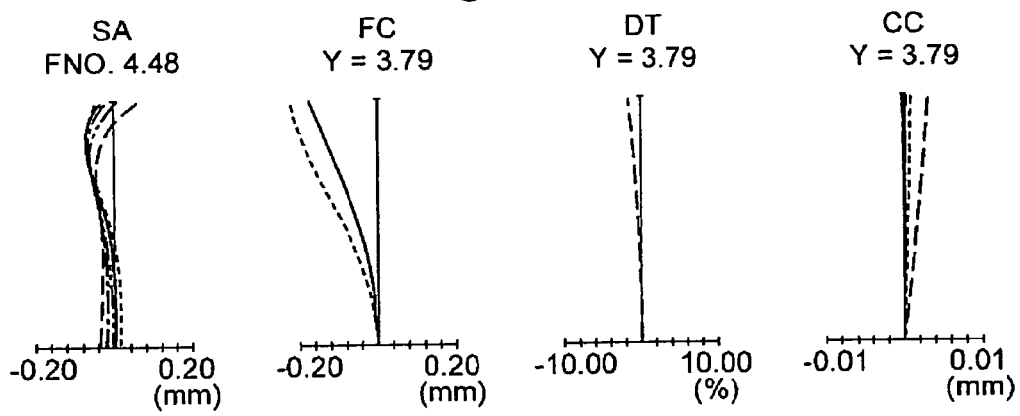
Figure 26C:
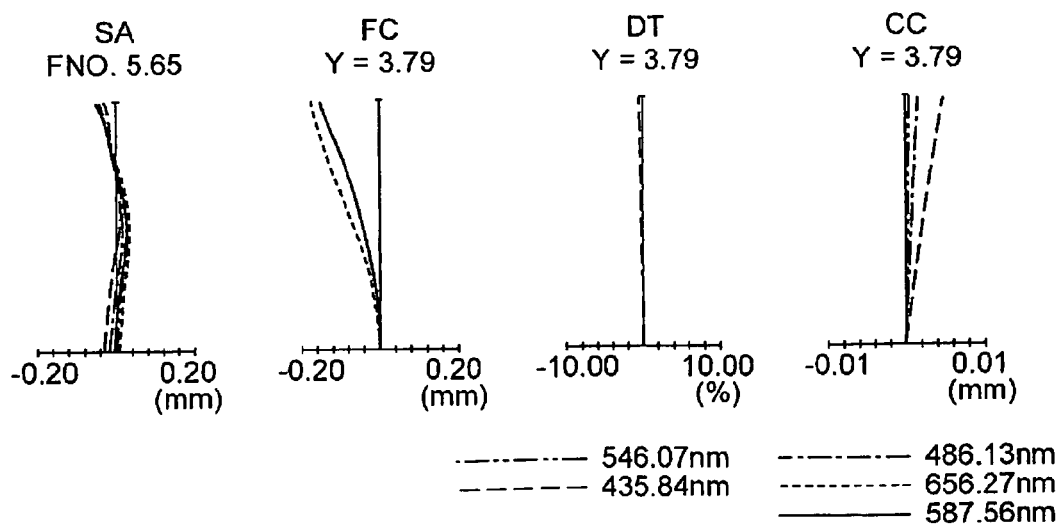

FIGS. 25A to 25C are sectional views along an optical axis, showing an optical constitution of a zoom lens system in Example 13, FIG. 25A shows a state in a wide-angle end, FIG. 25B shows an intermediate state, and FIG. 25C shows a state in a telephoto end. FIGS. 26A to 26C are diagrams showing a spherical aberration SA, an astigmatism FC, a distortion DT and a chromatic aberration CC of magnification when focused on an infinite object in Example 13, FIG. 26A shows a state in the wide-angle end, FIG. 26B shows an intermediate state, and FIG. 26C shows a state in the telephoto end.

The zoom lens system of Example 13 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the negative meniscus lens and the positive meniscus lens. The negative meniscus lens L11 has an aspherical surface on the image side.

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 again moves toward the object side, and the space between the first lens unit and the second lens unit G2 further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 13.

TABLE 38

Numerical Data 13

| Surface | R | D | Nd | Vd |
|---|---|---|---|---|
| 1 | 280.308 | 1.16 | 1.80610 | 40.92 |
| 2* | 4.306 | 1.27 | | |
| 3 | 7.232 | 2.09 | 2.00069 | 25.46 |
| 4 | 15.661 | D4 | | |

TABLE 38-continued

Numerical Data 13

| Surface | R | D | Nd | Vd |
|---|---|---|---|---|
| 5 (AS) | ∞ | −0.50 | | |
| 6* | 4.129 | 3.80 | 1.49700 | 81.61 |
| 7 | −6.751 | 1.44 | 1.68893 | 31.08 |
| 8* | −33.079 | D8 | | |
| 9 | ∞ | 0.50 | 1.51633 | 64.14 |
| 10 | ∞ | 0.50 | | |
| 11 | ∞ | 0.50 | 1.51633 | 64.14 |
| 12 | ∞ | 0.60 | | |
| 13 (IS) | ∞ | | | |

*Aspherical surface AS: Aperture stop IS: Image surface

TABLE 39

Aspherical Coefficient

| Surface | k | $A_4$ | $A_6$ | $A_8$ | $A_{10}$ |
|---|---|---|---|---|---|
| 2 | −1.148 | 9.34434e−04 | 1.43105e−05 | −9.06925e−07 | 2.34642e−08 |
| 6 | −0.227 | −1.66242e−05 | 9.99900e−05 | −1.35791e−05 | 1.00549e−06 |
| 8 | 0.000 | 2.25782e−03 | 2.26033e−04 | −1.07638e−05 | 2.82873e−06 |

TABLE 40

Zoom Data

| | WE | ST | TE |
|---|---|---|---|
| f (mm) | 5.885 | 11.521 | 17.041 |
| FNO | 3.30 | 4.48 | 5.65 |
| Y (mm) | 3.79 | 3.79 | 3.79 |
| D4 | 12.05 | 4.17 | 1.50 |
| D8 | 8.39 | 13.02 | 17.60 |

EXAMPLE 14

Figure 27A:
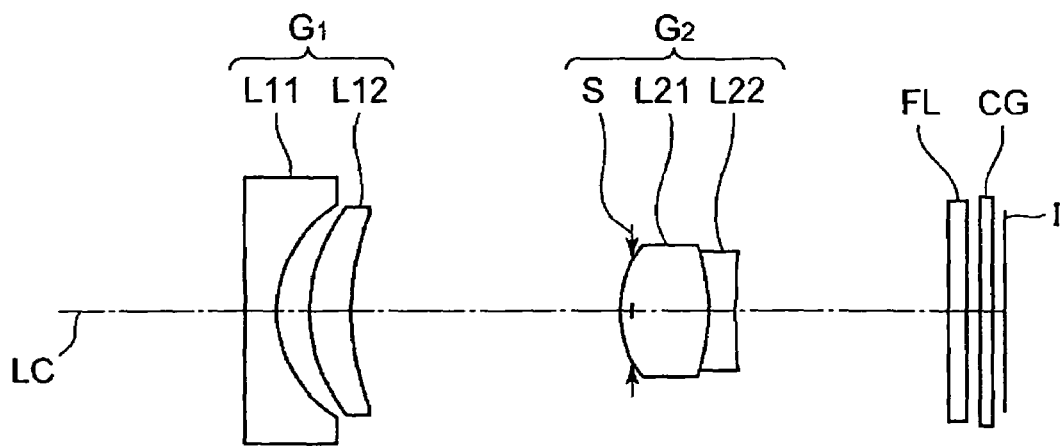
FIGS. 27A to 27C are sectional views along an optical axis, showing an optical constitution of a zoom lens system in Example 14 of the present invention.
Figure 27B:
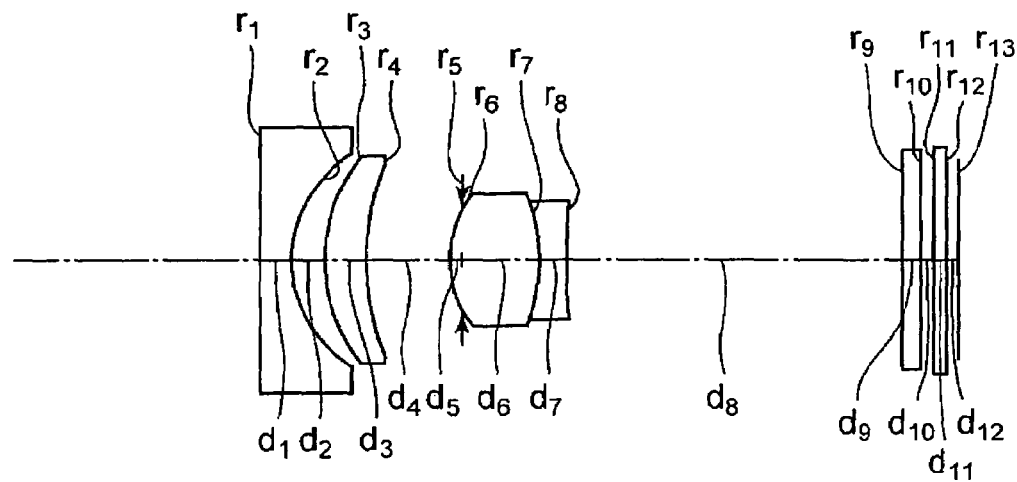
Figure 27C:
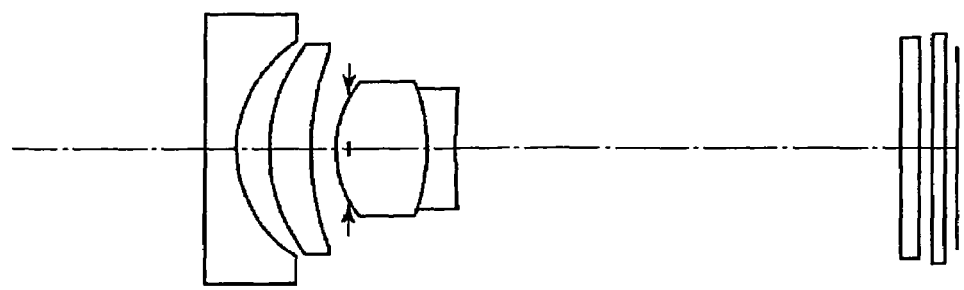
Figure 28A:
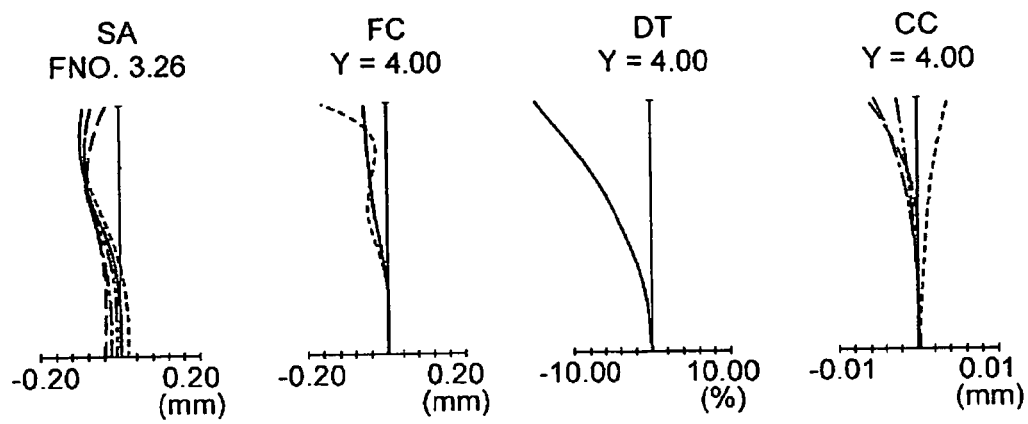
FIGS. 28A to 28C are diagrams showing a spherical aberration SA, an astigmatism FC, a distortion DT and a chromatic aberration CC of magnification when focused on an infinite object in Example 14.
Figure 28B:
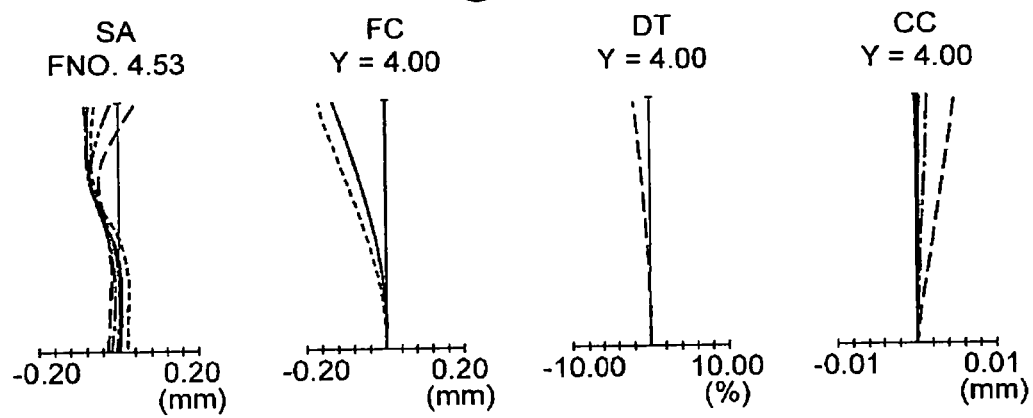
Figure 28C:
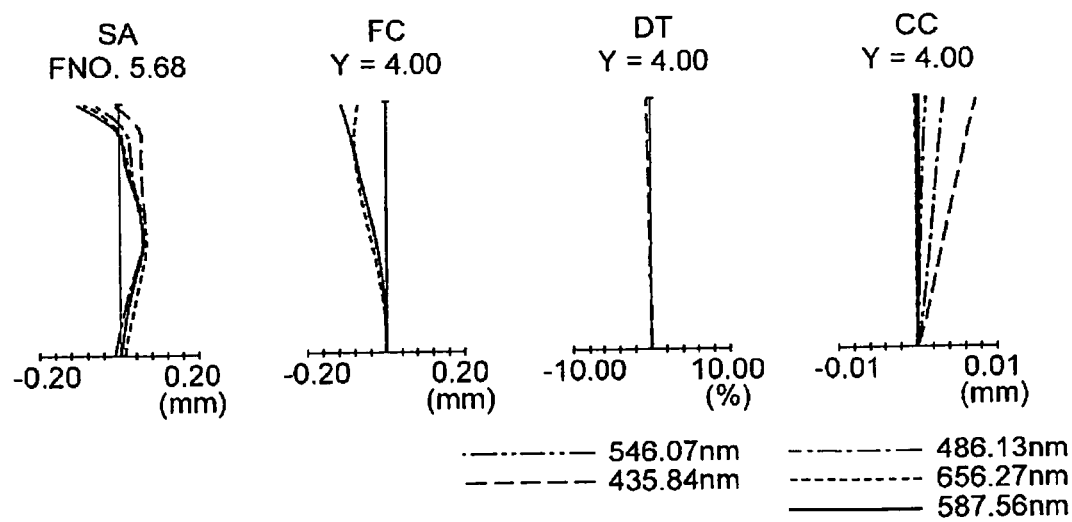

FIGS. 27A to 27C are sectional views along an optical axis, showing an optical constitution of a zoom lens system in Example 14, FIG. 27A shows a state in a wide-angle end, FIG. 27B shows an intermediate state, and FIG. 27C shows a state in a telephoto end. FIGS. 28A to 28C are diagrams showing a spherical aberration SA, an astigmatism FC, a distortion DT and a chromatic aberration CC of magnification when focused on an infinite object in Example 14, FIG. 28A shows a state in the wide-angle end, FIG. 28B shows an intermediate state, and FIG. 28C shows a state in the telephoto end.

The zoom lens system of Example 14 is constituted of, in order from an object side, a first lens unit G1 having a negative refractive power, an aperture stop S and a second lens unit G2 having a positive refractive power. In the drawings, FL denotes a parallel flat plate such as an optical low pass filter or an infrared absorptive filter, CG denotes cover glass, and I denotes an image pickup surface of an image sensor such as a CCD image sensor or a CMOS image sensor. The first lens unit G1 is constituted of, in order from the object side: a negative meniscus lens L11 which directs its concave surface toward the image side; and a positive meniscus lens L12 which directs its convex surface on the object side with an air space between the negative meniscus lens and the positive meniscus lens. The negative meniscus lens L11 has an aspherical surface on the image side.

The second lens unit G2 is constituted of a cemented lens including, in order from the object side, a positive first lens L21 having an aspherical surface on an object-side surface and a negative second lens L22 having an aspherical surface on an image-side surface. The positive first lens L21 is a double-convex positive lens, and the negative second lens L22 is a meniscus lens which directs its convex surface on the image side in the vicinity of an optical axis.

Moreover, when the zooming is performed from the wide-angle end toward the telephoto end, the first lens unit G1 moves toward the image side, the second lens unit G2 moves toward the object side, and a space between the units decreases. Thereafter, the first lens unit G1 again moves toward the object side, and the space between the first lens unit and the second lens unit G2 further decreases. Such zooming system is adopted. That is, the first lens unit G1 moves to draw a locus convex toward the image side, and the second lens unit G2 constantly moves toward the object side. The aperture stop S is disposed on the object-side surface of the first lens L21 of the second lens unit G2, and moves integrally with the second lens unit G2.

Next, there will be described numerical data of optical members constituting the zoom lens system in Example 14.

TABLE 41

Numerical Data 14

| Surface | R | D | Nd | Vd |
|---|---|---|---|---|
| 1 | 289.049 | 1.24 | 1.74320 | 49.34 |
| 2* | 4.272 | 1.35 | | |
| 3 | 6.530 | 1.67 | 2.00330 | 28.27 |
| 4 | 10.551 | D4 | | |
| 5 (AS) | ∞ | −0.50 | | |
| 6* | 4.042 | 3.55 | 1.49700 | 81.61 |
| 7 | −6.969 | 1.11 | 1.58393 | 30.21 |
| 8* | −75.231 | D8 | | |
| 9 | ∞ | 0.76 | 1.54771 | 62.84 |
| 10 | ∞ | 0.50 | | |
| 11 | ∞ | 0.50 | 1.51633 | 64.14 |
| 12 | ∞ | 0.39 | | |
| 13 (IS) | ∞ | | | |

*Aspherical surface AS: Aperture stop IS: Image surface

TABLE 42

Aspherical Coefficient

| | Surface | | |
|---|---|---|---|
| | 2 | 6 | 8 |
| k | −0.801 | 0.047 | 0.000 |
| $A_4$ | 7.68306e−04 | −5.30379e−04 | 3.00085e−03 |
| $A_6$ | −8.82529e−06 | 2.18540e−04 | 4.82212e−04 |
| $A_8$ | 2.19613e−06 | −7.99714e−05 | −1.36755e−04 |
| $A_{10}$ | −6.85302e−08 | 1.27635e−05 | 3.92413e−05 |
| $A_{12}$ | 0 | −7.63108e−07 | −3.28147e−06 |

TABLE 43

Zoom Data

|  | WE | ST | TE |
|---|---|---|---|
| f (mm) | 5.910 | 11.870 | 17.268 |
| FNO | 3.26 | 4.53 | 5.68 |
| Y (mm) | 4.00 | 4.00 | 4.00 |
| D4 | 11.08 | 3.78 | 1.51 |
| D8 | 8.36 | 13.30 | 17.80 |

Next, values of the conditions of the above examples are shown in the following table.

In the following table 44, $\omega(y^*_{10} \times 0.6)$ denotes a half angle of field of the zoom lens system corresponding to an image height of $y^*_{10} \times 0.6$, and $\omega(y^*_{10} \times 0.8)$ denotes a half angle of field of the zoom lens system corresponding to an image height of $y^*_{10} \times 0.8$. In the table 44, $\omega(WE)$, $\omega(ST)$ and $\omega(TE)$ denote half angles of field of the zoom lens system in the wide-angle end, the intermediate state and the telephoto end, respectively.

In the table 44, as to $\omega(y^*_{10} \times 0.6)$ and $\omega(y^*_{10} \times 0.8)$, the image height $y^*_{10} \times 0.8$ and $y^*_{08}/(fw \cdot \tan \omega_{08w})$ indicate values before the correction of the distortion. Each example is based on assumption that the distortion is corrected by image processing in the vicinity of the wide-angle end. Therefore, $\omega(WE)$ denotes a half angle of field after the correction of the distortion. It is to be noted that during the correction of the distortion, $\omega(y^*_{10} \times 0.6)$ is set to be substantially unchanged before and after the correction.

TABLE 44

| | Example | | | | | |
|---|---|---|---|---|---|---|
| | 9 | 10 | 11 | 12 | 13 | 14 |
| $y^*_{10}$ | 3.8 | 3.8 | 3.8 | 3.8 | 3.8 | 3.8 |
| $\omega(y^*_{10} \times 0.6)$ | 20.86 | 23.01 | 21.97 | 24.04 | 20.87 | 22.23 |
| $\omega(y^*_{10} \times 0.8)$ | 27.65 | 30.34 | 29.06 | 31.48 | 27.63 | 29.61 |
| $\omega$ (WE) | 32.42 | 35.30 | 33.92 | 36.63 | 32.43 | 34.26 |
| $\omega$ (ST) | 17.59 | 21.27 | 18.08 | 20.14 | 17.59 | 18.10 |
| $\omega$ (TE) | 11.97 | 13.18 | 12.57 | 13.69 | 11.97 | 12.45 |
| $\Sigma T/fw$ | 1.63 | 1.56 | 1.61 | 1.83 | 1.66 | 1.51 |
| $fR/|fA|$ | 0.82 | 0.78 | 0.80 | 0.85 | 0.82 | 0.82 |
| $\beta RT$ | -1.59 | -1.47 | -1.54 | -1.57 | -1.59 | -1.69 |
| $(D12W - D12T)/(fw \cdot \gamma^2)$ | 0.21 | 0.24 | 0.22 | 0.22 | 0.21 | 0.19 |
| d11/fw | 0.21 | 0.21 | 0.27 | 0.34 | 0.22 | 0.23 |
| n1p - n1n | 0.19 | 0.19 | 0.26 | 0.26 | 0.19 | 0.26 |
| V1n - V1p | 15.46 | 15.46 | 21.07 | 21.07 | 15.46 | 21.07 |
| (R23 + R21)/(R23 - R21) | 0.76 | 0.86 | 0.79 | 0.74 | 0.78 | 0.90 |
| V2p | 81.61 | 81.61 | 81.61 | 81.61 | 81.61 | 81.61 |
| fw/R22 | -0.85 | -0.92 | -0.84 | -0.86 | -0.87 | -0.85 |
| $y^*_{08}/(fw \cdot \tan \omega_{08w})$ | 0.93 | 0.92 | 0.93 | 0.93 | 0.94 | 0.91 |
| $(dy^*/dy)_{y^*08}/(dy^*/dy)_{y^*00}$ | 0.80 | 0.79 | 0.79 | 0.81 | 0.81 | 0.73 |
| (Dw + Dt)/(2 · $\Sigma$Dt) | 2.92 | 3.04 | 2.94 | 2.80 | 2.89 | 3.02 |
| $\Sigma DT/fw$ | 1.80 | 1.74 | 1.79 | 2.01 | 1.83 | 1.68 |
| a (μm) | 1.65 | 1.65 | 1.65 | 2.25 | 2.25 | 2.25 |
| $y^*_{10}/a$ | 2.07 | 2.04 | 2.05 | 1.36 | 1.30 | 1.30 |
| Fw/a | 2.00 | 2.05 | 2.03 | 1.33 | 1.32 | 1.30 |

The above zoom lens system and/or the electronic image pickup apparatus can be used in a digital camera or a video camera, or an information processing device such as a personal computer, a phone, or especially a cellular phone which is convenient to carry, or the like. Examples will be described hereinafter.

Figure 29:
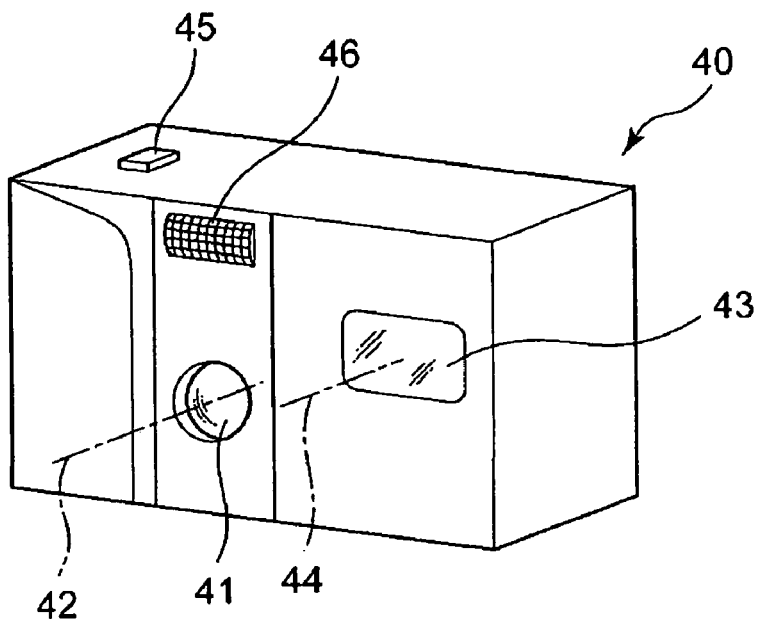
FIGS. 29 to 31 are diagrams showing an example of a digital camera to which the present invention has been applied.
Figure 30:
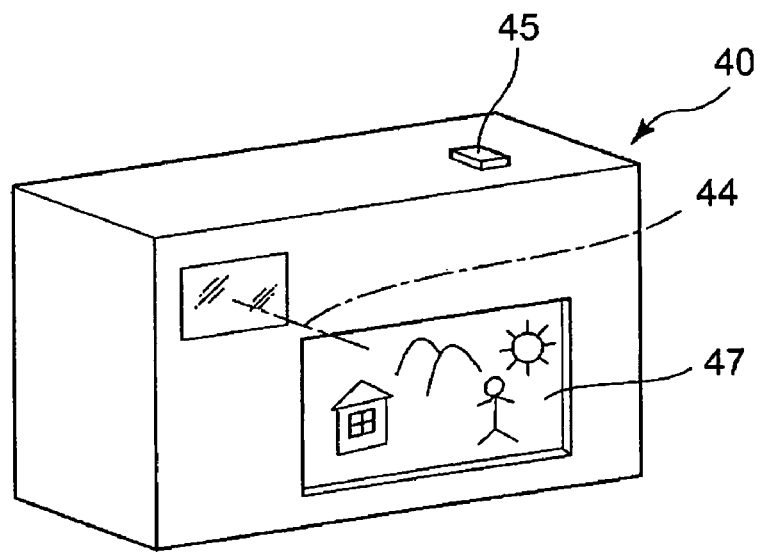
Figure 31:
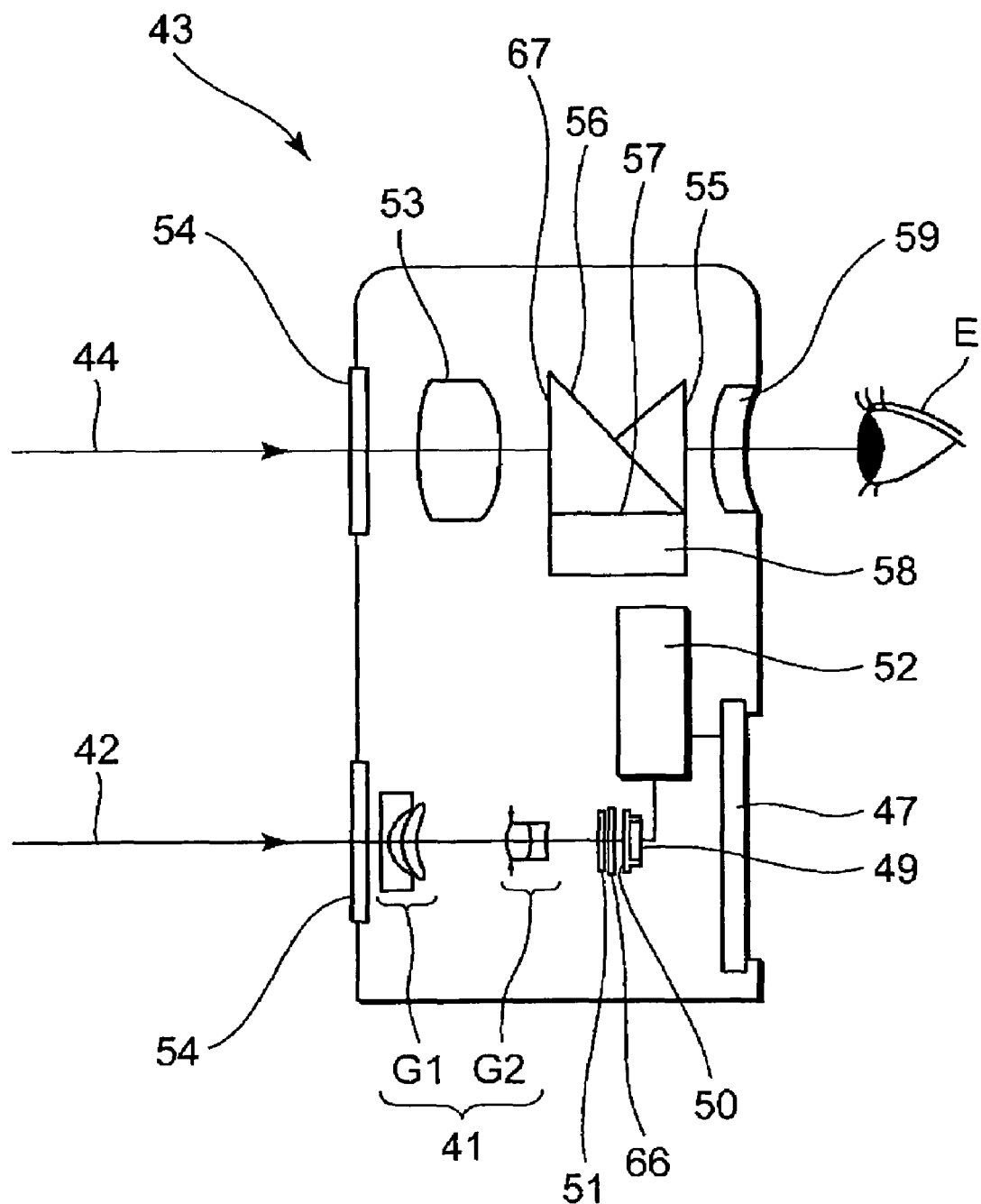

FIGS. 29 to 31 are diagrams showing an example of a digital camera to which the present invention has been applied, FIG. 29 is a front perspective view of the digital camera, and FIG. 30 is a rear perspective view of the digital camera, and FIG. 31 is a conceptual diagram showing an inner constitution of the digital camera.

In this example, a digital camera 40 includes: a photographing optical system 41 having a photographing optical path 42; a finder optical system 43 having an optical path 44 for a finder; a shutter button 45; an electronic flash lamp 46; a liquid crystal display monitor 47 and the like. When the shutter button 45 disposed on the upper portion of the camera 40 is pressed, the photographing is performed through the photographing optical system 41, for example, the zoom lens system of Example 1 in conjunction with the button. In this example, the photographing optical system comprises a negative first lens unit G1 and a positive second lens unit G2 in order from the object side. An object image formed by the photographing optical system 41 is formed on an image pickup surface 50 of a CCD 49 via plane parallel plates 51 and 66 that are a low pass filter, an infrared cut filter, or the like.

The object image received by this CCD 49 is displayed as an electronic image in the liquid crystal display monitor 47 disposed in a rear surface of the camera via processing means 52. This processing means 52 is provided with a memory or the like, and the object image photographed by the CCD 49 can be recorded as electronic information. It is to be noted that this memory may be disposed separately from the processing means 52, or may be constituted so that the image is electronically recorded and read-out by using a hard disc, a memory card, a DVD±R, a DVD±RW, or the like. The camera may be constituted as a silver salt camera in which a silver salt film is disposed instead of the CCD 49.

Furthermore, an objective optical system 53 for the finder is disposed along the optical path 44 for the finder. The object image formed by this objective optical system 53 for the finder is formed on a view field frame 57 of a Porro-prism 55 which is an image erecting member. Behind this Porro-prism 55, there is disposed an eyepiece optical system 59 which guides an erected image into an observer's eyeball E. It is to be noted that cover members 54 are disposed on an incidence side of the photographing optical system 41 and the objective optical system 53 for the finder and an exit side of the eyepiece optical system 59, respectively.

The digital camera 40 constituted in this manner is effective in reducing the thickness of the camera. The photographing optical system 41 can secure an appropriate angle of field, assures a satisfactory aberration, and can be provided with a filter. Therefore, a high performance can be realized. Moreover, since the photographing optical system 41 can be constituted of small number of optical members, miniaturization, simplification and cost reduction can be realized.

It is to be noted that a photographing optical path of the digital camera 40 may be bent in a short-side direction of the finder. In this case, the flash lamp (or strobe) may be arranged further away in the upper side from the incidence surface of the photographing optical system, and an influence of shadow generated when a person is photographed by using the electronic flash can be reduced.

It is to be noted that in a constitution of FIG. 31, as the cover member 54, a parallel flat plate is disposed, but a lens having an optical power may be disposed.

Here, instead of disposing the cover member, the surface disposed closest to the object side in the zoom lens system may also be used as the cover member. In the present example, the surface closest to the object side is the incidence surface of the first lens unit G1.

Figure 32:
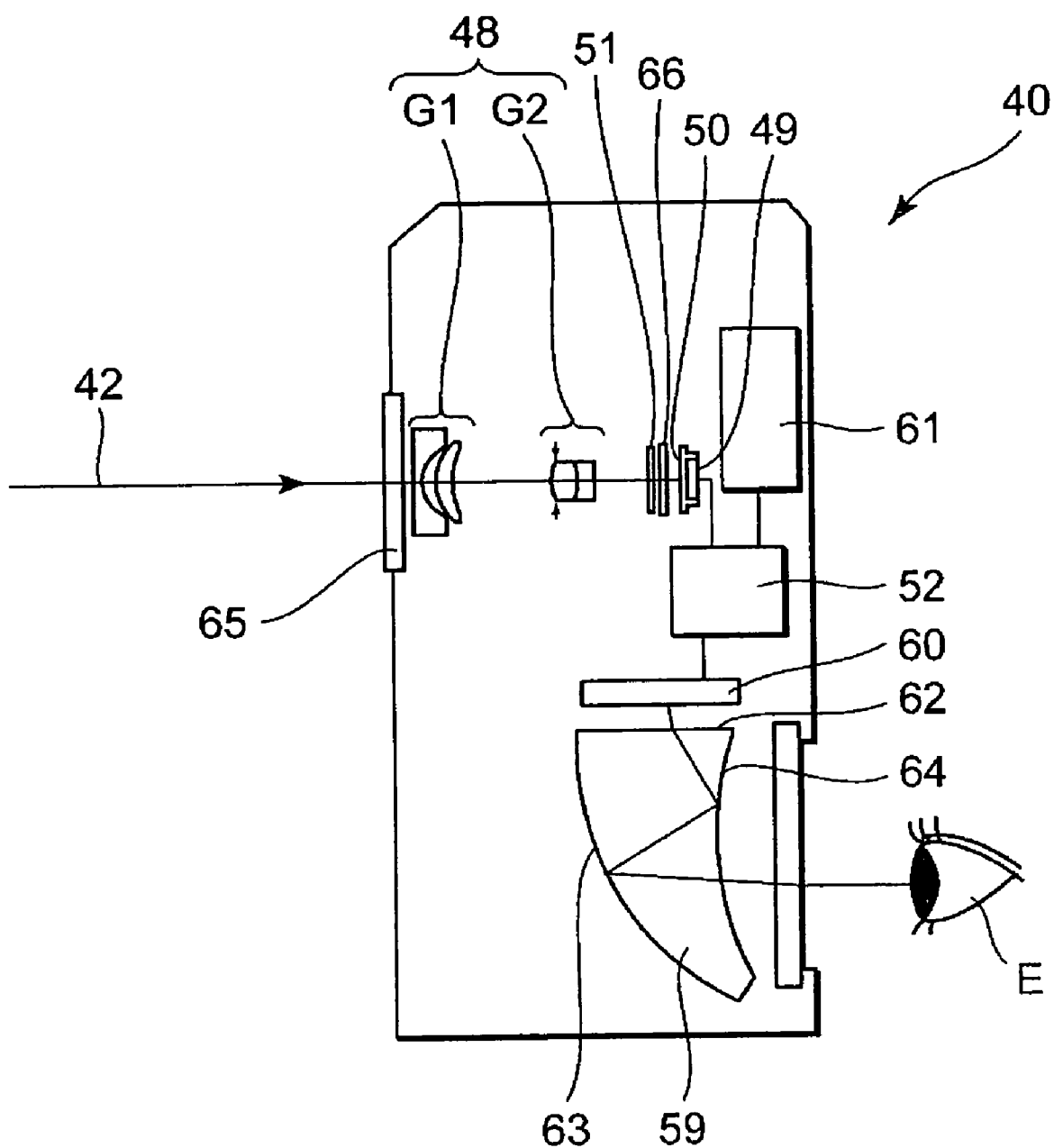
FIG. 32 is a conceptual diagram showing an inner structure of another example of the digital camera to which the present invention has been applied.

Next, FIG. 32 is a conceptual diagram showing an inner structure of another example of the digital camera to which the present invention has been applied. In this case, the zoom lens system of the present invention is used in a photographing objective optical system 48 disposed along a photographing optical path 42. An object image is formed by this photographing objective optical system 48 on the image pickup surface 50 of the CCD 49 via a filter 51 such as a low pass filter or an infrared cut filter. The object image received by this CCD 49 is displayed as an electronic image in a liquid crystal display element (LCD) 60 via processing means 52. This processing means 52 is connected to recording means 61, and the object image photographed by the CCD 49 can be recorded as electronic information of the photographed electronic image. It is to be noted that this recording means 61 may be separately from the processing means 52, or the information may electronically be recorded or read-out by using a hard disc, a memory card, a DVD±R, a DVD±RW, or the like. The image displayed in the LCD 60 is guided into observer's eyeball E via an eyepiece optical system 59.

This eyepiece optical system 59 is constituted of an eccentric prism. In this example, the system is constituted of three surfaces: an incidence surface 62; a reflective surface 63; and a reflective and refractive surface 64. At least one or preferably both of two surfaces 63 and 64 having a reflecting function is constituted of a free-formed surface having only one plane of symmetry and an optical power and which corrects an eccentric aberration. The digital camera 40 constituted in this manner is effective in reducing a thickness of the camera. The photographing optical system 41 is a zoom lens system which can secure an appropriate angle of field and a satisfactory aberration and which is bright and which can be provided with a filter and the like. Therefore, a high performance can be realized. Moreover, since the photographing optical system 41 can be constituted of small number of optical members, miniaturization, simplification and cost reduction can be realized.

It is to be noted that in the present example, as a cover member 65, a parallel flat plate is disposed, but a lens having an optical power may be disposed in the same manner as in the above example.

Here, instead of disposing the cover member, the surface disposed closest to the object side in the zoom lens system may also be used as the cover member. In the present example, the surface closest to the object side is the incidence surface of the first lens unit G1.

Figure 33:
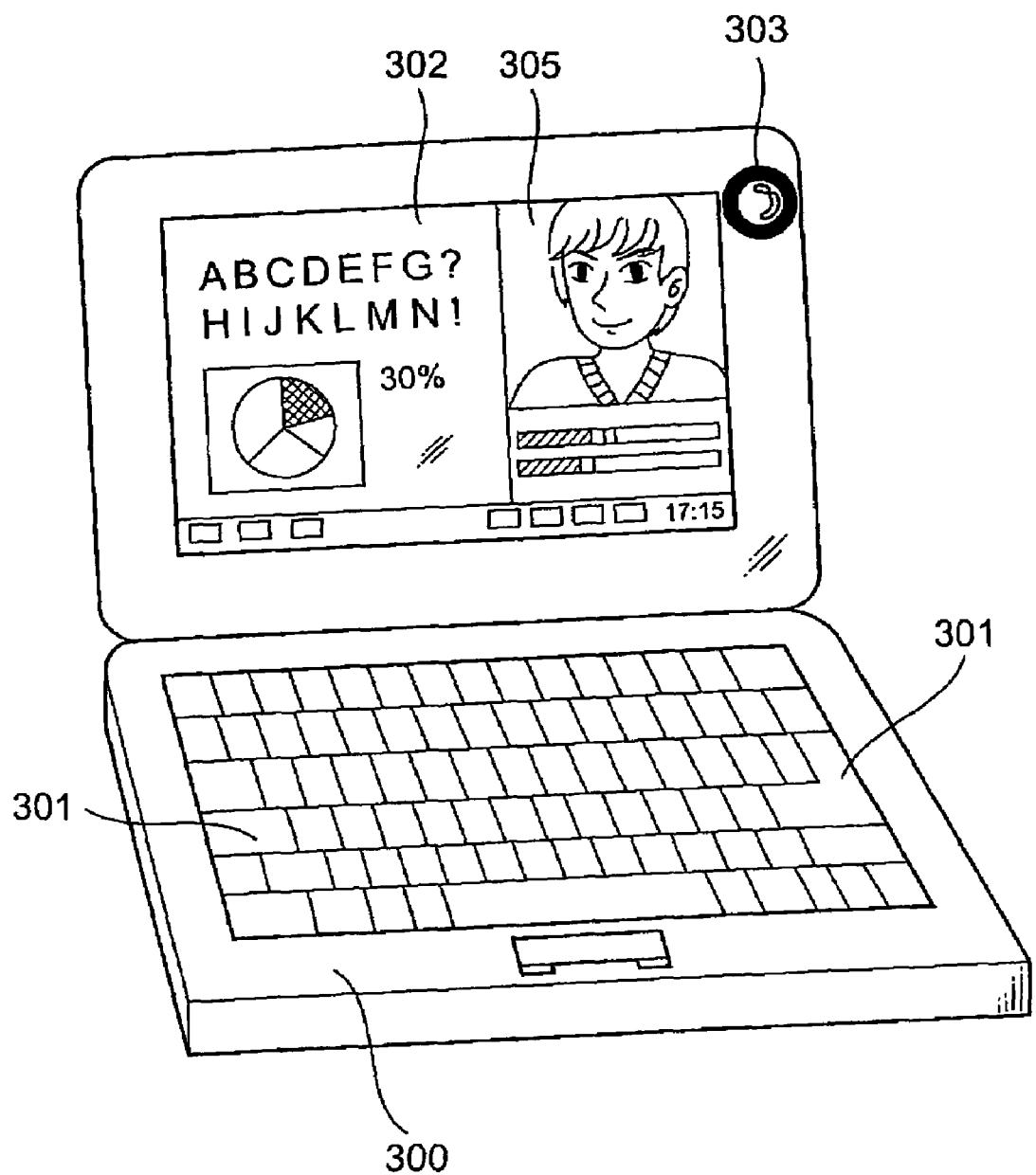
FIGS. 33 to 35 are diagrams showing an example of a personal computer to which the present invention has been applied.
Figure 34:
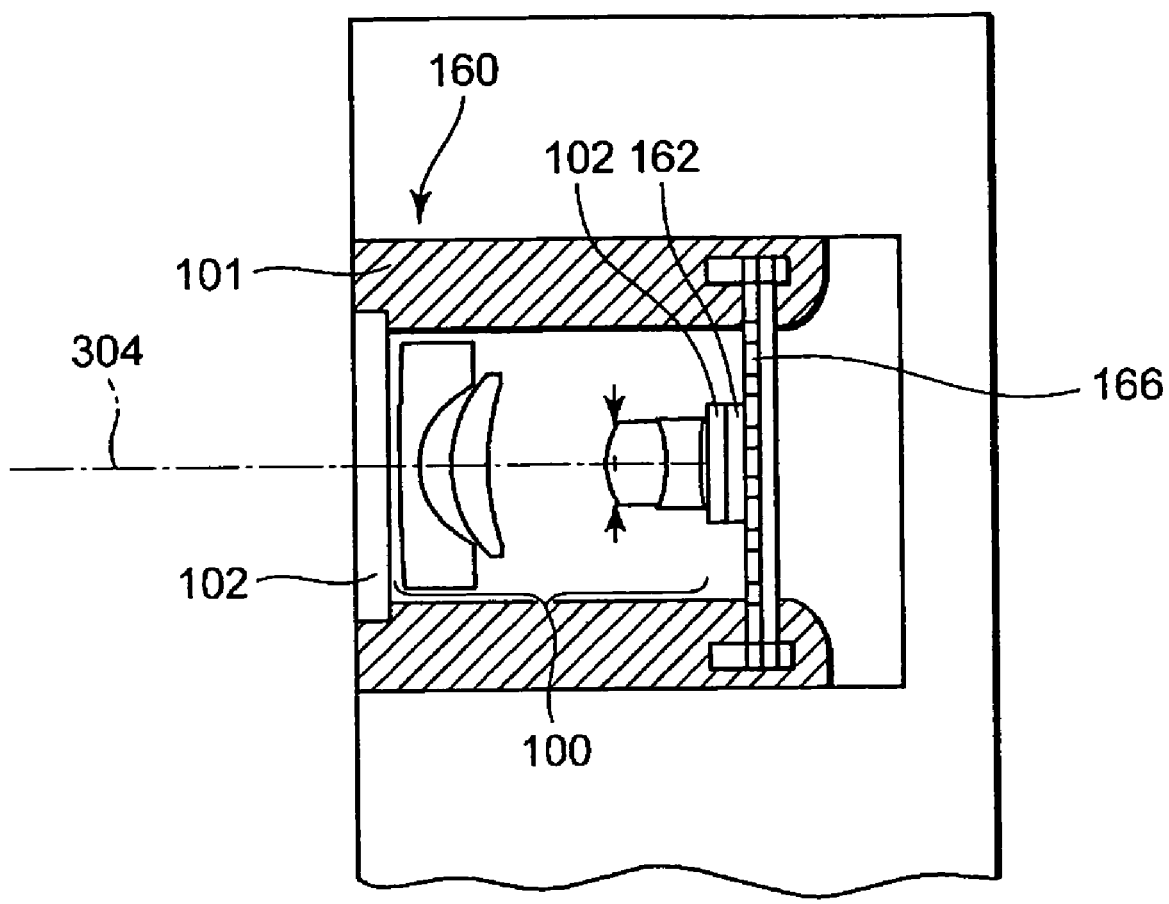
Figure 35:
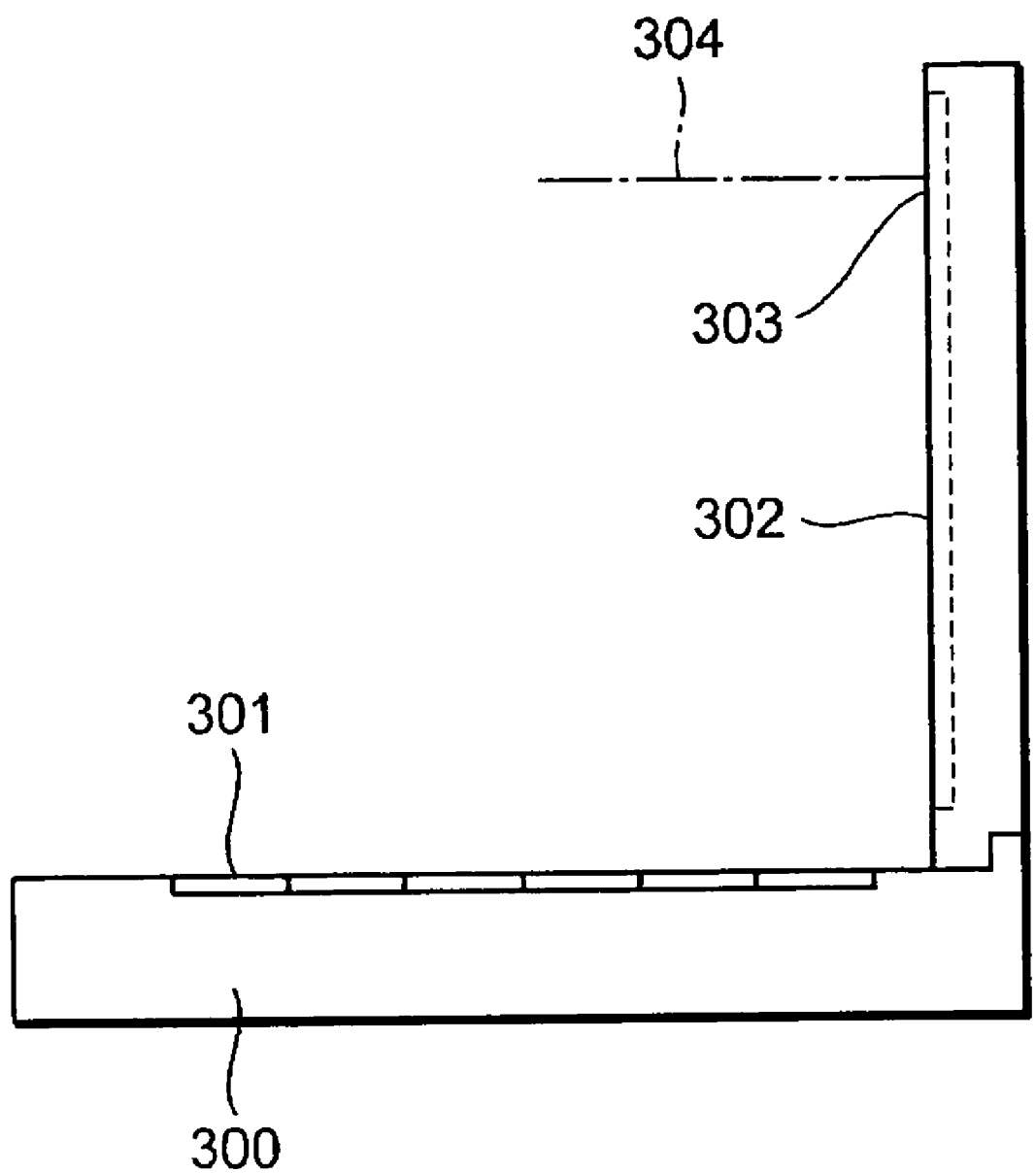

Next, FIGS. 33 to 35 show a personal computer as one example of an information processing device to which the present invention has been applied. FIG. 33 is a front perspective view showing a state in which a cover of the personal computer is opened, FIG. 34 is a sectional view of a photographing optical system incorporated in the personal computer, and FIG. 35 is a side view showing the state of FIG. 33.

As shown in FIGS. 33 to 35, a personal computer 300 has: a keyboard 301 for an operator to input information from the outside; information processing means or recording means (not shown); a monitor 302 which displays information for the operator; and a photographing optical system 303 for photographing an operator and its surroundings. Here, the monitor 302 may be a transmission type liquid crystal display element which illuminates the back surface by a back light (not shown), a reflective liquid crystal display element which reflects light from a front surface for displaying the image, a CRT display or the like.

Moreover, in the drawing, the photographing optical system 303 is built in the upper right of the monitor 302, but the system is not limited to this place, and the system may be disposed anywhere around the monitor 302 or the keyboard 301. This photographing optical system 303 has, on a photographing optical path 304, an objective optical system 100 constituted of a two-unit zoom lens system of, for example, the first embodiment of the present invention, and an image sensor chip 162 which receives light of an image. They are built in the personal computer 300.

Here, cover glass CG is additionally attached onto the image sensor chip 162. The image sensor chip 162 is mounted integrally on a substrate having a terminal 166, and forms an image pickup unit. The unit may be fitted into the rear end of the lens barrel 101 of the objective optical system 100 through a one-touch operation. This obviates necessity of centering adjustment of the objective optical system 100 and the image pickup chip 162 or adjusting of a space between surfaces, and this facilitates assembling. On a distal end of the lens barrel 101, there is disposed cover glass 102 for protecting the objective optical system 100. It is to be noted that a mechanism for driving the zoom lens system in the lens barrel 101 is omitted from the drawing.

An object image received by the image pickup chip 162 is input into the processing means of the personal computer 300 via a terminal 166, and displayed as an electronic image in the monitor 302. As one example, FIG. 33 shows operator's photographed image 305. This image 305 can be displayed in communication partner's personal computer in a remote area via the processing means and internet or phone.

Figure 36:
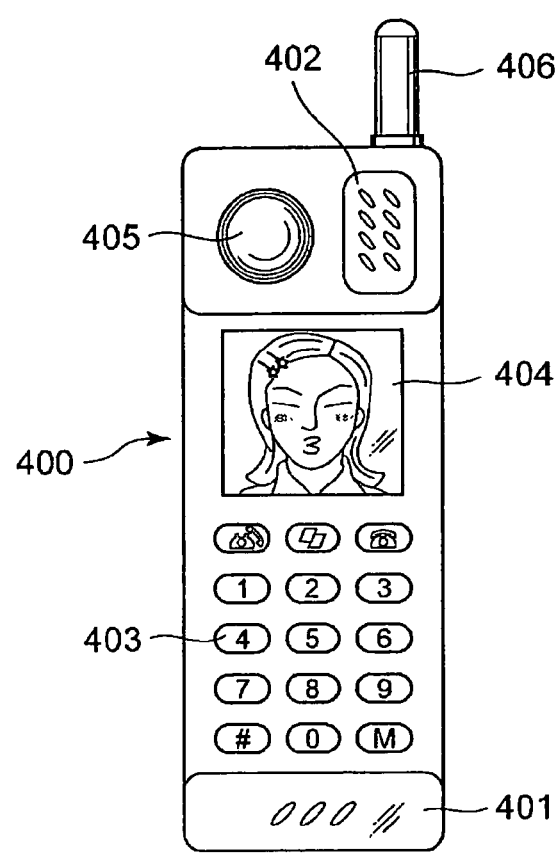
FIGS. 36 to 38 are diagrams showing an example of a cellular phone to which the present invention has been applied.
Figure 37:
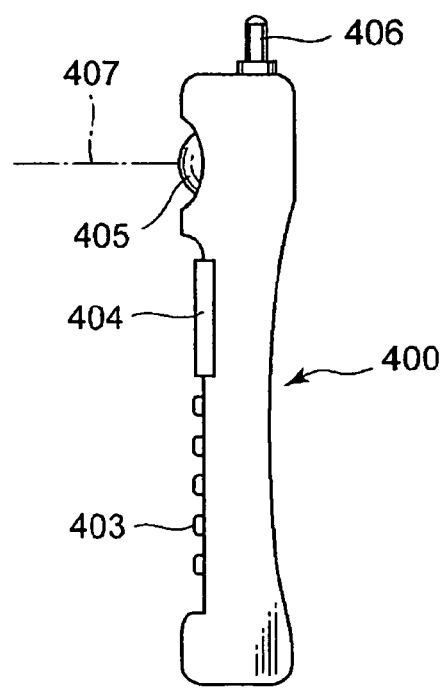
Figure 38:
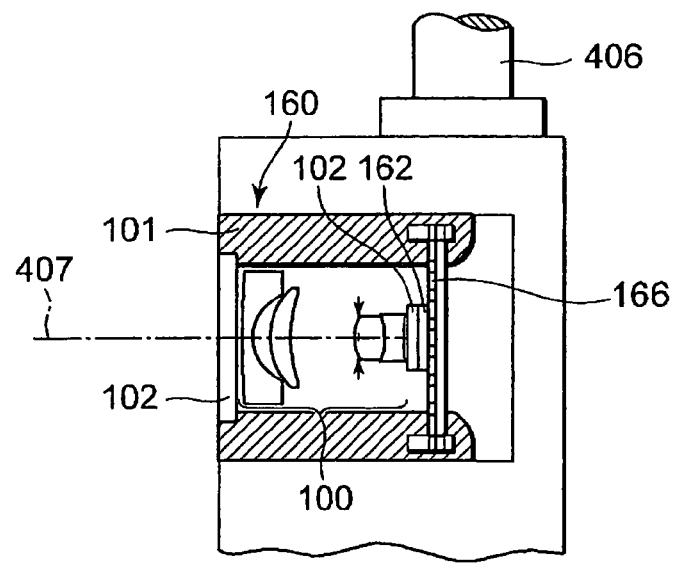

Next, FIGS. 36 to 38 show a cellular phone as one example of the information processing device to which the present invention has been applied. FIG. 36 is a front view of the cellular phone, FIG. 37 is a side view, and FIG. 38 is a sectional view of a photographing optical system.

As shown in FIGS. 36 to 38, a cellular phone 400 has: a microphone portion 401 which inputs operator's voice as information; a speaker portion 402 which outputs communication partner's voice; an input keys 403 for the operator to input information; a monitor 404 which displays a photographed image of the operator, the communication partner or the like, and information such as phone number; a photographing optical system 405; an antenna 406 which transmits and receives a communication radio wave; and processing means (not shown) which processes image information, communication information, an input signal and the like. Here, the monitor 404 is a liquid crystal display element.

Moreover, in the drawing, positions where the constituent elements are arranged are not limited to shown positions. This photographing optical system 405 has: an objective optical system 100 constituted of a zoom lens system of, for example, the first embodiment of the present invention and disposed along a photographing optical path 407; and an image sensor chip 162 which receives an object image. They are built in the cellular phone 400.

Here, cover glass CG is additionally attached onto the image sensor chip 162. The image sensor chip 162 is mounted integrally on a substrate having a terminal 166, and forms an image pickup unit. The unit may be fitted into a rear end of the lens barrel 101 of the objective optical system 100 through a one-touch operation. This obviates necessity of centering adjustment of the objective optical system 100 and the image sensor chip 162 or adjustment of the space between surfaces, and this facilitates assembling. On the distal end of the lens barrel 101, there is disposed cover glass 102 for protecting the objective optical system 100. It is to be noted that a mechanism for driving the zoom lens system in the lens barrel 101 is omitted from the drawing.

An object image received by the image sensor chip 162 is input into the processing means (not shown) via a terminal 166, and displayed as an electronic image in one or both of the monitor 404 and communication partner's monitor. In a case where the image is transmitted to a communication partner, the processing means includes a signal processing function of converting, into a transmittable signal, information of the object image received by the image sensor chip 162.

An image processing unit may be disposed integrally with the electronic image pickup apparatus, or disposed as an image processing device separately from the electronic image pickup apparatus.

Figure 39:
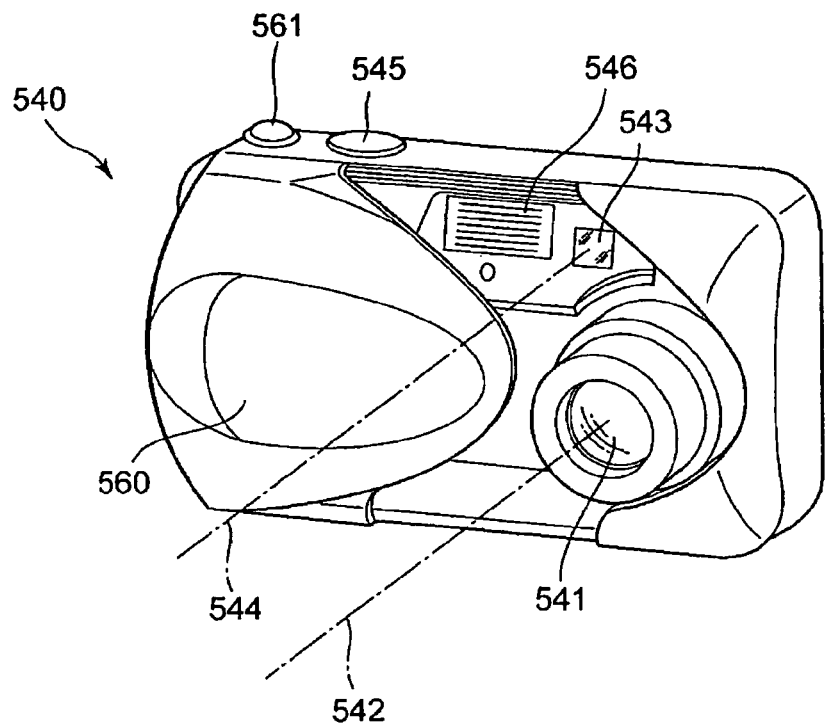
FIGS. 39 to 41 are diagrams showing an example of a collapsible digital camera to which the present invention has been applied.
Figure 40:
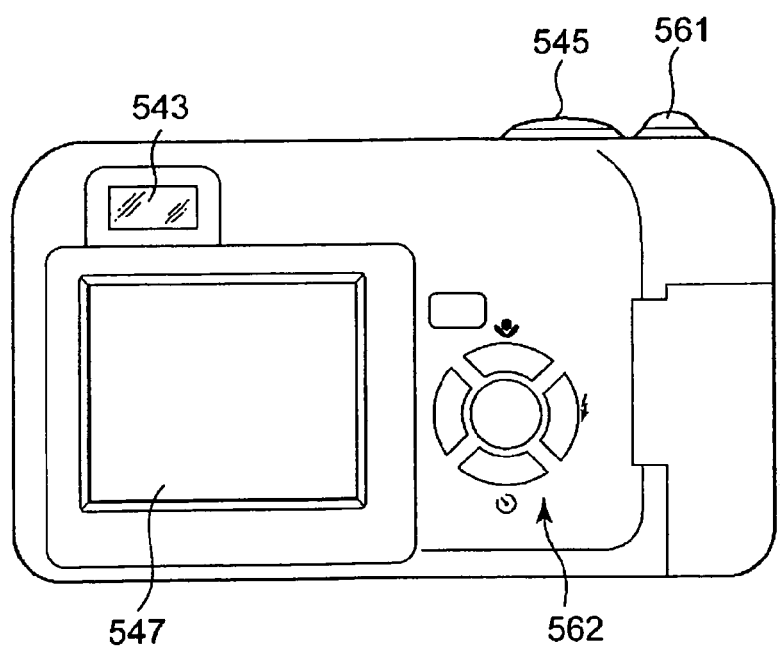
Figure 41:
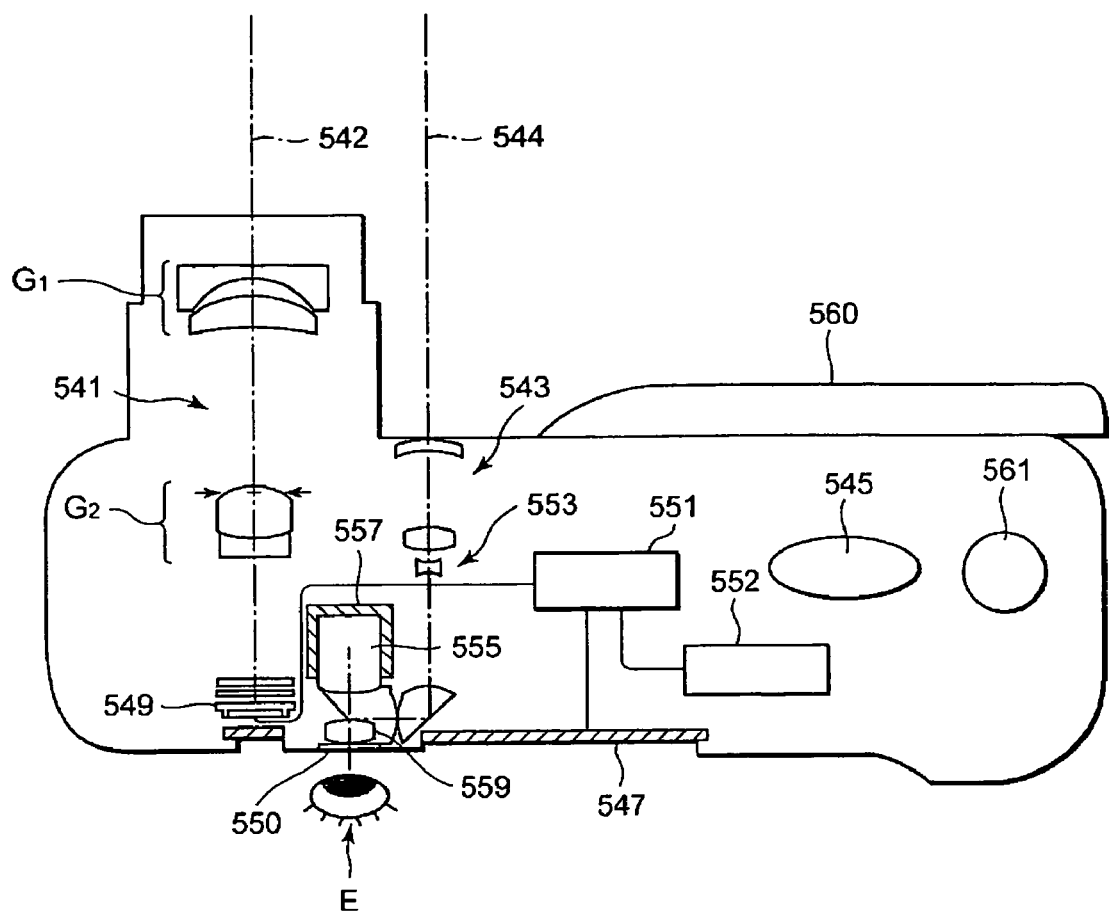

FIGS. 39 to 41 are diagrams showing an example of a collapsible digital camera to which the present invention has been applied, FIG. 39 is a front perspective view showing an appearance of the camera, FIG. 40 is a back view, and FIG. 41 is a conceptual diagram showing an inner constitution of the digital camera. FIGS. 39 and 41 show a state in which the photographing optical system is not collapsed. In this example, a digital camera 540 includes: a photographing optical system 541 having a photographing optical path 542; a finder optical system 543 having an optical path 544 for a finder; a shutter button 545; a electronic flash lamp 546; a liquid crystal display monitor 547; a focal length changing button 561; a camera setting changing switch 562 and the like. When the photographing optical system 541 is collapsed, a cover 560 is slit to thereby cover the photographing optical system 541, the finder optical system 543 and the electronic flash lamp 546 with the cover 560. Moreover, when the cover 560 is opened to bring the camera 540 into a photographing state, the photographing optical system 541 is brought into a non-collapsed state as shown in FIG. 39 and FIG. 41. When the shutter button 545 disposed in an upper portion of the camera 540 is pressed, the photographing is performed through the photographing optical system 541, for example, the zoom lens system of Example 1 in conjunction with the button. An object image formed by the photographing optical system 541 is formed on an image pickup surface of a CCD 549 via a low pass filter LF coated with an IR cut coating and cover glass CG. The object image received by this CCD 549 is displayed as an electronic image in the liquid crystal display monitor 547 disposed in a rear surface of the camera via processing means 551. This processing means 551 is connected to recording means 552, and the photographed electronic object image can be recorded. It is to be noted that this recording means 552 may be disposed separately from the processing means 551, or may be constituted so that the image is electronically recorded or read-out by using a hard disc, a memory card, a DVD±R, a DVD±RW, or the like. The camera may be constituted as a silver salt camera in which a silver salt film is disposed instead of the CCD 549.

Furthermore, an objective optical system 553 for the finder is disposed along the optical path 544 for the finder. The objective optical system 553 for the finder is constituted of a plurality of lens units (three units in the drawing) and two prisms, and is constituted of a zoom lens system in which the focal length changes in conjunction with the zoom lens system of the photographing optical system 541. The object image formed by this objective optical system 553 for the finder is formed on a view field frame 557 of an erecting prism 555 which is an image erecting member. Behind this erecting prism 555, there is disposed an eyepiece optical system 559 which guides an erected image into an observer's eyeball E. It is to be noted that a cover member 550 is disposed on an exit side of the eyepiece optical system 559.

In the digital camera 540 constituted in this manner, the photographing optical system 541 is a two-unit zoom lens system that includes a first negative lens unit G1 including a negative meniscus lens element and a positive meniscus lens element, and a positive second lens unit G2 including a cemented lens component formed of a double-convex lens element and a negative meniscus lens element. Further, the low pass filter LF and the cover glass CG are arranged on the incidence side of the CCD 549. The photographing optical system 541 has a high performance, is small-sized, and can be collapsed into the camera body. Therefore, the high performance and miniaturization can be realized.

Figure 42:
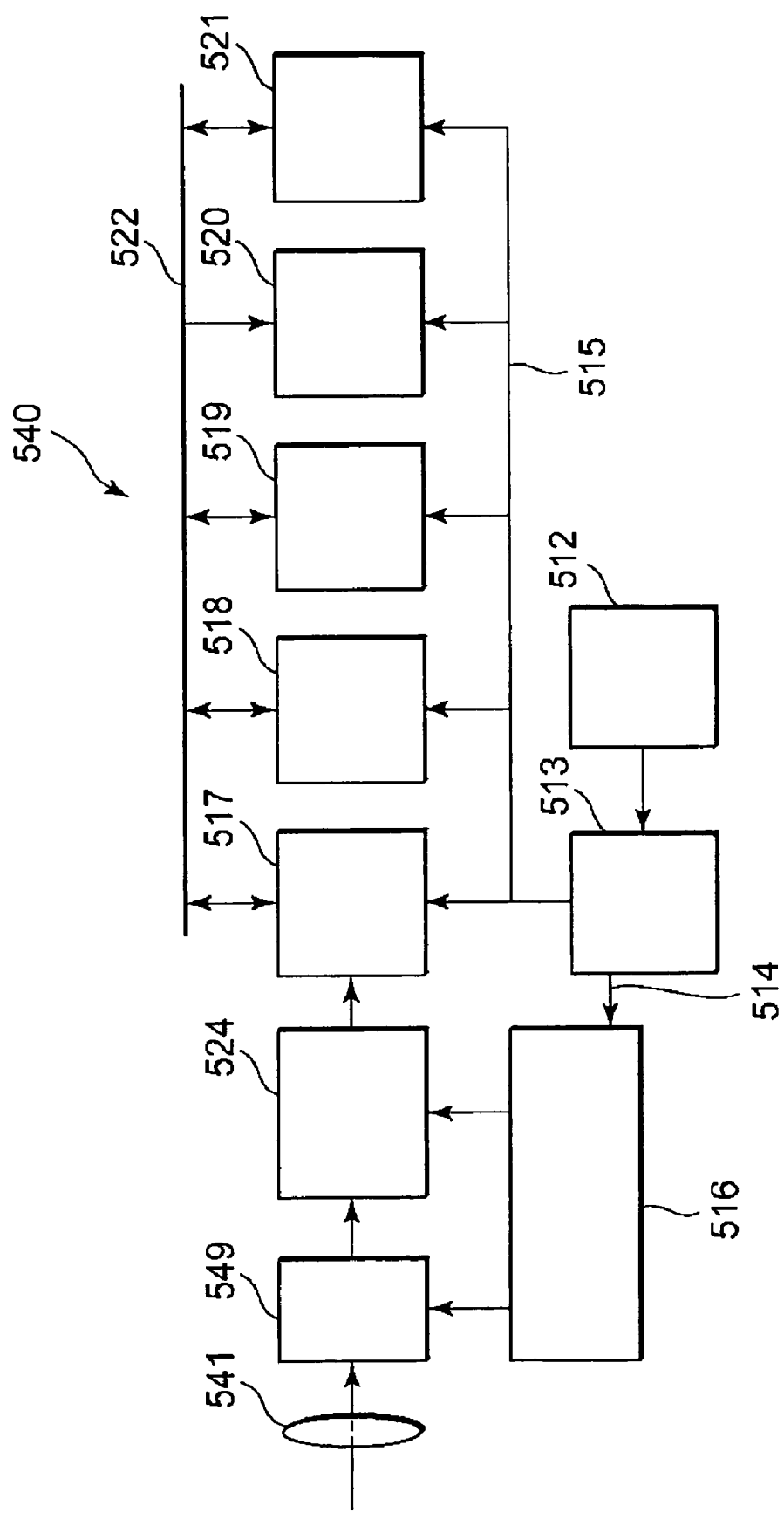
FIG. 42 is a block diagram of a part of an electric circuit of the digital camera shown in FIG. 39.

FIG. 42 is a block diagram of a part of an electric circuit of the digital camera shown in FIG. 39. It is to be noted that in the following description, the processing means 551 includes, for example, a CDS/ADC section 524, a temporary storage memory 517, an image processing section 518 and the like, and the recording means 552 includes, for example, a storage medium section 519 and the like.

As shown in FIG. 42, the digital camera 540 includes: an operating section 512; a control section 513; an image sensor driving circuit 516 and the temporary storage memory 517 connected to a control signal output port of this control section 513 via buses 514 and 515; the image processing section 518; the storage medium section 519; a display section 520; and a setting information storage memory section 521.

The temporary storage memory 517, the image processing section 518, the storage medium section 519, the display section 520, and the setting information storage memory section 521 are connected to a bus 522 so that data can mutually be input or output. The image sensor driving circuit 516 is connected to the CCD 549 and the CDS/ADC section 524.

The operating section 512 includes various types of input buttons or switches, and is a circuit which notifies, to the control section, event information input from the outside (camera user) via these input buttons or switches. The control section 513 is a central operation processing unit including, for example, a CPU and the like, and contains a program memory (not shown). The control section is a circuit which receives an instruction or a command input from the camera user via the operating section 512 to control the whole digital camera 540 in accordance with a program stored in the program memory.

The CCD 549 receives an object image formed via the photographing optical system 541 in which the zoom lens system is incorporated. The CCD 549 is an image sensor which is driven and controlled by the image sensor driving circuit 516 and which converts a quantity of light of the object image into an electric signal in pixel-by-pixel basis to output the signal to the CDS/ADC section 524.

The CDS/ADC section 524 is a circuit which amplifies the electric signal input from the CCD 549 and which performs analog/digital conversion to output, to the temporary storage memory 517, video bare data (hereinafter referred to as raw data) just subjected to this amplification and digital conversion.

The temporary storage memory 517 is a buffer including, for example, an SDRAM and the like, and is a memory device which temporarily stores the raw data output from the CDS/ADC section 524. The image processing section 518 is a circuit which reads the raw data stored in the temporary storage memory 517 or the raw data stored in the storage medium section 519 (the storage medium attached to the storage medium section) to subject the data to various types of electric image processing including the distortion correction based on an image quality parameter designated from the control section 513.

The recording medium section 519 is a control circuit of a device to which a card or stick type recording medium including, for example, a flash memory and the like is detachably attached. In the card or stick type flash memory, the device records and retains the raw data transferred from the temporary storage memory 517 and the image data obtained by processing the image by the image processing section 518.

The display section 520 is a circuit including the liquid crystal display monitor 547. The circuit displays an image or an operation menu in the liquid crystal display monitor 547. The setting information storage memory section 521 includes: an ROM portion in which various types of image quality parameters are stored beforehand; and an RAM portion in which there are stored the image quality parameter selected, from the image quality parameters read from the ROM portion, by an input operation of the operating section 512. The setting information storage memory section 521 is a circuit which controls input/output with respect to the memory.

The present invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

The invention claimed is:

1. A zoom lens system comprising, in order from an object side:
   a first lens unit having a negative refractive power and comprising a negative lens component and a positive lens component; and
   a second lens unit having a positive refractive power and comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing,
   an image-side surface of the negative lens component of the first lens unit being an aspherical surface on which a diverging function decreases with distance from the optical axis,
   wherein the lens component means a single lens or a cemented lens which has only two air contact surfaces of an incidence surface and an exit surface in a clear aperture and which does not have any air space between the surfaces.

2. The zoom lens system according to claim 1, wherein the first lens unit comprises a positive lens element, and a negative lens disposed on the object side of the positive lens element, and the positive lens element and the negative lens element satisfy the following conditions:

$$0.08 < n1p - n1m < 0.35 \quad (14);$$

and $$5 < V1n - V1p < 25 \quad (15),$$

wherein
   $n1p$ denotes a refractive index of a material of the positive lens element of the first lens unit,
   $n1n$ denotes a refractive index of a material of the negative lens element of the first lens unit,
   $V1p$ denotes the Abbe number of the material of the positive lens element of the first lens unit, and
   $V1n$ denotes the Abbe number of the material of the negative lens element of the first lens unit.

3. The zoom lens system according to claim 1, wherein the positive cemented lens component of the second lens unit is a cemented lens constituted by cementing a positive lens element to a negative lens element.

4. The zoom lens system according to claim 1, being a two-unit zoom lens system.

5. A zoom lens system comprising, in order from an object side:
   a first lens unit having a negative refractive power and comprising a negative lens component and a positive lens component; and
   a second lens unit having a positive refractive power and comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing,
   50% or less of all refractive surfaces constituting the first lens unit being aspherical surfaces.

6. A zoom lens system comprising, in order from an object side:
   a first lens unit having a negative refractive power and comprising a negative lens component and a positive lens component; and
   a second lens unit having a positive refractive power and comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing,
   the positive lens component of the first lens unit comprising a positive lens element constituted of a material having a refractive index of 1.87 or more.

7. A zoom lens system comprising, in order from an object side:
   a first lens unit having a negative refractive power and comprising a negative lens component and a positive lens component; and
   a second lens unit having a positive refractive power and comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing,
   the zoom lens system satisfying the following condition:

$$0.4 < fR/|fA| < 1.2 \quad (10),$$

wherein fA denotes a focal length of the first lens unit, and fR denotes a synthesized focal length of all lens units arranged on an image side of the first lens unit in the wide-angle end.

8. A zoom lens system comprising, in order from an object side:
   a first lens unit having a negative refractive power and comprising a negative lens component and a positive lens component; and
   a second lens unit having a positive refractive power an comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing, the zoom lens system satisfying the following condition:

$$0.06 < d11/f_W < 0.53 \quad (13),$$

wherein $f_W$ denotes a focal length of the zoom lens system in the wide-angle end, and d11 denotes an air space between the negative lens component and the positive lens component of the first lens unit along an optical axis.

9. A zoom lens system comprising, in order from an object side:
   a first lens unit having a negative refractive power and comprising a negative lens component and a positive lens component; and
   a second lens unit having a positive refractive power and comprising a positive cemented lens component which comprises a plurality of lens elements,
   the number of the lens components included in the first lens unit and the second lens unit being three in total,
   a space between the lens units changing during zooming from a wide-angle end to a telephoto end or during focusing,
   the zoom lens system satisfying the following condition:

$$0.66 < (R23+R21)/(R23-R21) < 1.5 \quad (16),$$

wherein R21 and R23 denote radii of curvature of the surfaces closest to the object side and closest to an image side on an optical axis in the second lens unit.

10. A zoom lens system comprising, in order from an object side:
    a first lens unit having a negative refractive power and comprising a negative lens component and a positive lens component; and
    a second lens unit having a positive refractive power and comprising a positive cemented lens component which comprises a plurality of lens elements,
    the number of the lens components included in the first lens unit and the second lens unit being three in total,
    a space between the lens units changing during zooming from a wide-angle end to a telephoto end or during focusing,
    at least one of the plurality of lens elements of the second lens unit being a positive lens element satisfying the following condition:

$$V2p > 65,$$

wherein V2p denotes the Abbe number of a material of the positive lens element included in the second lens unit.

11. An electronic image pickup apparatus comprising: the zoom lens system according to any one of claims 1 to 6, 7, 8, 9 and 10; and
    an electronic image sensor disposed on an image side of the zoom lens system.

* * * * *